US008879569B2

(12) United States Patent
Nozaki

(10) Patent No.: US 8,879,569 B2
(45) Date of Patent: Nov. 4, 2014

(54) VIRTUAL NETWORK CONNECTION METHOD, NETWORK SYSTEM, AND NETWORK DEVICE

(75) Inventor: Shinji Nozaki, Kawasaki (JP)

(73) Assignee: Alaxala Networks Corporation, Kawasaki (JP)

( * ) Notice: Subject to any disclaimer, the term of this patent is extended or adjusted under 35 U.S.C. 154(b) by 234 days.

(21) Appl. No.: 13/527,022

(22) Filed: Jun. 19, 2012

(65) Prior Publication Data

US 2012/0327811 A1  Dec. 27, 2012

(30) Foreign Application Priority Data

Jun. 22, 2011 (JP) ................................. 2011-138843

(51) Int. Cl.
*H04L 12/28* (2006.01)
*H04L 12/721* (2013.01)
*H04L 12/46* (2006.01)

(52) U.S. Cl.
CPC .............. *H04L 12/462* (2013.01); *H04L 45/66* (2013.01); *H04L 45/12* (2013.01)
USPC ............ 370/409; 370/255; 370/315; 370/401

(58) Field of Classification Search
CPC ..................................................... H04L 45/50
USPC ......................................... 370/400, 401, 409
See application file for complete search history.

(56) References Cited

U.S. PATENT DOCUMENTS

| 2007/0258457 | A1* | 11/2007 | Sakamoto et al. | 370/392 |
| 2011/0032939 | A1* | 2/2011 | Nozaki et al. | 370/392 |
| 2011/0268129 | A1* | 11/2011 | Sakamoto et al. | 370/401 |
| 2012/0051364 | A1* | 3/2012 | Fujita et al. | 370/401 |
| 2014/0050226 | A1* | 2/2014 | Sakamoto et al. | 370/401 |

OTHER PUBLICATIONS

"IEEE Standard for Local and metropolitan area networks—Virtual Bridged Local Area Networks, Amendment 7: Provider Backbone Bridges" IEEE Std 802.1ah-2008 (Amendment to IEEE Std 802.1Q-2005); Jun. 12, 2008; pp. i-x, 1-109.
Lassere, M. Ed. et al. "Virtual Private LAN Service (VPLS) Using Label Distribution Protocol (LDP) Signaling"; Network Working Group, RFC: 4762; Jan. 2007; pp. 1-31.
Rosen, E. et al. "BGP/MPLS IP Virtual Private Networks (VPNs)"; Network Working Group, RFC: 4364; Feb. 2006; pp. 1-47.

* cited by examiner

*Primary Examiner* — Christopher Grey
(74) *Attorney, Agent, or Firm* — Foley & Lardner LLP

(57) ABSTRACT

A communication can be conducted between a hub network layer-3VPN-connected to a core network and a hub network layer-2VPN connected to the core network. A first NW that conducts a packet forwarding of a VPN, a second NW that is layer-3-connected to the first NW, and a third NW that is layer-2-connected to the first NW configure VPN. When a packet is transmitted from the second NW to a destination of the third NW, a packet forwarding processing by a layer is conducted, and information is stored in destination information of the packet and forwarded by using destination information and information on the network device PE belonging to the first NW which is connected to the third NW which is a relay point to the destination.

14 Claims, 63 Drawing Sheets

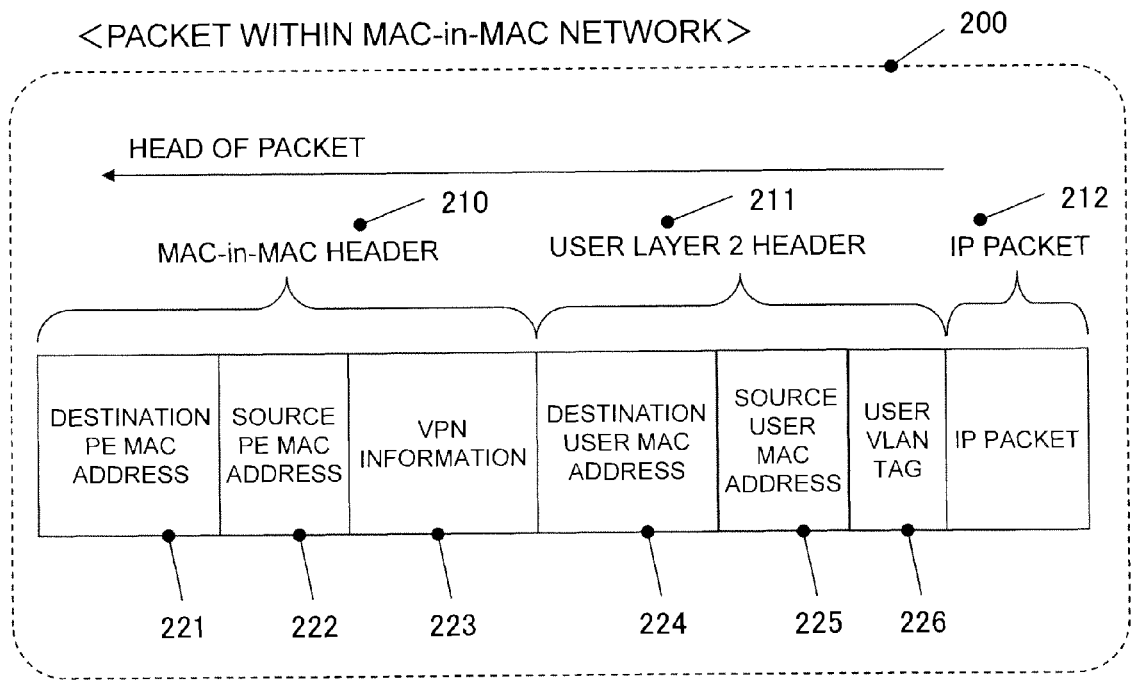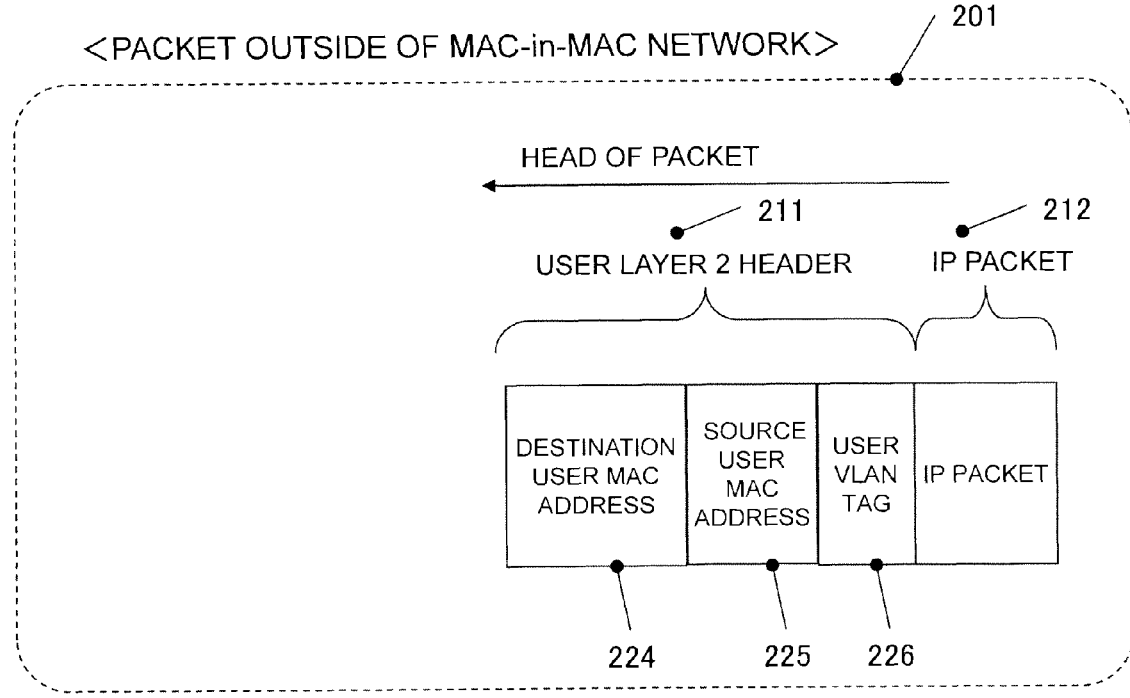
FIG.2

INTERFACE INFORMATION TABLE

| INTERFACE NUMBER | VPN NUMBER | VLAN NUMBER | INTERFACE TYPE | IP ADDRESS/ PREFIX LENGTH |
|---|---|---|---|---|
| (FIRST ENTRY) IF1 | 100 | 10 | IPVPN | 10.0.0.1/24 |
| (SECOND ENTRY) IF2 | – | – | MAC-in-MAC | – |

FIG.4

L2VPN INFORMATION TABLE

| | VPN NUMBER (501) | VLAN NUMBER (502) | IP ADDRESS/ PREFIX LENGTH (503) |
|---|---|---|---|
| (FIRST ENTRY) | 100 | 20 | 20.0.0.1/24 |

ROUTE CONTROL INFORMATION TABLE

| | VPN NUMBER | IP ADDRESS/ PREFIX LENGTH | OUTPUT INTERFACE NUMBER | NEXT HOP INFORMATION |
|---|---|---|---|---|
| (FIRST ENTRY) | 100 | 10.0.0.1/24 | IF1 | — |
| (SECOND ENTRY) | 100 | 11.0.0.0/24 | IF1 | 10.0.0.10 |
| (THIRD ENTRY) | 100 | 30.0.0.0/24 | IF2 | 20.0.0.21 |

FIG.6

FORWARDING TABLE

| | VPN NUMBER | IP ADDRESS /PREFIX LENGTH | OUTPUT INTERFACE NUMBER | NEXT HOP INFORMATION | ADDITIONAL INFORMATION |
|---|---|---|---|---|---|
| (FIRST ENTRY) | 100 | 10.0.0.1/24 | IF1 | — | — |
| (SECOND ENTRY) | 100 | 11.0.0.0/24 | IF1 | 10.0.0.10 | — |
| (THIRD ENTRY) | 100 | 20.0.0.1/24 | — | — | — |
| (FOURTH ENTRY) | 100 | 20.0.0.20/32 | IF2 | — | 2222.2222.2222 |
| (FIFTH ENTRY) | 100 | 20.0.0.21/32 | IF2 | — | 2222.2222.2222 |
| (SIXTH ENTRY) | 100 | 30.0.0.0/24 | IF2 | 20.0.0.21 | 2222.2222.2222 |

FIG.7

TERMINAL INFORMATION TABLE

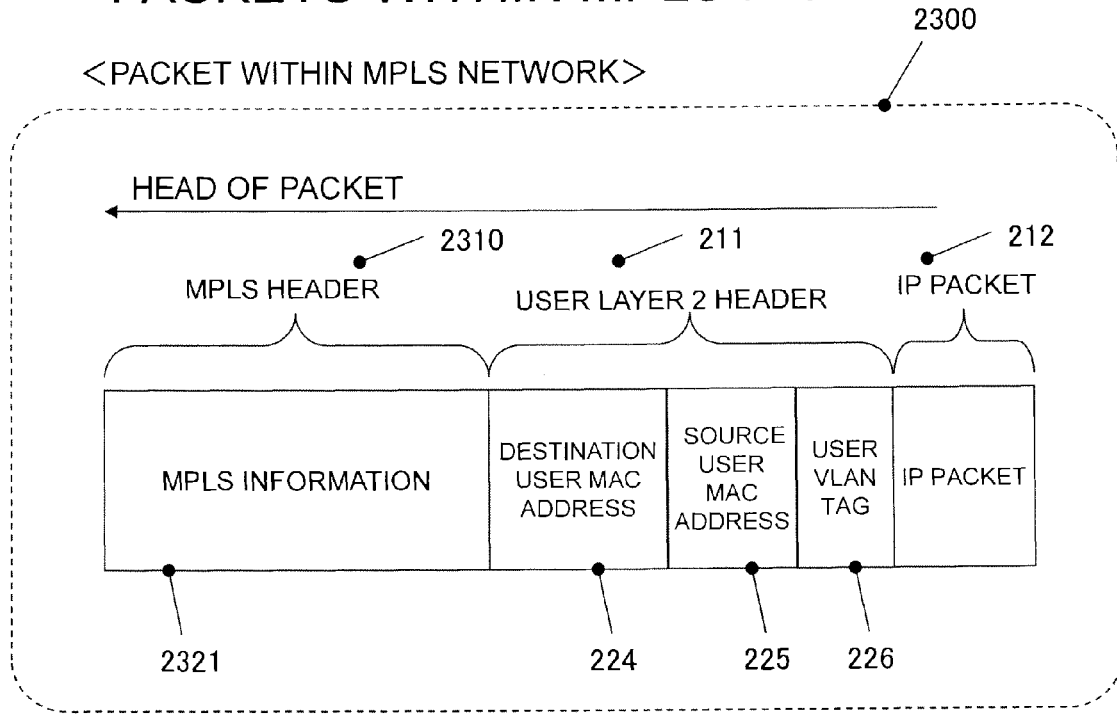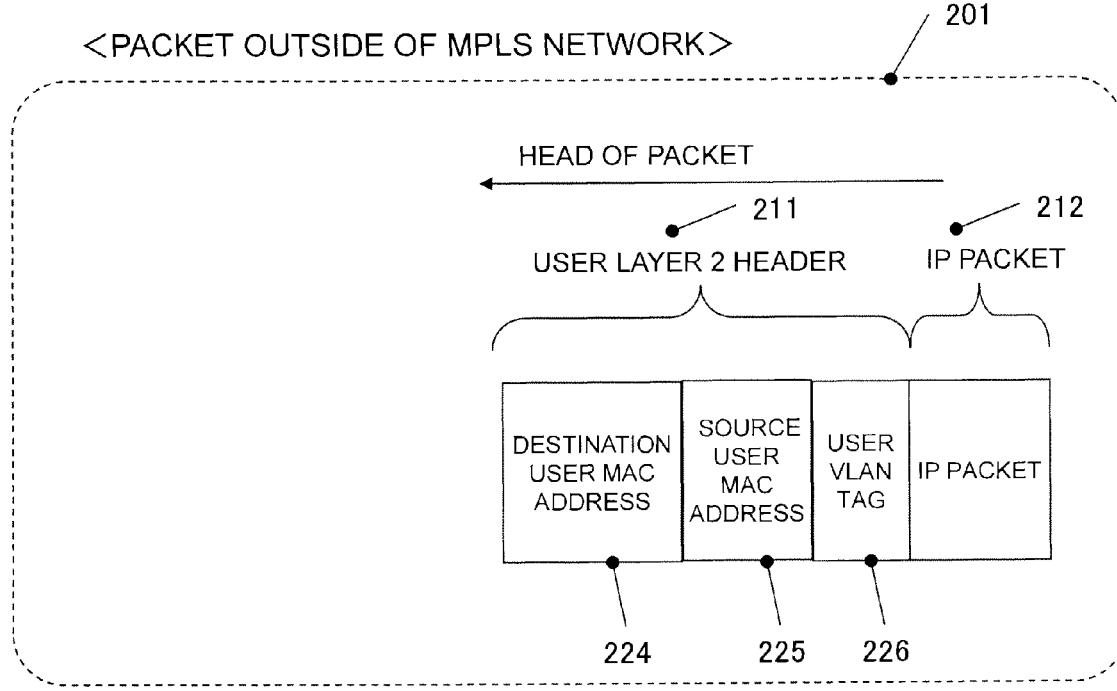
FIG.23

INTERFACE INFORMATION TABLE

| INTERFACE NUMBER | VPN NUMBER | VLAN NUMBER | INTERFACE TYPE | IP ADDRESS/ PREFIX LENGTH |
|---|---|---|---|---|
| IF1 | 100 | 10 | IPVPN | 10.0.0.1/24 |
| IF2 | – | – | MPLS | – |

(First row: FIRST ENTRY; Second row: SECOND ENTRY)

Columns labeled 401, 402, 403, 404, 405. Table reference 321.

FIG.25

FORWARDING TABLE

| | VPN NUMBER 701 | IP ADDRESS /PREFIX LENGTH 702 | OUTPUT INTERFACE NUMBER 703 | NEXT HOP INFORMATION 704 | ADDITIONAL INFORMATION 705 |
|---|---|---|---|---|---|
| (FIRST ENTRY) | 100 | 10.0.0.1/24 | IF1 | – | – |
| (SECOND ENTRY) | 100 | 11.0.0.0/24 | IF1 | 10.0.0.10 | – |
| (THIRD ENTRY) | 100 | 20.0.0.1/24 | — | – | – |
| (FOURTH ENTRY) | 100 | 20.0.0.20/32 | IF2 | – | LABEL 1 |
| (FIFTH ENTRY) | 100 | 20.0.0.21/32 | IF2 | – | LABEL 1 |
| (SIXTH ENTRY) | 100 | 30.0.0.0/24 | IF2 | 20.0.0.21 | LABEL 1 |

FIG.26

MPLS INFORMATION TABLE

2426

| | 2701 | 2702 | 2703 | 2704 | 2705 |
|---|---|---|---|---|---|
| | VPN NUMBER | VLAN NUMBER | OUTPUT LABEL NUMBER | INPUT LABEL NUMBER | INTERFACE NUMBER |
| (FIRST ENTRY) | 100 | 20 | LABEL 1 | LABEL 2 | IF2 |

FIG.27

INITIAL STATE OF FORWARDING TABLE

324

| | VPN NUMBER (701) | IP ADDRESS /PREFIX LENGTH (702) | OUTPUT INTERFACE NUMBER (703) | NEXT HOP INFORMATION (704) | ADDITIONAL INFORMATION (705) |
|---|---|---|---|---|---|
| (FIRST ENTRY) | 100 | 10.0.0.1/24 | IF1 | — | — |
| (SECOND ENTRY) | 100 | 11.0.0.0/24 | IF1 | 10.0.0.10 | — |
| (THIRD ENTRY) | 100 | 20.0.0.1/24 | — | — | — |

FIG.40

UPDATED TABLE

<FORWARDING TABLE 324>

|  | VPN NUMBER (701) | IP ADDRESS /PREFIX LENGTH (702) | OUTPUT INTERFACE NUMBER (703) | NEXT HOP INFORMATION (704) | ADDITIONAL INFORMATION (705) |
|---|---|---|---|---|---|
| (FIRST ENTRY) | 100 | 10.0.0.1/24 | IF1 | – | – |
| (SECOND ENTRY) | 100 | 11.0.0.0/24 | IF1 | 10.0.0.10 | – |
| (THIRD ENTRY) | 100 | 20.0.0.1/24 | — | – | – |
| (FOURTH ENTRY) | 100 | 20.0.0.20/32 | IF2 | – | 2222.2222.2222 |

<TERMINAL INFORMATION TABLE 325>

|  | VPN NUMBER (801) | VLAN NUMBER (802) | IP ADDRESS (803) | MAC ADDRESS (804) |
|---|---|---|---|---|
| (SECOND ENTRY) | 100 | 20 | 20.0.0.20 | 2020.2020.2020 |

FIG.43

TRANSMISSION OF PACKETS PA14 AND PA16

<PACKET PA11>

| DESTINATION USER MAC ADDRESS | SOURCE USER MAC ADDRESS | USER VLAN TAG | IP PACKET |
|---|---|---|---|

<INTERFACE INFORMATION TABLE 321>

| IF NUMBER | VPN | VLAN | INTERFACE TYPE | IP |
|---|---|---|---|---|
| (FIRST ENTRY) IF1 | 100 | 10 | IPVPN | 10.0.0.1/24 |

<TERMINAL INFORMATION TABLE 325>

| | 801 | 802 | 803 | 804 |
|---|---|---|---|---|
| | VPN | VLAN | IP ADDRESS | MAC ADDRESS |
| (SECOND ENTRY) | 100 | 20 | 20.0.0.20 | 2020.2020.2020 |

<FORWARDING TABLE 324>

| 701 | 702 | 703 | 704 | 705 |
|---|---|---|---|---|
| VPN | IP | OUTPUT IF | NH | ADDITIONAL INFORMATION |
| (FORTH ENTRY) 100 | 20.0.0.20/32 | IF2 | – | 2222.2222.2222 |

<PACKETS PA14, PA16>

| DESTINATION PE MAC ADDRESS | SOURCE PE MAC ADDRESS | VPN INFORMATION | DESTINATION USER MAC ADDRESS | SOURCE USER MAC ADDRESS | USER VLAN TAG | IP PACKET |
|---|---|---|---|---|---|---|
| 221 | 222 | 223 | 224 | 225 | 226 | |

FIG.44

TABLE UPDATE BY PA73 RECEPTION
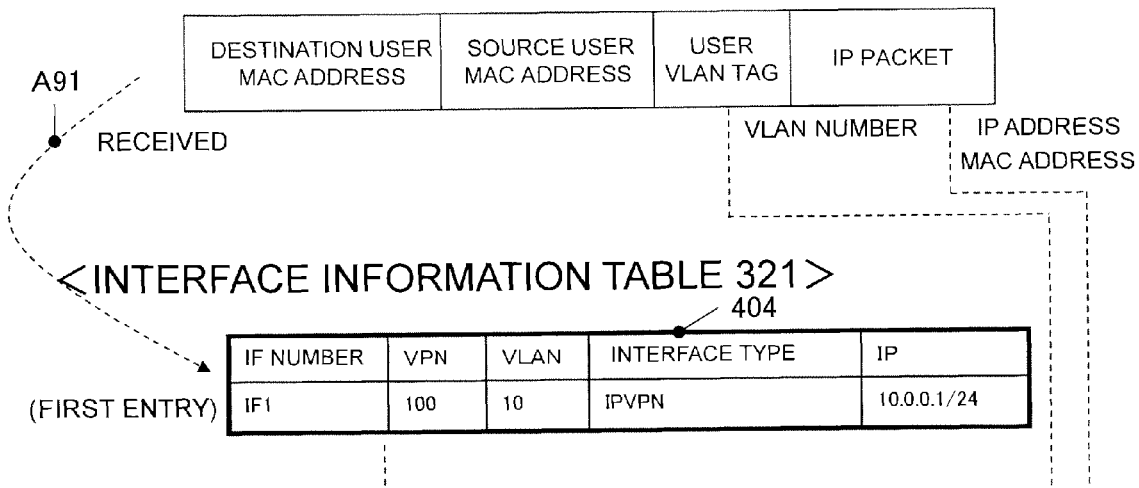
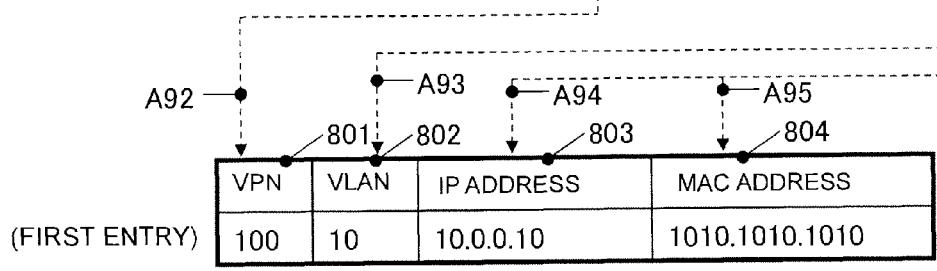
FIG.47

UPDATED TABLE

<FORWARDING TABLE 324>

|  | VPN NUMBER (701) | IP ADDRESS /PREFIX LENGTH (702) | OUTPUT INTERFACE NUMBER (703) | NEXT HOP INFORMATION (704) | ADDITIONAL INFORMATION (705) |
|---|---|---|---|---|---|
| (FIRST ENTRY) | 100 | 10.0.0.1/24 | IF1 | – | – |
| (SECOND ENTRY) | 100 | 11.0.0.0/24 | IF1 | 10.0.0.10 | – |
| (THIRD ENTRY) | 100 | 20.0.0.1/24 | — | – | – |

<TERMINAL INFORMATION TABLE 325>

|  | VPN NUMBER (801) | VLAN NUMBER (802) | IP ADDRESS (803) | MAC ADDRESS (804) |
|---|---|---|---|---|
| (FIRST ENTRY) | 100 | 10 | 10.0.0.10 | 1010.1010.1010 |

FIG.48

INITIAL STATE OF FORWARDING TABLE

UPDATED TABLE

<FORWARDING TABLE 324>

|  | VPN NUMBER (701) | IP ADDRESS /PREFIX LENGTH (702) | OUTPUT INTERFACE NUMBER (703) | NEXT HOP INFORMATION (704) | ADDITIONAL INFORMATION (705) |
|---|---|---|---|---|---|
| (FIRST ENTRY) | 100 | 10.0.0.1/24 | IF1 | - | - |
| (SECOND ENTRY) | 100 | 11.0.0.0/24 | IF1 | 10.0.0.10 | - |
| (THIRD ENTRY) | 100 | 20.0.0.1/24 | — | - | - |
| (FOURTH ENTRY) | 100 | 20.0.0.20/32 | IF2 | - | LABEL 1 |

<TERMINAL INFORMATION TABLE 325>

|  | VPN NUMBER (801) | VLAN NUMBER (802) | IP ADDRESS (803) | MAC ADDRESS (804) |
|---|---|---|---|---|
| (SECOND ENTRY) | 100 | 20 | 20.0.0.20 | 2020.2020.2020 |

FIG.56

UPDATED TABLE

<FORWARDING TABLE 324>

| | VPN NUMBER (701) | IP ADDRESS /PREFIX LENGTH (702) | OUTPUT INTERFACE NUMBER (703) | NEXT HOP INFORMATION (704) | ADDITIONAL INFORMATION (705) |
|---|---|---|---|---|---|
| (FIRST ENTRY) | 100 | 10.0.0.1/24 | IF1 | – | – |
| (SECOND ENTRY) | 100 | 11.0.0.0/24 | IF1 | 10.0.0.10 | – |
| (THIRD ENTRY) | 100 | 20.0.0.1/24 | — | – | – |

<TERMINAL INFORMATION TABLE 325>

| | VPN NUMBER (801) | VLAN NUMBER (802) | IP ADDRESS (803) | MAC ADDRESS (804) |
|---|---|---|---|---|
| (FIRST ENTRY) | 100 | 10 | 10.0.0.10 | 1010.1010.1010 |

FIG.62

VIRTUAL NETWORK CONNECTION METHOD, NETWORK SYSTEM, AND NETWORK DEVICE

CLAIM OF PRIORITY

The present application claims priority from Japanese patent application JP 2011-138843 filed on Jun. 22, 2011, the content of which is hereby incorporated by reference into this application.

BACKGROUND OF THE INVENTION

1. Technical Field

The present invention relates to a virtual network connection method, a network system, and a network device, and more particularly to a virtual network connection method, a network system, and a network device for connecting respective networks to each other.

2. Related Art

Up to now, there has been known a technique called Virtual Private Net work (VPN) in which networks at remotely separated hubs (hereinafter referred to as "hub networks") are connected by the aid of a network (hereinafter referred to as "core network") of a service provider. The service provider provides a service that connects the hub networks of plural customers to each other in the core network, and disables a communication between different customers to construct networks with individual customers independent from each other.

As techniques for connecting between the hub networks by the aid of the core network, there are a technique called "media access control (MAC-in-MAC)" represented by provider backbone bridges (PBB) disclosed in "IEEE802.1ah Provider Backbone Bridges", multi protocol label switching (MPLS) disclosed in "RFC4364 BGP/MPLS IP Virtual Private Networks", and virtual private LAN service (VPLS) disclosed in "RFC4762 Virtual Private LAN Service (VPLS) Using Label Distribution Protocol (LDP) Signaling".

The MAC-in-MAC is a technique in which the hub networks of the customers and the service provider are layer-2-connected (second layer in an OSI reference model), and a layer 2 communication is enabled between the respective hub networks. Within the core network, unicast, flooding, multicast, and broadcast data are forwarded by a technique of the layer 2. The device of the service provider adds a layer 2 header in a format of the packet MAC-in-MAC to a packet that has arrived at an edge device (device of a service provider connected to hub networks of customers) from a certain hub network. The core network forwards the packet by the aid of the added header therein. Then, the core network deletes the added layer 2 header when finally delivering the packet to the hub network through the edge device which is an exit of the core network, and delivers the packet to the hub network of a destination. The layer 2 header of the packet of the customer and information on a layer 3 or higher are forwarded without any change to enable the layer 2 communication between the hub networks, which is a feature of the MAC-in-MAC. The connection of the service provider and the hub networks does not depend on the layer 3. The MAC-in-MAC can conduct the network operation and management at low costs as compared with the MPLS and the costs of the device are frequently relatively inexpensive because of no use of a specific protocol for forwarding the packets between the hubs within the core network. However, the edge device of the core network needs to hold all of information on the layer 2 such as MAC address learning, and needs to be a device that can hold large volume information.

In the MPLS, as the method of connecting between the hub networks of the customers and the service provider, there are a layer 3 method (third layer in the OSI reference model) disclosed in "RFC4364 BGP/MPLS IP Virtual Private Networks", and a layer 2 method disclosed in "RFC4762 Virtual Private LAN Service (VPLS) Using Label Distribution Protocol (LDP) Signaling". Those respective methods enable the connection between the networks of the layer 3 connection, and the connection between the networks of the layer 3 connection. The MPLS determines two labels of a first label indicative of destinations within the core network and a second label indicative of destinations of the hub networks according to a protocol using a border gateway protocol (BGP), within the core network. The MPLS forwards the packets within the core network by the aid of those labels. The device of the service provider adds an MPLS header including the first label and the second label to the packet that has arrived at the edge device from the certain hub network. The core network forwards the packet by using the added header therein. Then, the core network deletes the added MPLS header when finally delivering the packet to the hub network through the edge device which is an exit, and delivers the packet to the hub network of the destination. The layer 3 connection has one of the features that routing between the hubs of the customers is mediated by the service provider to facilitate the layer 3 connection of the customer. The layer 2 connection has one of the features that the layer 2 header and the information on the layer 3 or higher are forwarded to the packet of the customer without any change to enable the layer 2 communication between the hub networks. In that case, the connections between the service provider and the hub networks do not depend on the layer 3. The MPLS needs to operate and manage a complicated protocol, the costs are liable to increase, and the costs of the device are also frequently relatively expensive, because the protocol of the BGP or the MPLS is used to forward the packets between the hubs within the core network. Also, the edge device of the core network needs to hold multiple pieces of information including the label information, and needs to be a device that can hold large volume information.

A VPN using the MAC-in-MAC or the MPLS needs to conform the connection mode to any one of the layer 3 connection and the layer 2 connection in the connection between the hub networks of the customers and the core network of the service provider, for configuration of the VPN.

SUMMARY OF THE INVENTION

A first problem to be solved by the invention resides in that the above-mentioned VPN using the MAC-in-MAC or the MPLS needs to conform the connections of all the hub networks to any one of the layer 3 and the layer 2 in the connection between the hub networks of the customers and the service provider. Thus, the related art needs to select any one connection, and the degree of freedom in selection of the network configuration is generally low. Specifically, the first problem resides in that a configuration in which one hub network is layer-3-connected, another hub network is layer-2-connected, and those hub networks are connected to each other cannot be performed. Accordingly, there arises such a problem that, for example, the configuration in which the layer 3 routing of one hub network is mediated by the service provider to facilitate the operation and management of the customer, and another hub network is layer-2-connected and does not depend on the layer 3 is not performed.

In addition, when one customer needs to switch from the layer 3 connection to the layer 2 connection, and the vice versa, the connections cannot be sequentially changed for each of the hub networks, and the overall networks need to be switched all together. This causes such a problem that an influence of the operation is large because the overall networks must be stopped once when switching the networks.

A second problem to be solved by the present invention resides in that in the VPN using the MAC-in-MAC, the edge device of the service provider needs to hold all information such as the MAC address learning including another hub network through the core network, and needs a device that can hold large volume information, resulting in such a problem that it is difficult to reduce the costs of the edge device. At the same time, similarly, the edge device of the MPLS needs to be a device that can hold all of the information including other hub networks through the core network, and therefore a device that can hold large volume information is required, resulting in such a problem that it is difficult to reduce the costs of the edge device.

One object of the present invention is to solve the above problems, is to enable a communication between a hub network layer-3-connected to a core network and a hub network layer-2-connected to the core network, and to freely select a layer 3 connection method and a layer 2 connection method. Also, when there is a need to switch between the layer 3 connection and the layer 2 connection, a partial change is enabled to avoid the entire stop.

Another object of the present invention is to reduce the amount of information to be held by the edge device in the MAC-in-MAC and the MPLS, and enable a reduction in the costs of the edge device.

The present invention has been made to solve at least a part of the above-mentioned problems, and can be realized as the following aspects or applied examples.

Applied Example 1

A network device that belongs to a first network connected to a second network in a network where VPNs are configured by the first network that is connected to the VPNs, and conducts packet forwarding between hubs of the VPNs, a second network that is layer-3-connected to the first network, and a third network that is layer-2-connected to the first network, includes a fourth function for searching an address of a destination belonging to the third network through the first network, saving information on the destination, and saving a correspondence of information on the network device belonging to the first network that is connected to the third network which is a relay point to the destination, and the information on the destination at the same time, and a fifth function that stores two pieces of information of the destination belonging to the third network and the information on the destination of the network belonging to the first network connected to the third network in a packet at the same time. In the network device, when the packet is transmitted to the destination belonging to the third network, the packet forwarding processing by the layer 3 is conducted. With the use of the destination information by the fourth function and the information on the network device belonging to the first network connected to the third network which is a relay point to the destination, two pieces of the information on the network device belonging to the first network connected to the third network by the fifth function and the information on the packet destination are stored in the destination information of the packet at the same time, for conducting the packet forwarding.

In the network device according to the applied example 1, the communication between the hub network layer-3-connected to the core network and the hub network layer-2-connected to the core network can be performed. As a result, a layer 3 connection method and a layer 2 connection method can be freely selected. With this configuration, when there is a need to switch between the layer 3 connection and the layer 2 connection, a partial change is enabled to avoid the entire stop.

Applied Example 2

In the network device according to the applied example 1, the first network is connected to the VPN by MAC-in-MAC, and the destination information by the address search of the fourth function is MAC address information. A correspondence between the information on the network device belonging to the first network connected to the third network which is the relay point to the destination and the destination information represents a correspondence between the source MAC address of the MAC-in-MAC header of the packet of the destination address search and the IP address of the destination. When the packet is transmitted to the destination belonging to the third network, the packet forwarding processing by the layer 3 is conducted, and two pieces of information are stored in the destination information of the packet at the same time, by using the source MAC address of the MAC-in-MAC header of the packet of the destination address search and the MAC address of the destination, by the fifth function, to conduct the packet forwarding.

In the network device according to the applied example 2, in the configuration of the applied example 1, the MAC-in-MAC system can be used for the core network. Because the MAC-in-MAC does not use a specific protocol for packet forwarding between the hubs within the core network, the network operation and the management can be conducted with relatively low costs. Also, with the relatively low costs of the device, the network can be constructed. Also, with this configuration, the layer 3 VPN can be connected to the MAC-in-MAC network intended for layer 2 communication.

Applied Example 3

In the network device according to the applied example 1, the first network is connected to the VPN by the MPLS, and the destination information by the address search of the fourth function is MAC address information. A correspondence between the information on the network device belonging to the first network connected to the third network which is the relay point to the destination and the destination information represents a correspondence between the input label information on the packet of the destination address search and the IP address of the destination. When the packet is transmitted to the destination belonging to the third network, the packet forwarding processing by the layer 3 is conducted, and two pieces of information are stored in the destination information of the packet by the fifth function at the same time, by using the output label corresponding to the input label by the fourth function, and the MAC address of the destination, to conduct the packet forwarding.

In the network device according to the applied example 3, in the configuration of the applied example 1, the system of the MPLS can be used for the core network. The VPN of the different systems can be additionally connected to the layer 3 VPN or the layer 2 VPN constructed by the MPLS.

Applied Example 4

In the network device according to the applied example 1, when the packet forwarding processing according to the layer 3 is conducted in the fifth function, the IP header is not changed at all.

In the network device according to the applied example 4, in the configuration of the applied example 1, when the communication is conducted between the layer 2 VPNs, the packet that has passed through the network device is relayed so that the network device connecting the layer 2 VPN does not need to hold the information on the communication destination. As a result, the amount of information to be held by the edge device in the MAC-in-MAC and the MPLS can be reduced to enable a reduction in the costs of the edge device.

Applied Example 5

A network system includes a network in which a first network that is connected to VPNs, and conducts packet forwarding between hubs of the VPNs, a second network that is layer-3-connected to the first network, and a third network that is layer-2-connected to the first network configure the VPNs, and a network device belonging to the first network connected to the second network. The network device includes a fourth function for searching an address of a destination belonging to the third network through the first network, saving information on the destination, and saving a correspondence between information on the network device belonging to the first network that is connected to the third network which is a relay point to the destination, and the information on the destination at the same time, and a fifth function that stores two pieces of information of the destination belonging to the third network and the information on the destination of the network belonging to the first network connected to the third network in a packet at the same time, conducts the packet forwarding processing by the layer 3, and stores two pieces of the information on the network device belonging to the first network connected to the third network and the information on the destination of the packet in the destination information of the packet at the same time, by using the information on the destination by the fourth function, and the information on the network device belonging to the first network connected to the third network which is the relay point to the destination, for conducting the packet forwarding.

In the network device according to the applied example 5, a communication can be conducted between a hub network layer-3-connected to the core network and a hub network layer-2-connected to the core network. As a result, a layer 3 connection method and a layer 2 connection method can be freely selected. With this configuration, when there is a need to switch between the layer 3 connection and the layer 2 connection, a partial change is enabled to avoid the entire stop.

According to the first solving means of the present invention, there is provided a network system and a virtual network connection method in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network system includes a first network device (PE1) that is connected to the second network and belongs to the first network, the PE1 includes:

a forwarding table that stores an IP address of a destination, an output interface (IF), a next hop and a MAC address of a destination network device (PE) in association with a VPN number; and a terminal information table that stores the IP address and a MAC address of the destination in association with the VPN number, the method comprising:

in the PE1, receiving a first packet from the first terminal toward the second terminal;

searching the forwarding table by using the VPN number and the IP address of the destination second terminal on the basis of the first packet, temporarily saving the first packet if there is no output IF and/or no MAC address of a destination second network device (PE2) necessary for packet forwarding, and transmitting an ARP request packet to the second terminal through the first network;

receiving an ARP reply packet from the second terminal through the first network in response to the ARP request packet;

storing the output IF and the MAC address of the destination PE2 in association with the VPN number and the destination IP address on the basis of the ARP reply packet, on the forwarding table, and storing and updating VLAN number, and the IP address and the MAC address of the destination second terminal in association with the VPN number on the terminal information table;

creating a second packet in which a header having the MAC address of the destination PE2, the MAC address of the source PE1, the VPN number, the MAC address of the destination second terminal, the MAC address of the source PE1, and the VLAN number for the first packet temporarily saved is added to the IP packet included in the first packet, by using the updated forwarding table and terminal information table; and transmitting the second packet to the second terminal through the first network.

According to the second solving means of the present invention, there is provided a network system and a virtual network connection method in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network system includes a first network device (PE1) that is connected to the second network and belongs to the first network, the PE1 includes:

a forwarding table that stores an IP address of a destination, an output interface (IF), a next hop and a MAC address of a destination network device (PE) in association with a VPN number; and a terminal information table that stores the IP address and a MAC address of the destination in association with the VPN number, the method comprising:

in the PE1, receiving a first packet from the second terminal toward the first terminal;

searching the forwarding table by using the VPN number and the IP address of the destination first terminal on the basis of the first packet, obtaining that a subsequent forwarding destination is a network device (CE1) of the third network, searching the terminal information table for the CE1, temporarily saving the packet if there is no entry necessary for packet forwarding, and transmitting an ARP request packet to the CE1 toward the second network;

receiving an ARP reply packet from the CE1 in response to the ARP request packet;

storing and updating the VLAN number, the IP address and the MAC address of the destination CE1 in association with the VPN number on the terminal information table on the basis of the ARP reply packet;

creating a second packet in which a header having the MAC address of the destination CE1, the MAC address of the source PE1, and the VLAN number for the first packet temporarily saved is added to the IP packet included in the first packet, by using the updated terminal information table; and transmitting the second packet to the first terminal through the CE1.

According to the third solving means of the present invention, there is provided a network system and a virtual network connection method in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network system includes a first network device (PE1) that is connected to the second network and belongs to the first network, the PE1 including:

a forwarding table that stores an IP address of a destination, an output interface (IF), a next hop, and an output level in association with a VPN number;

a terminal information table that stores the IP address and the MAC address of the destination in association with the VPN number;

an MPLS information table that stores the VLAN number, the output level, the input label, and the interface (IF) in association with the VPN number, the method comprising:

in the PE1, receiving a first packet of an MPLS from the first terminal toward the second terminal;

searching the forwarding table by using the VPN number and the IP address of the destination second terminal on the basis of the first packet, temporarily saving the first packet if there is no output IF and/or no MAC address of a destination second network device (PE2) necessary for packet forwarding, and transmitting an ARP request packet to the second terminal through the first network;

receiving an ARP reply packet from the second terminal through the first network in response to the ARP request packet;

searching the MPLS information table from the input label of the MPLS information included in the first packet to obtain the output label;

storing and updating the VLAN number, the IP address and the MAC address of the destination second terminal in association with the VPN number on the terminal information table on the basis of the ARP reply packet; and creating a second packet in which a header having the MPLS information, the MAC address of the destination second terminal, the MAC address of the source PE1, and the VLAN number for the first packet temporarily saved is added to the IP packet included in the first packet, by using the updated terminal information table and terminal information table; and transmitting the second packet to the second terminal through the first network.

According to the fourth solving means of the present invention, there is provided a network system and a virtual network connection method in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network system includes a first network device (PE1) that is connected to the second network and belongs to the first network, the PE1 includes:

a forwarding table that stores an IP address of a destination terminal, an output interface (IF), a next hop, and a MAC address of a destination network device (PE) in association with a VPN number;

a terminal information table that stores the IP address and the MAC address of the destination in association with the VPN number;

an MPLS information table that stores the VLAN number, the output label, the input label, and the interface (IF) in association with the VPN number, the method comprising:

in the PE1, receiving a first packet of an MPLS from the second terminal toward the first terminal;

searching the MPLS information table on the basis of the first packet to obtain the VPN number according to the interface and an input label included the MPLS information, searching the forwarding table by using the VPN number and the IP address of the destination first terminal included in the first packet, obtaining that a subsequent forwarding destination is the network device (CE1) of the third network, searching the terminal information table for the CE1, temporarily saving the packet if there is no entry necessary for packet forwarding, and transmitting the ARP request packet to the CE1 toward the second network;

receiving an ARP reply packet from the CE1 in response to the ARP request packet;

storing and updating the VLAN number, the IP address and the MAC address of the destination CE1 in association with the VPN number on the terminal information table on the basis of the ARP reply packet;

creating a second packet in which a header having the MAC address of the destination CE1, the MAC address of the source PE1, and the VLAN number for the first packet temporarily saved is added to the IP packet included in the first packet, by using the updated terminal information table; and transmitting the second packet to the first terminal through the CE1.

According to the fifth solving means of the present invention, there is provided a network device in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network device (PE1) that is connected to the second network and belongs to the first network, the network device (PE1) includes:

a forwarding table that stores an IP address of a destination, an output interface (IF), a next hop and a MAC address of a destination network device (PE) in association with a VPN number;

a terminal information table that stores the IP address and a MAC address of the destination in association with the VPN number; and a processor that forwards the packet by using the forwarding table and the terminal information table, wherein:

the PE1 receiving a first packet from the first terminal toward the second terminal;

the processor searching the forwarding table by using the VPN number and the IP address of the destination second terminal on the basis of the first packet, temporarily saving the first packet if there is no output IF and/or no MAC address of a destination second network device (PE2) necessary for packet forwarding, and transmitting an ARP request packet to the second terminal through the first network;

the processor receiving an ARP reply packet from the second terminal through the first network in response to the ARP request packet;

the processor storing the output IF and the MAC address of the destination PE2 in association with the VPN number and the destination IP address on the basis of the ARP reply packet, on the forwarding table, and storing and updating VLAN number, and the IP address and the MAC address of the destination second terminal in association with the VPN number on the terminal information table;

the processor creating a second packet in which a header having the MAC address of the destination PE2, the MAC address of the source PE1, the VPN number, the MAC address of the destination second terminal, the MAC address of the source PE1, and the VLAN number for the first packet temporarily saved is added to the IP packet included in the first packet, by using the updated forwarding table and terminal information table; and the PE1 transmitting the second packet to the second terminal through the first network.

According to the sixth solving means of the present invention, there is provided a network device in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network device (PE1) that is connected to the second network and belongs to the first network, the network device (PE1) includes:

a forwarding table that stores an IP address of a destination, an output interface (IF), a next hop and a MAC address of a destination network device (PE) in association with a VPN number;

a terminal information table that stores the IP address and a MAC address of the destination in association with the VPN number; and a processor that forwards the packet by using the forwarding table and the terminal information table, wherein:

the PE1 receiving a first packet from the second terminal toward the first terminal;

the processor searching the forwarding table by using the VPN number and the IP address of the destination first terminal on the basis of the first packet, obtaining that a subsequent forwarding destination is a network device (CE1) of the third network, searching the terminal information table for the CE1, temporarily saving the packet if there is no entry necessary for packet forwarding, and transmitting an ARP request packet to the CE1 toward the second network;

the processor receiving an ARP reply packet from the CE1 in response to the ARP request packet;

the processor storing and updating the VLAN number, the IP address and the MAC address of the destination CE1 in association with the VPN number on the terminal information table on the basis of the ARP reply packet;

the processor creating a second packet in which a header having the MAC address of the destination CE1, the MAC address of the source PE1, and the VLAN number for the first packet temporarily saved is added to the IP packet included in the first packet, by using the updated terminal information table; and the processor transmitting the second packet to the first terminal through the CE1.

According to the seventh solving means of the present invention, there is provided a network device in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network device (PE1) that is connected to the second network and belongs to the first network, the network device (PE1) including:

a forwarding table that stores an IP address of a destination, an output interface (IF), a next hop, and an output level in association with a VPN number;

a terminal information table that stores the IP address and the MAC address of the destination in association with the VPN number;

an MPLS information table that stores the VLAN number, the output level, the input label, and the interface (IF) in association with the VPN number; and a processor that forwards the packet by using the forwarding table and the terminal information table, wherein:

the PE1 receiving a first packet of an MPLS from the first terminal toward the second terminal;

the processor searching the forwarding table by using the VPN number and the IP address of the destination second terminal on the basis of the first packet, temporarily saving the first packet if there is no output IF and/or no MAC address of a destination second network device (PE2) necessary for packet forwarding, and transmitting an ARP request packet to the second terminal through the first network;

the processor receiving an ARP reply packet from the second terminal through the first network in response to the ARP request packet;

the processor searching the MPLS information table from the input label of the MPLS information included in the first packet to obtain the output label;

the processor storing and updating the VLAN number, the IP address and the MAC address of the destination second terminal in association with the VPN number on the terminal information table on the basis of the ARP reply packet; and the processor creating a second packet in which a header having the MPLS information, the MAC address of the destination second terminal, the MAC address of the source PE1, and the VLAN number for the first packet temporarily saved is added to the IP packet included in the first packet, by using the updated terminal information table and terminal information table; and the PE1 transmitting the second packet to the second terminal through the first network.

According to the eighth solving means of the present invention, there is provided a network device in a network system configuring VPNs and including:

a first network that is connected to the VPNs and conducts packet forwarding between hubs of the VPNs;

a second network that has a first terminal and is layer-3-connected to the first network; and a third network that has a second terminal and is layer-2-connected to the first network, wherein the network device (PE1) that is connected to the second network and belongs to the first network, the network device (PE1) including:

a forwarding table that stores an IP address of a destination terminal, an output interface (IF), a next hop, and a MAC address of a destination network device (PE) in association with a VPN number;

a terminal information table that stores the IP address and the MAC address of the destination in association with the VPN number;

an MPLS information table that stores the VLAN number, the output label, the input label, and the interface (IF) in association with the VPN number; and a processor that forwards the packet by using the forwarding table and the terminal information table, wherein:

the PE1 receiving a first packet of an MPLS from the second terminal toward the first terminal;

the processor searching the MPLS information table on the basis of the first packet to obtain the VPN number according to the interface and an input label included the MPLS information, searching the forwarding table by using the VPN number and the IP address of the destination first terminal included in the first packet, obtaining that a subsequent forwarding destination is the network device (CE1) of the third network, searching the terminal information table for the CE1, temporarily saving the packet if there is no entry necessary for packet forwarding, and transmitting the ARP request packet to the CE1 toward the second network;

the processor receiving an ARP reply packet from the CE1 in response to the ARP request packet;

the processor storing and updating the VLAN number, the IP address and the MAC address of the destination CE1 in association with the VPN number on the terminal information table on the basis of the ARP reply packet;

the processor creating a second packet in which a header having the MAC address of the destination CE1, the MAC address of the source PE1, and the VLAN number for the first packet temporarily saved is added to the IP packet included in the first packet, by using the updated terminal information table; and the PE1 transmitting the second packet to the first terminal through the CE1.

The present invention has the following advantages.

According to the present invention, a communication between the hub network layer-3-connected to the core network and the hub network layer-2-connected to the core network can be conducted to enable the layer 3 connection method and the layer 2 connection method to be freely selected.

Also, according to the present invention, with the above configuration, when there is a need to switch between the layer 3 connection and the layer 2 connection, a partial change is enabled to avoid the entire stop.

The other advantage of the present invention is to reduce the amount of information to be held by the edge device in the MAC-in-MAC and the MPLS so as to reduce the costs of the edge device.

BRIEF DESCRIPTION OF THE DRAWINGS

FIG. 2 is an illustrative view illustrating formats of packets used in the network system of FIG. 1;

FIG. 4 is an illustrative view of an interface information table 321 illustrated in FIG. 3;

FIG. 5 is an illustrative view of an L2VPN information table 322 illustrated in FIG. 3;

FIG. 6 is an illustrative view of a route control information table 323 illustrated in FIG. 3;

FIG. 7 is an illustrative view of a forwarding table 324 illustrated in FIG. 3;

Figure 17:
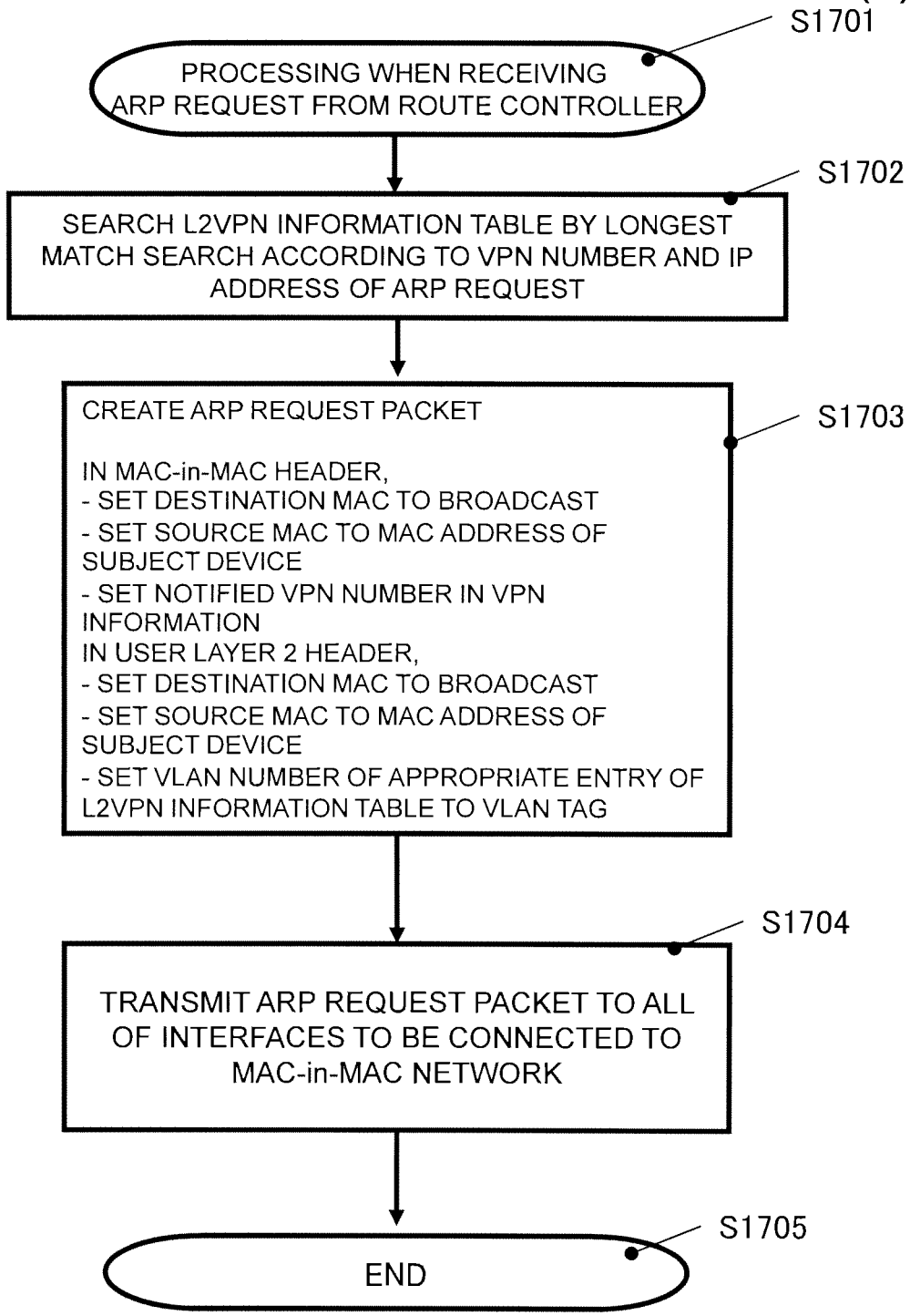
Figure 18:
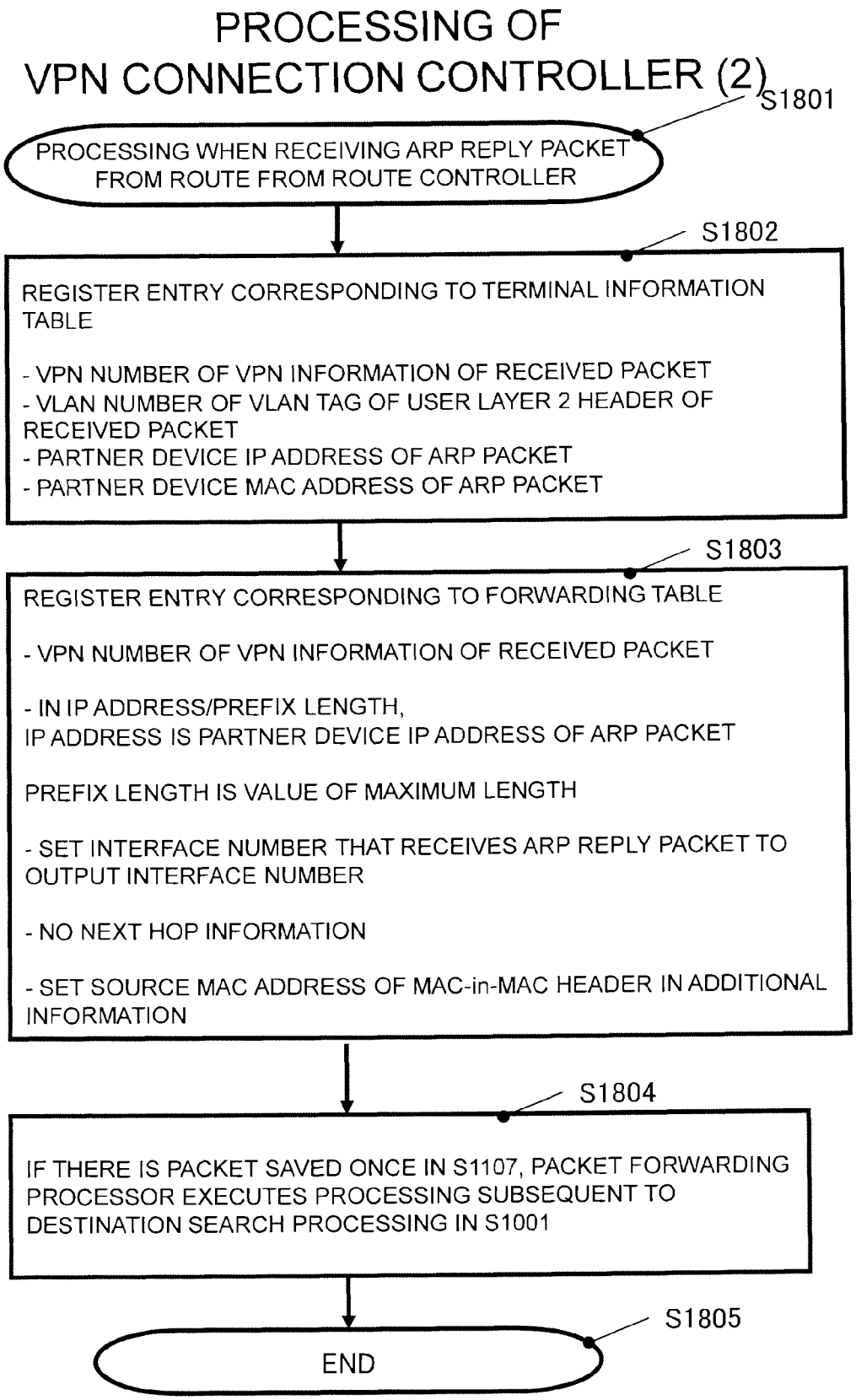
Figure 19:
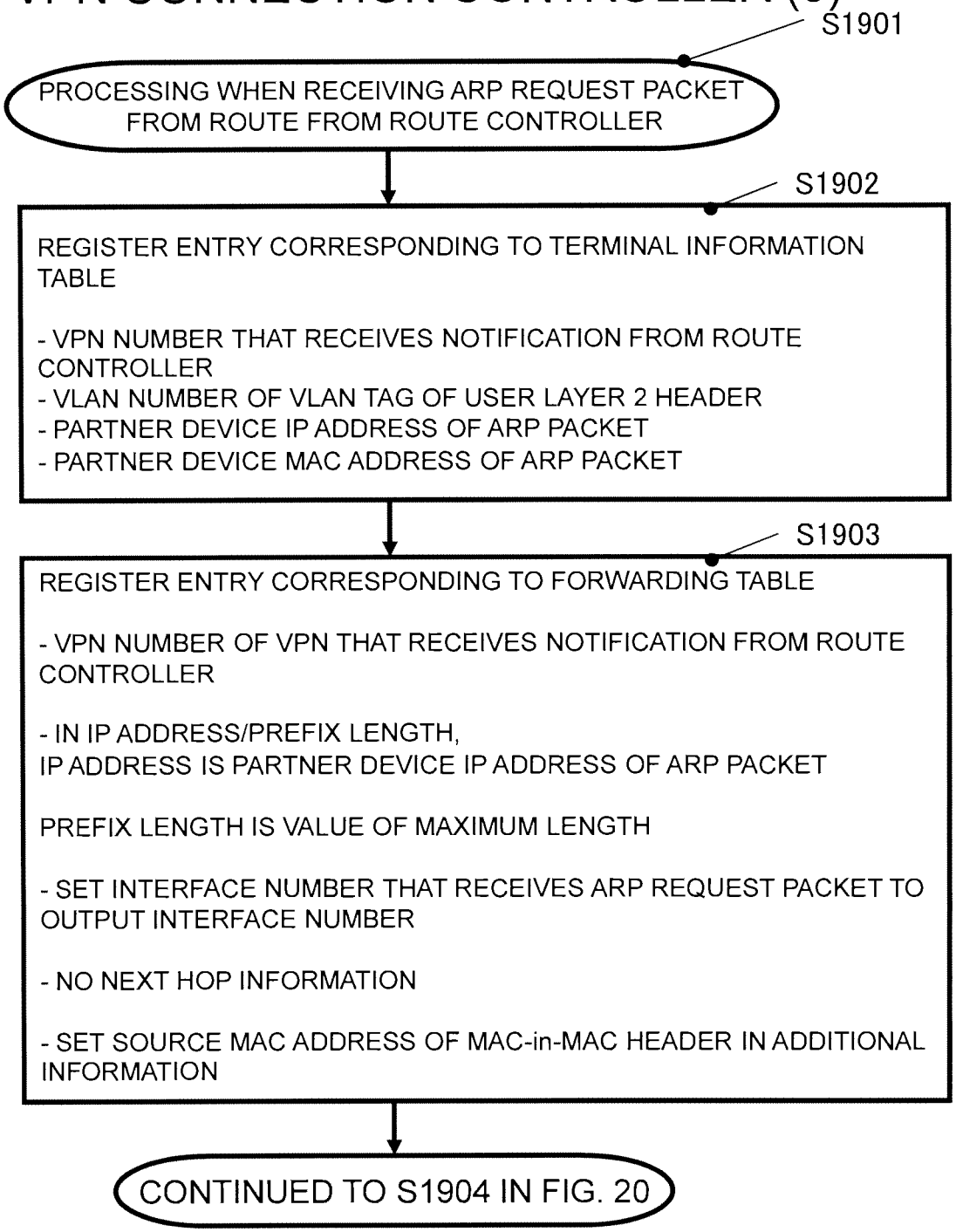
Figure 20:
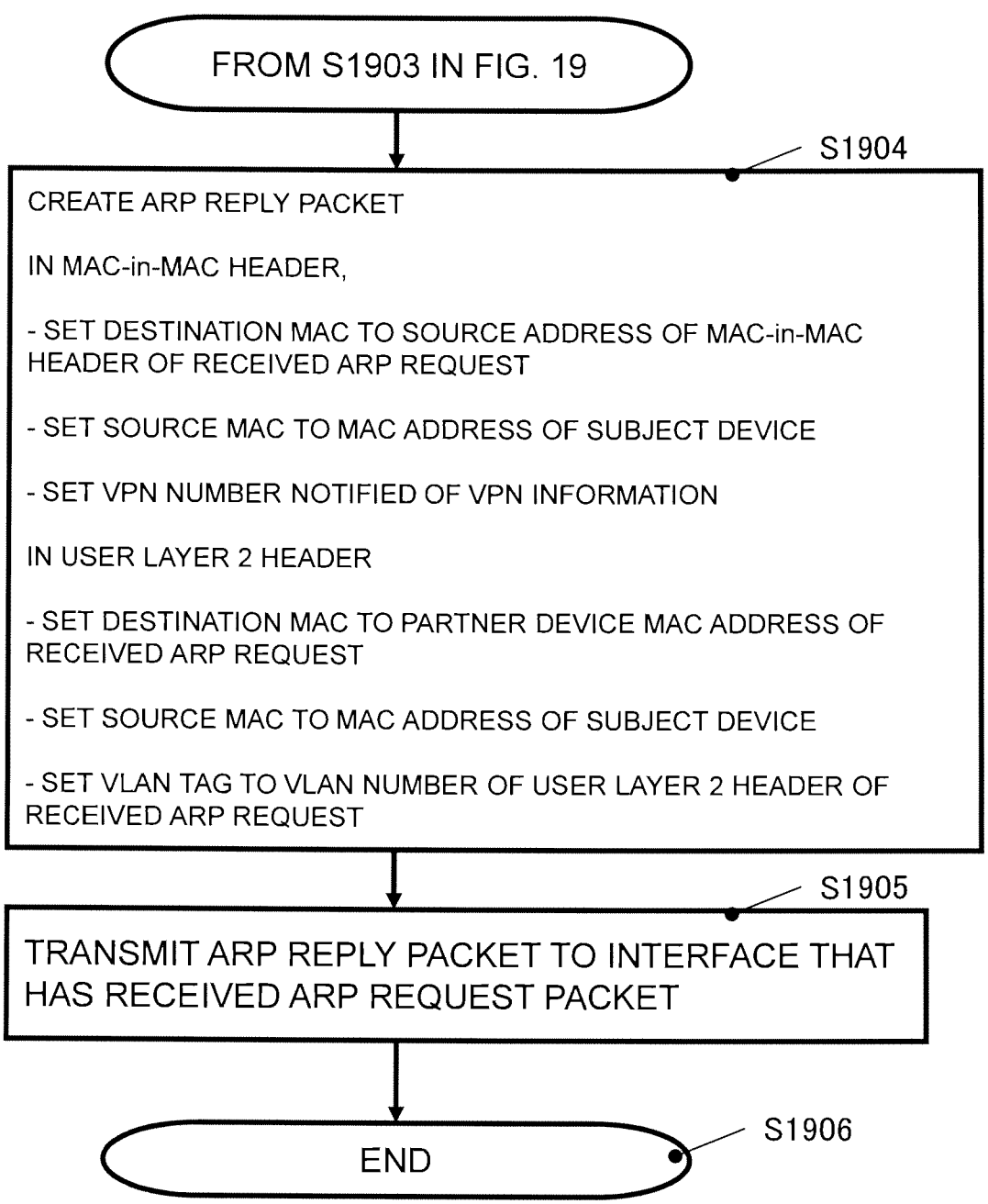
Figure 21:
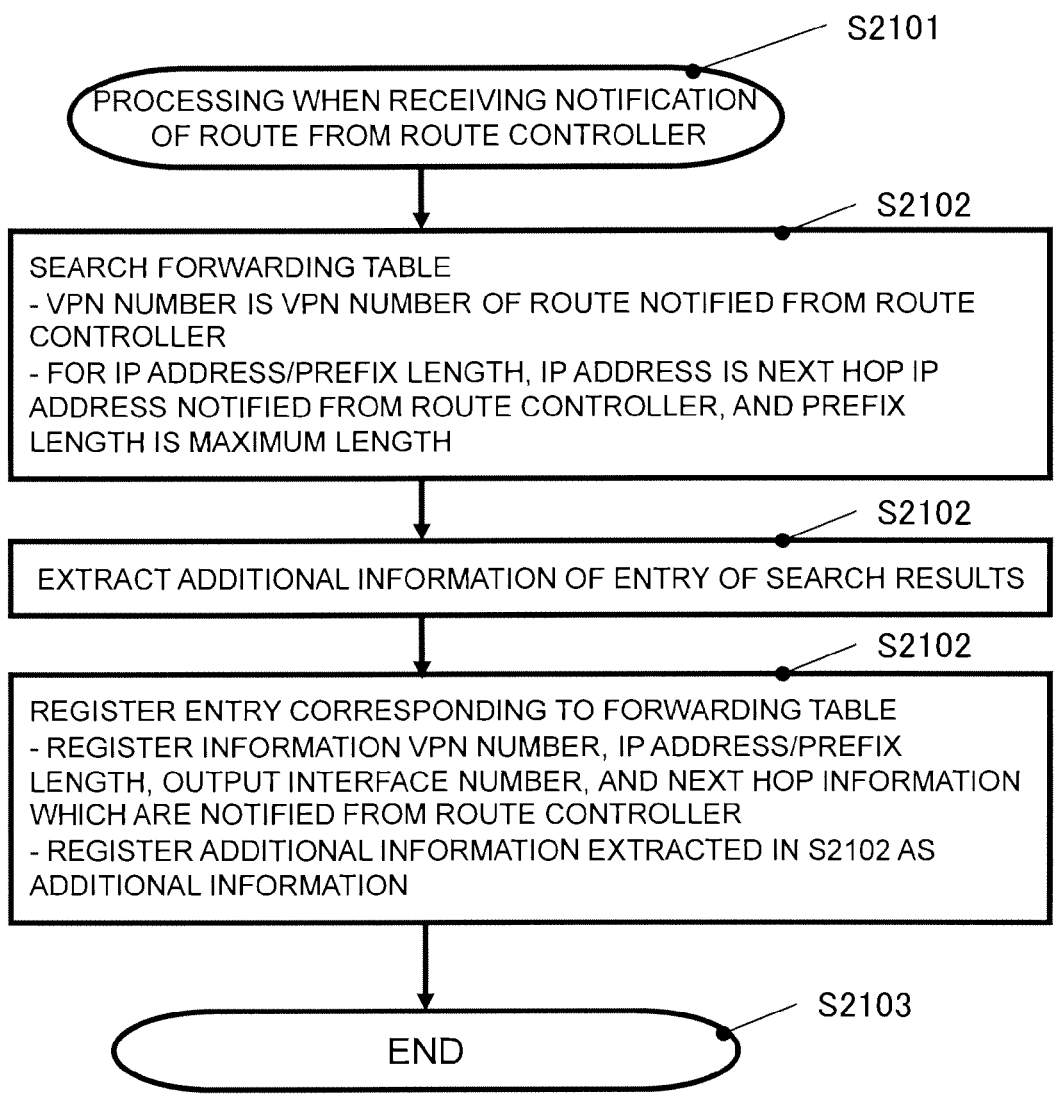
Figure 22:
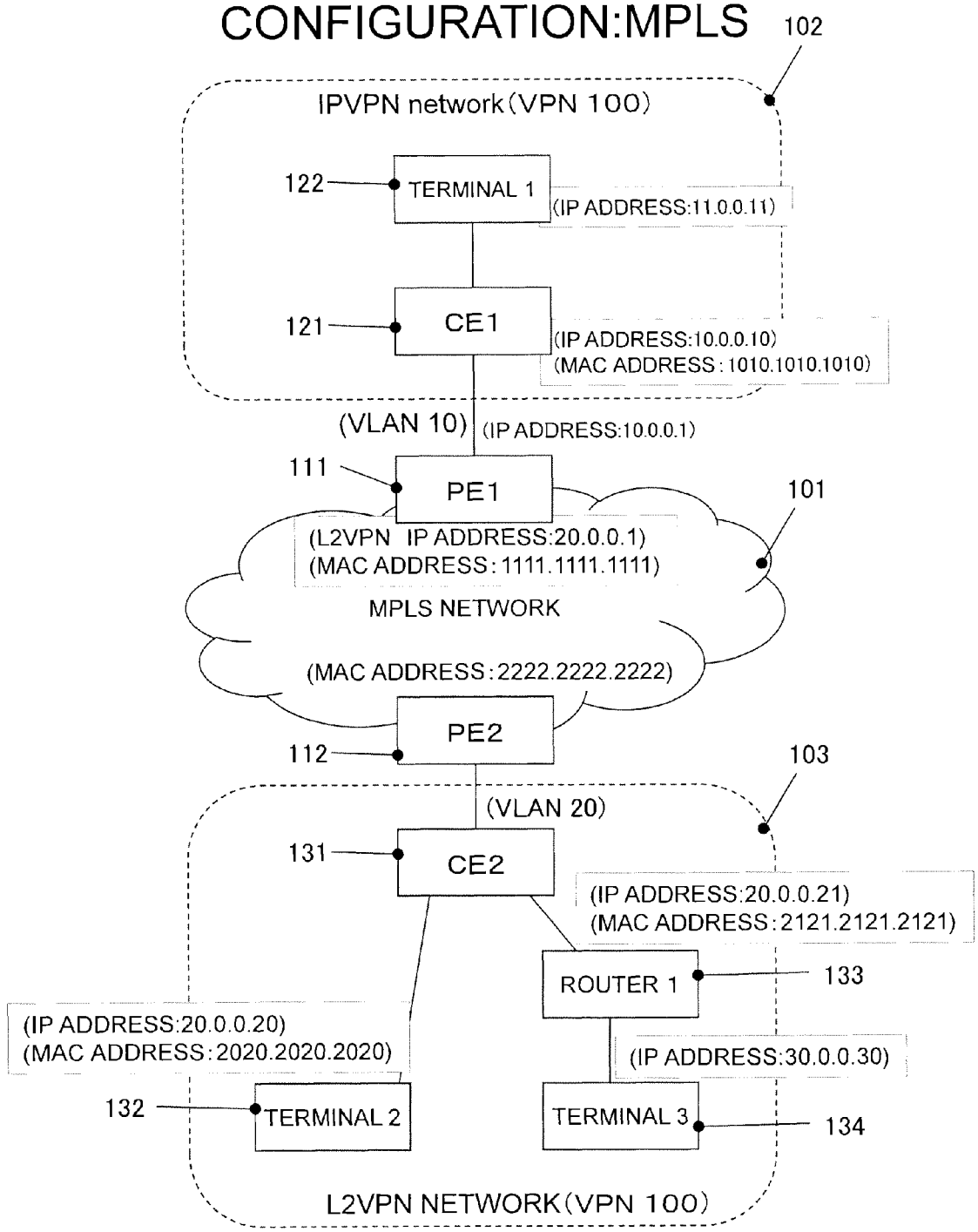
Figure 24:
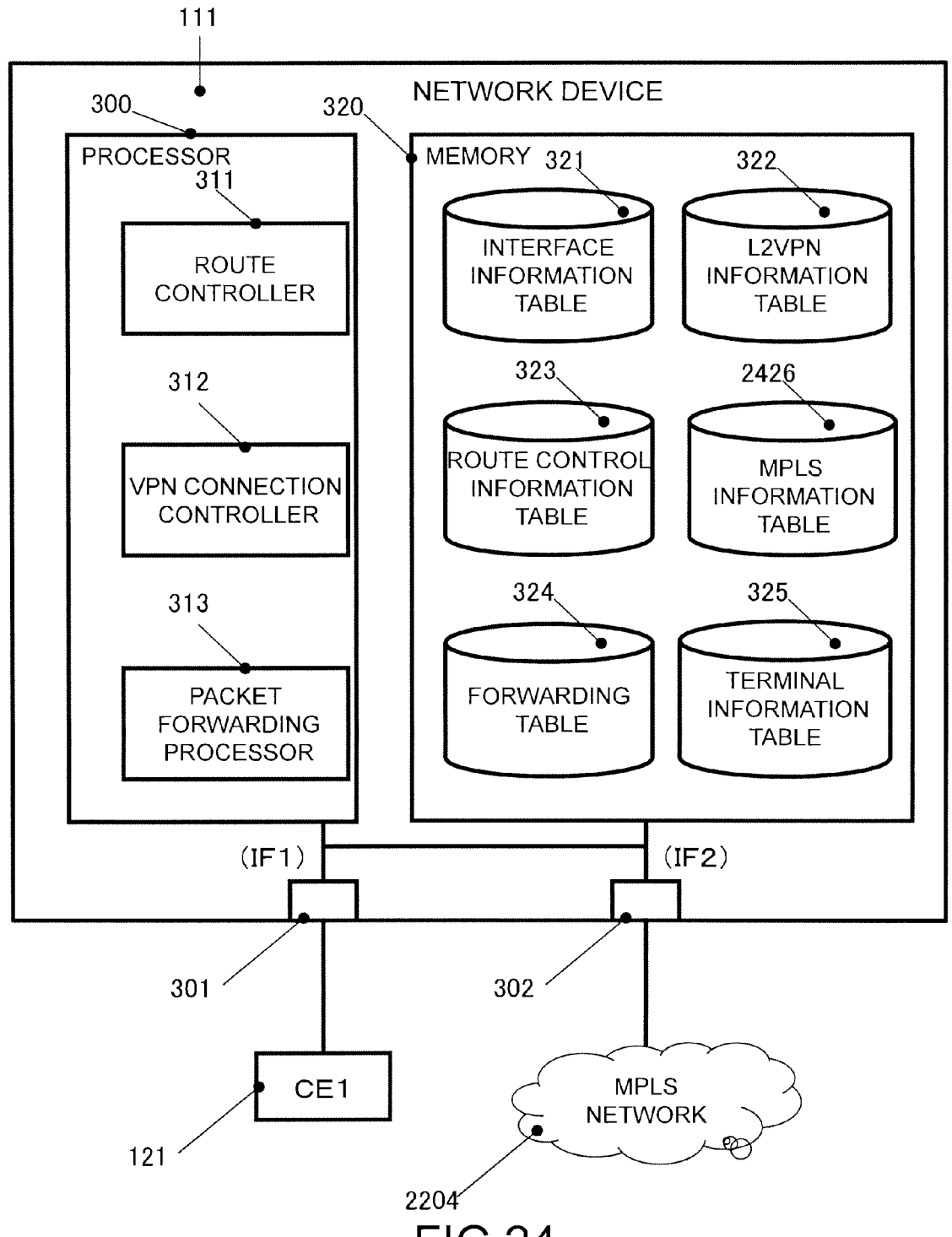
Figure 28:
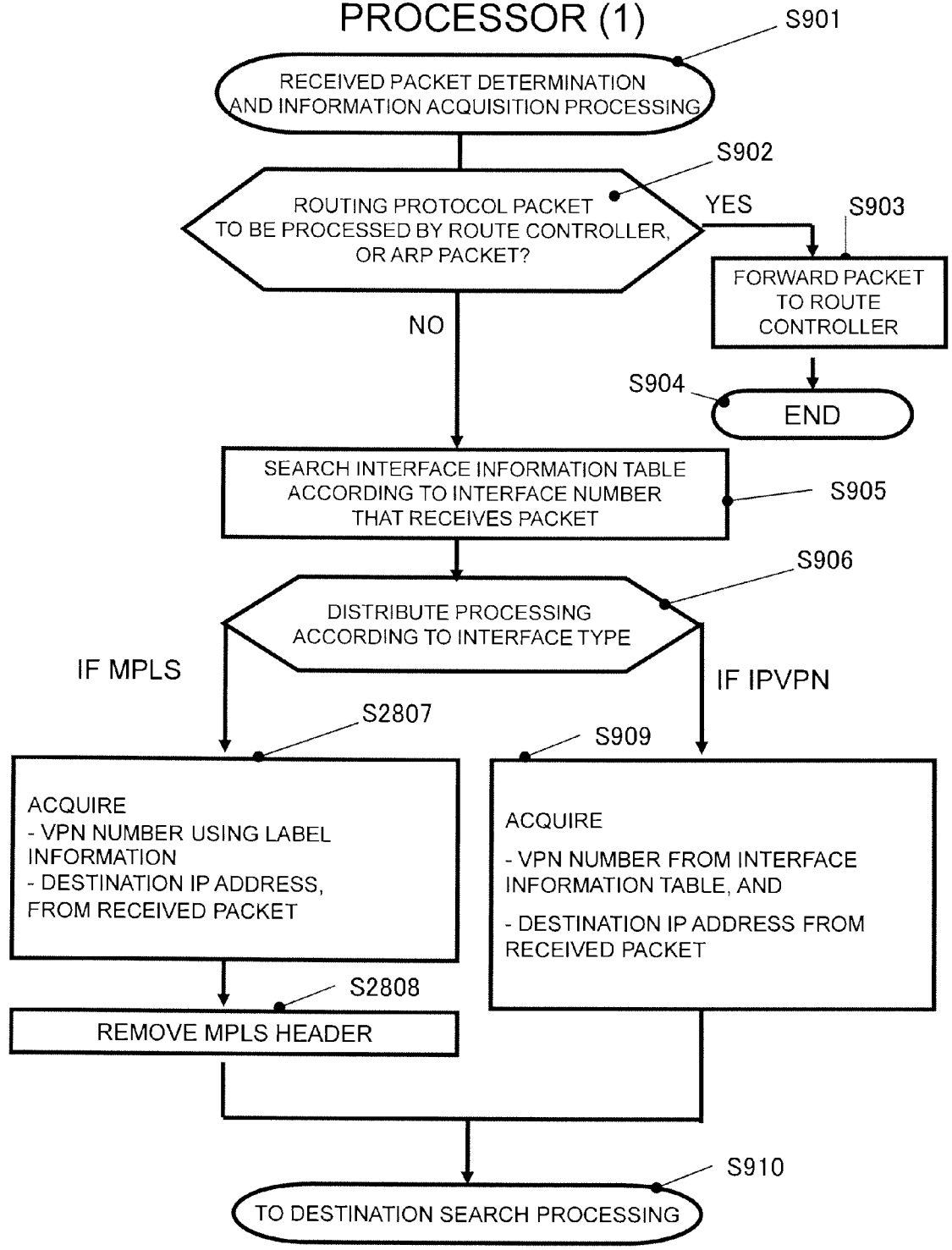
Figure 29:
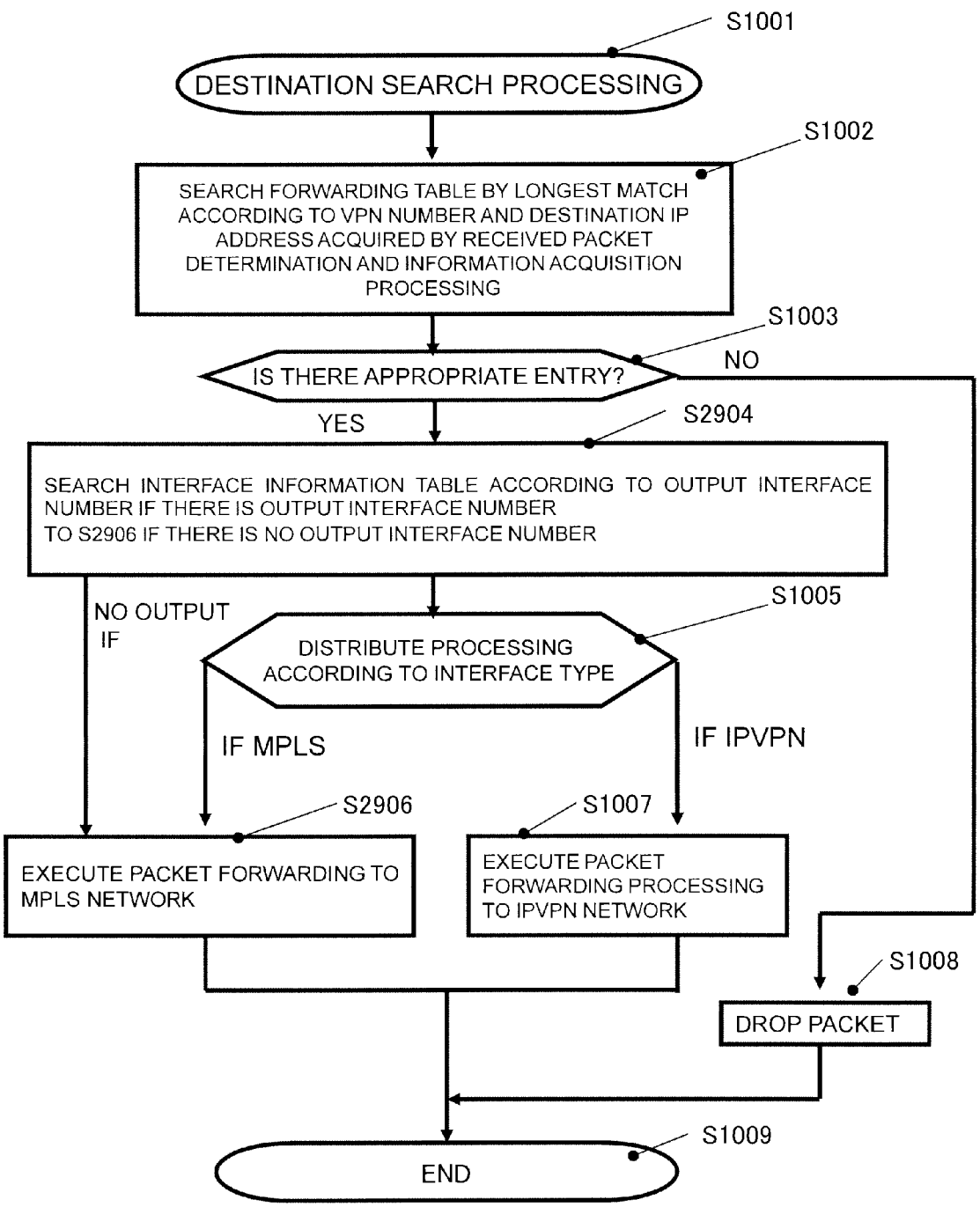
Figure 30:
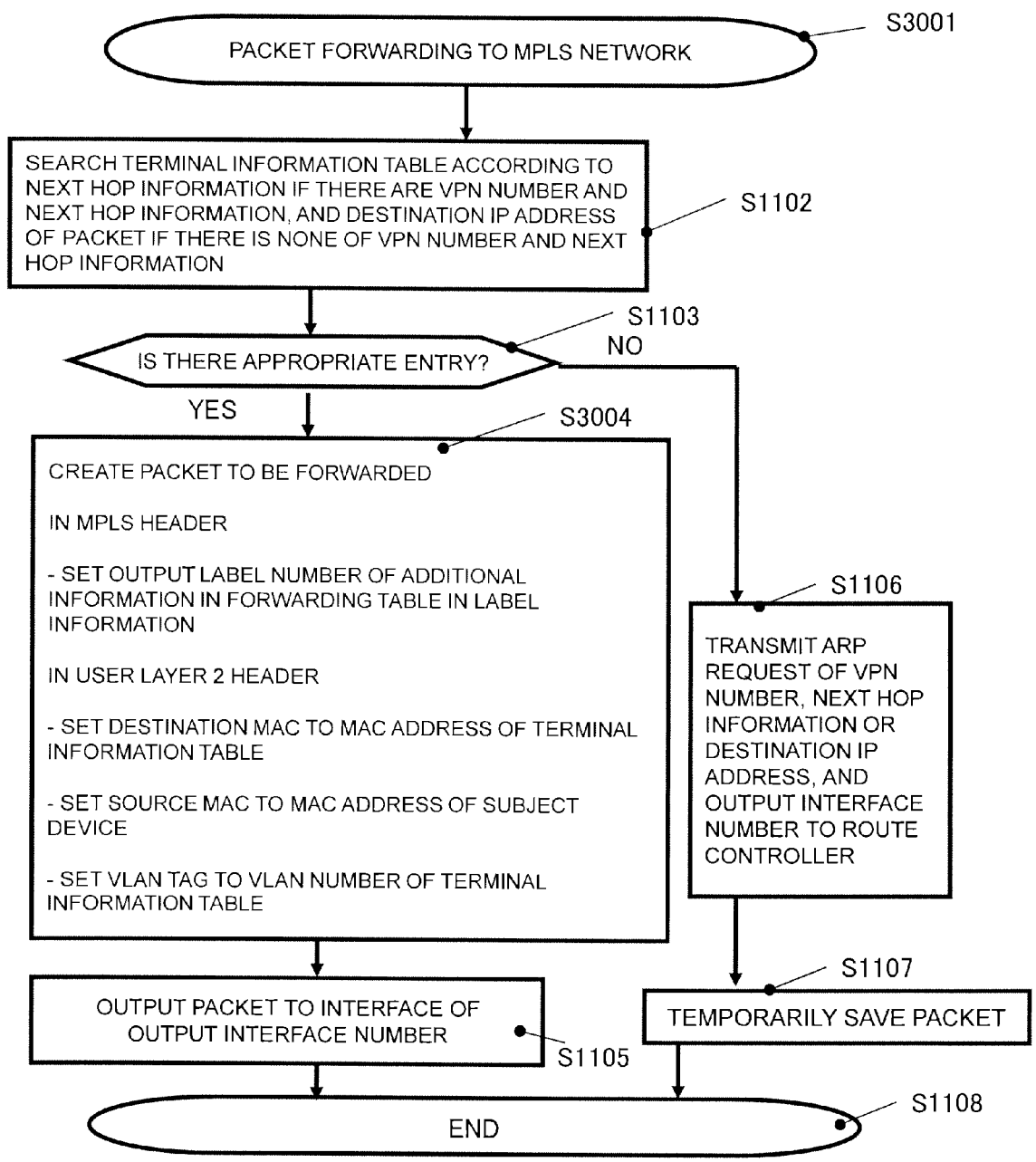
Figure 31:
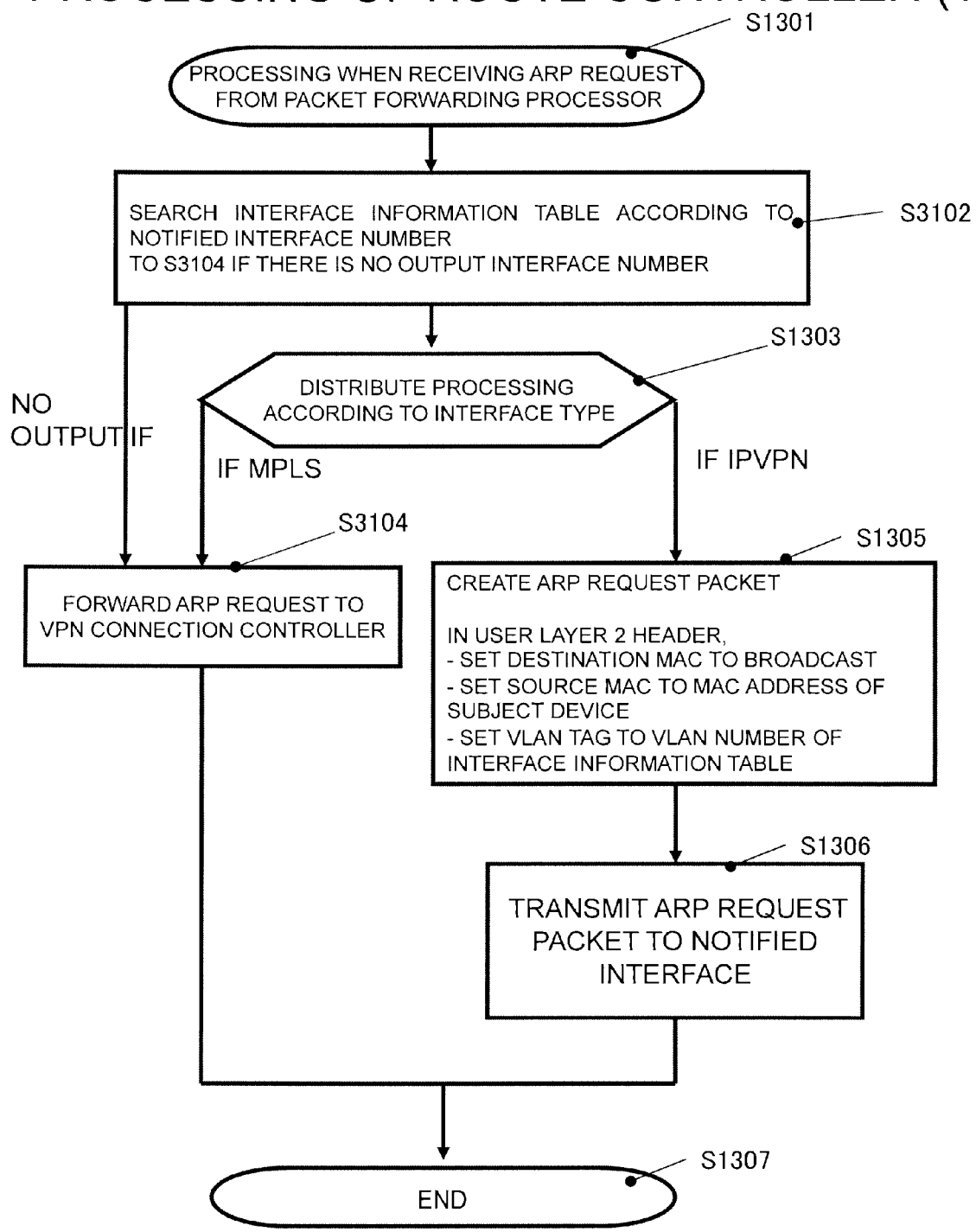
Figure 32:
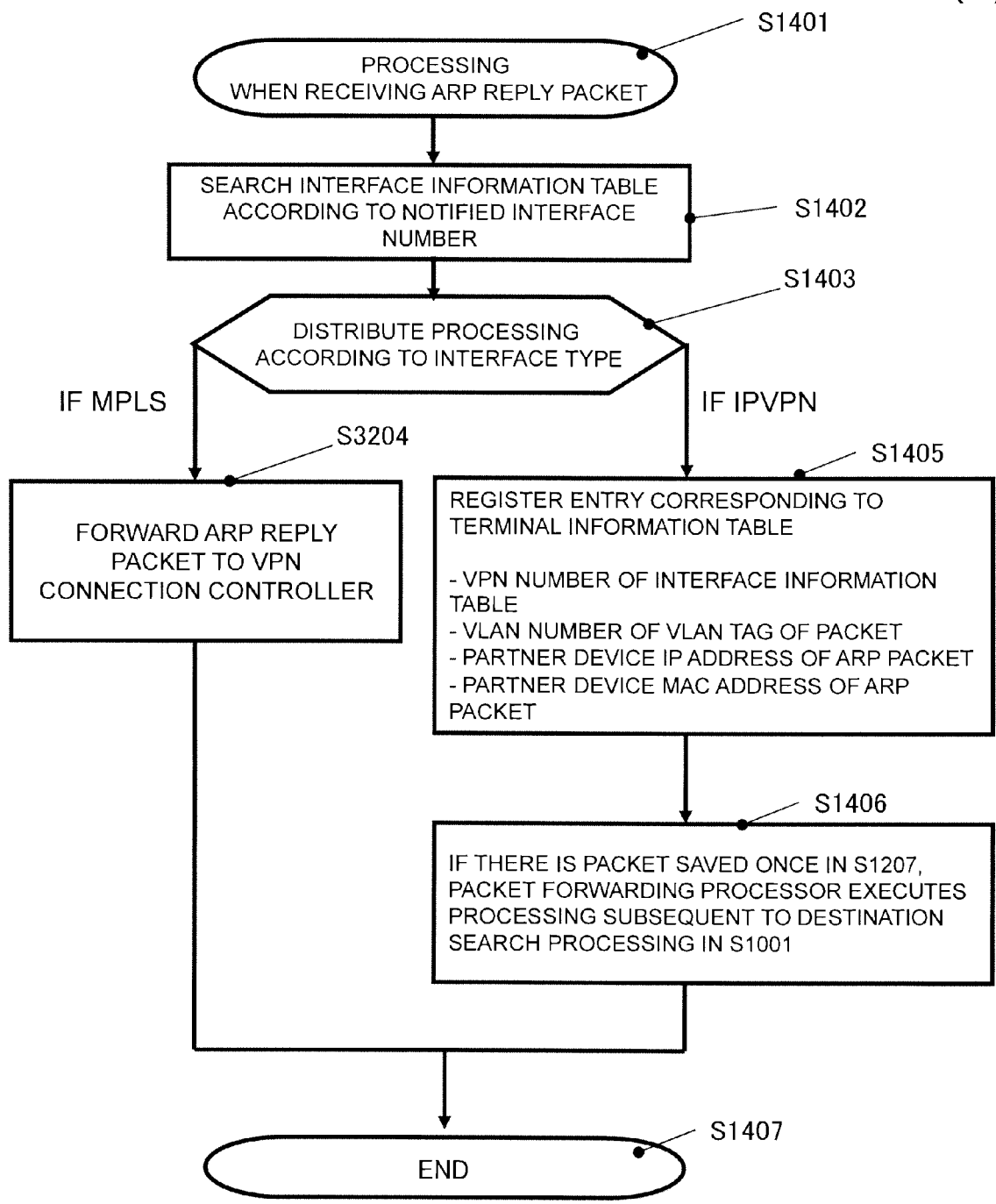
Figure 33:
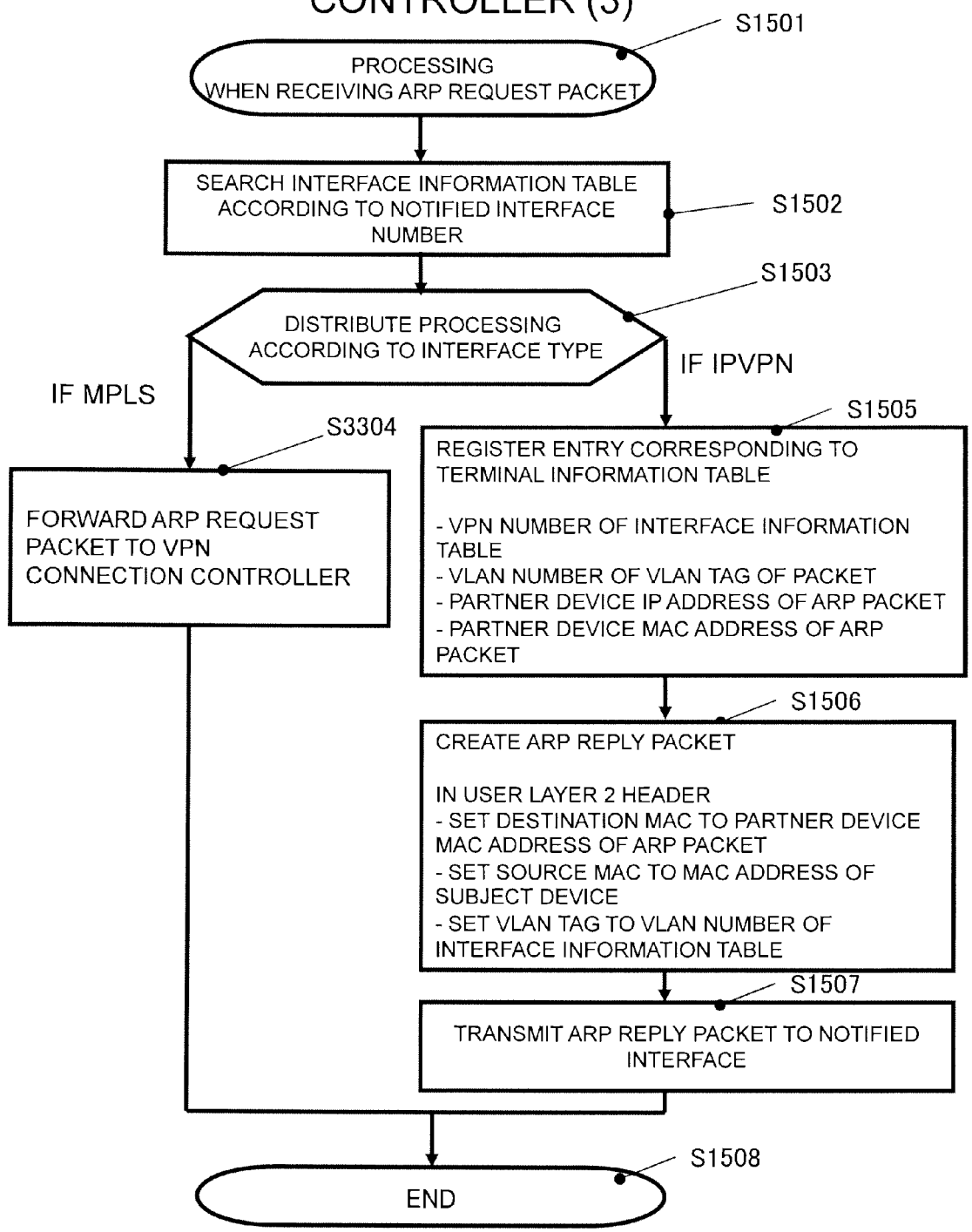
Figure 34:
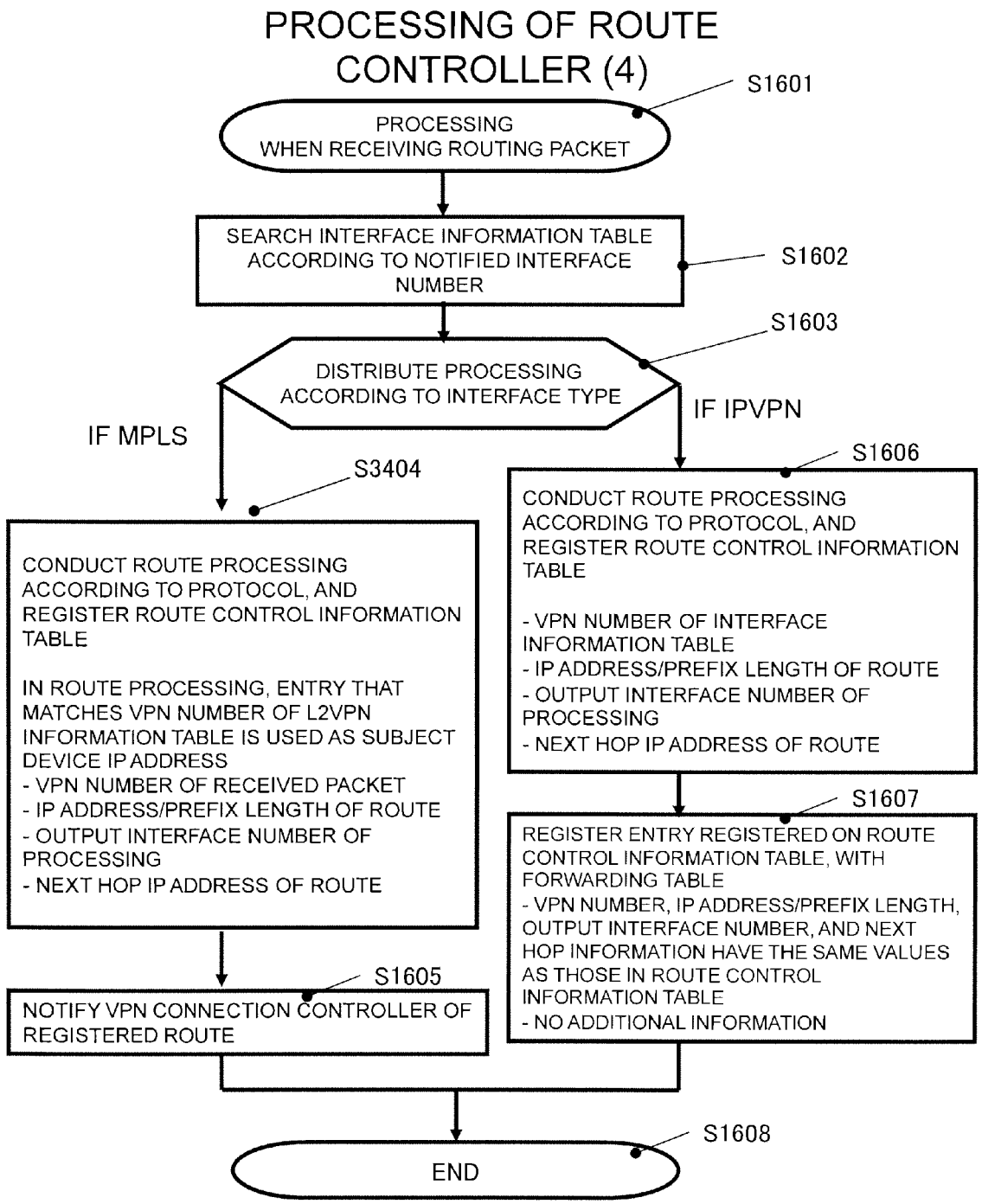
Figure 35:
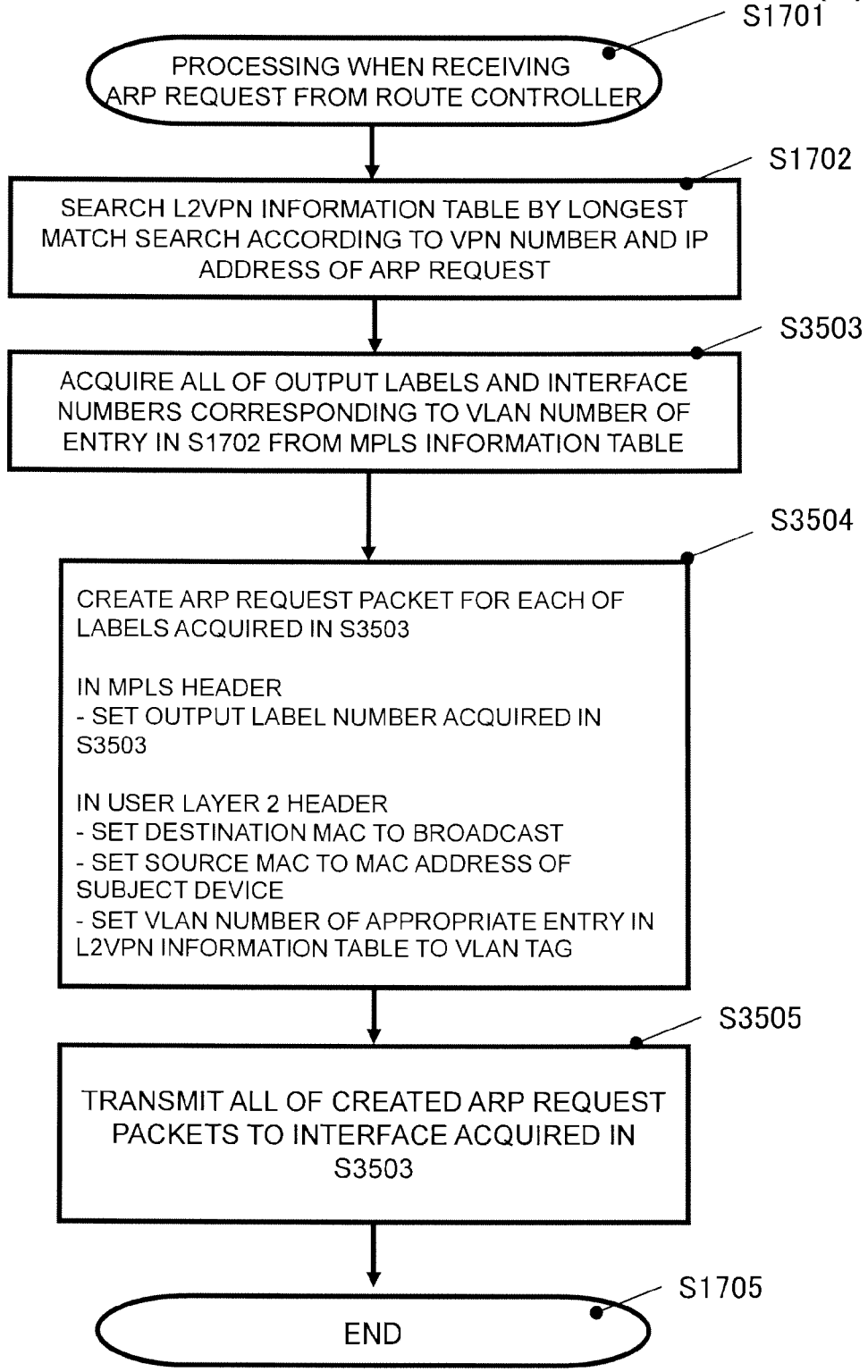
Figure 36:
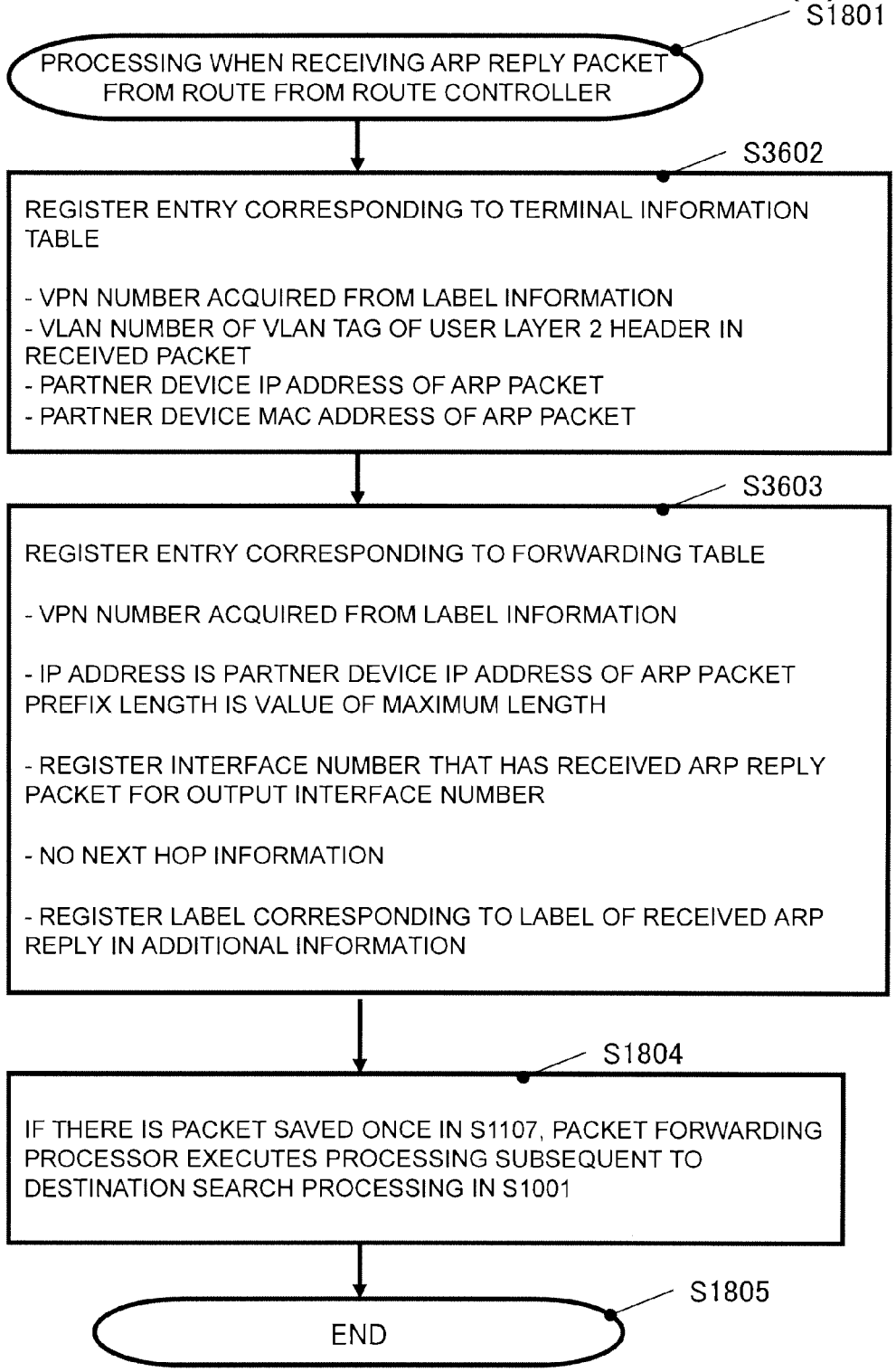
Figure 37:
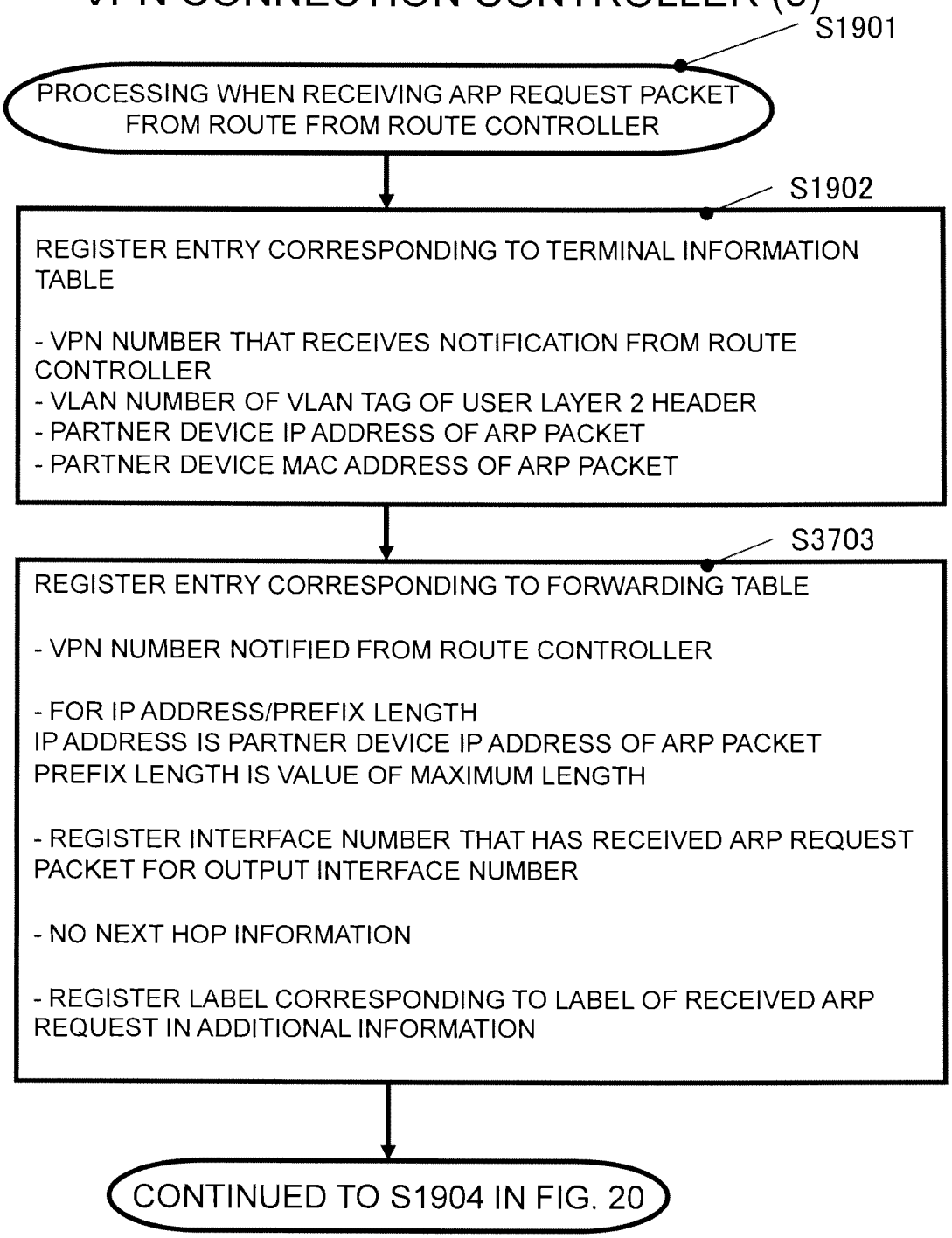
Figure 38:
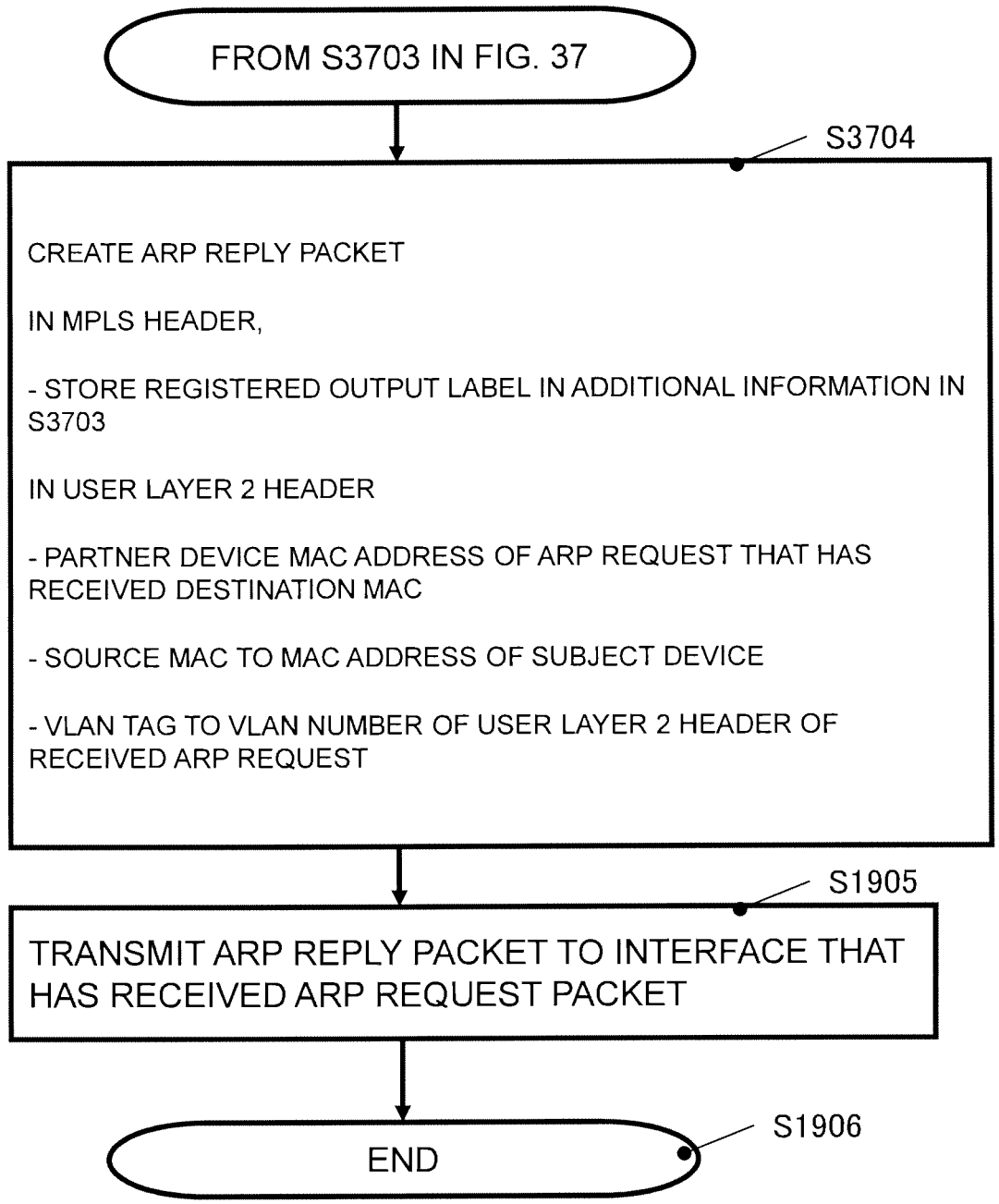
Figure 39:
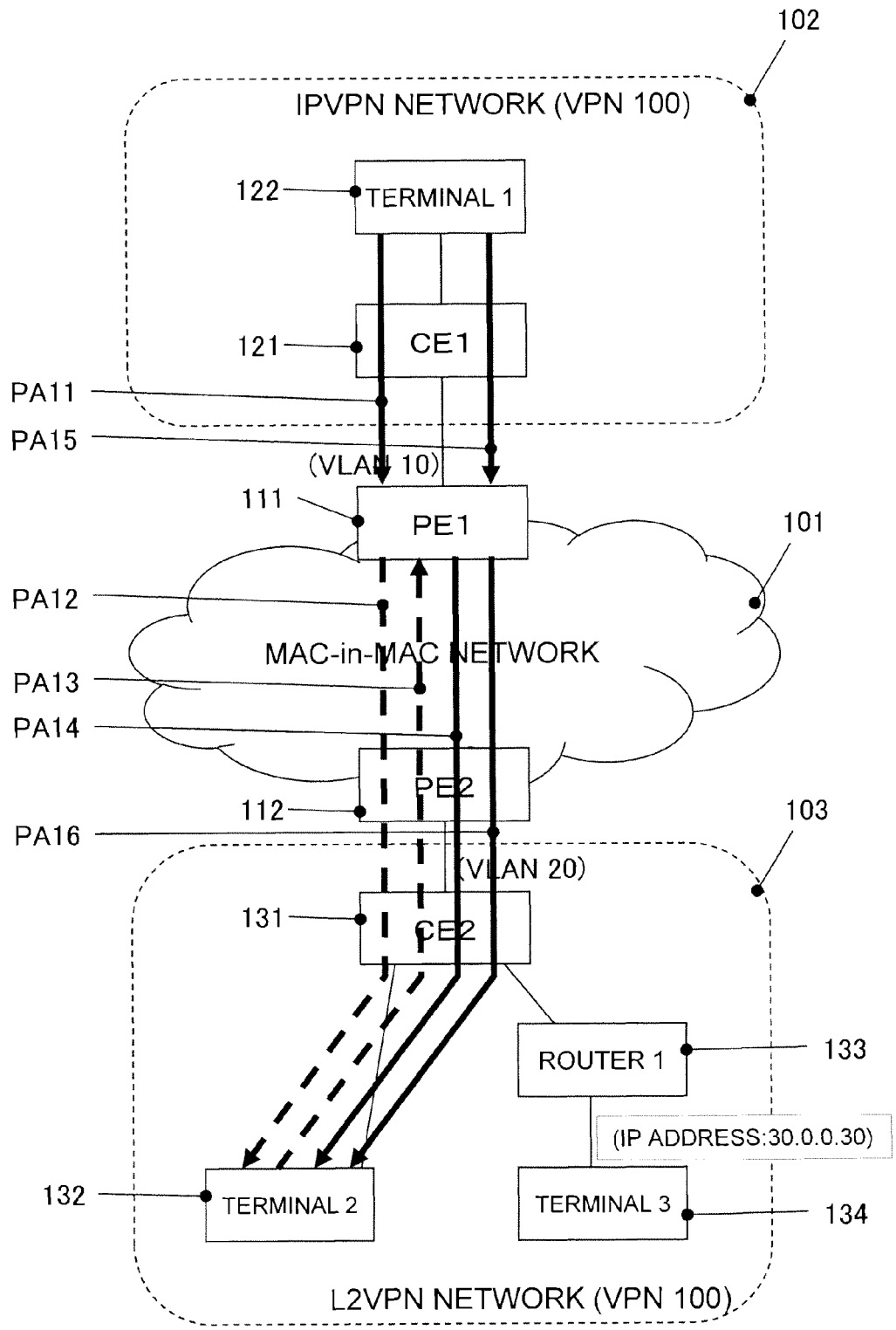
Figure 41:
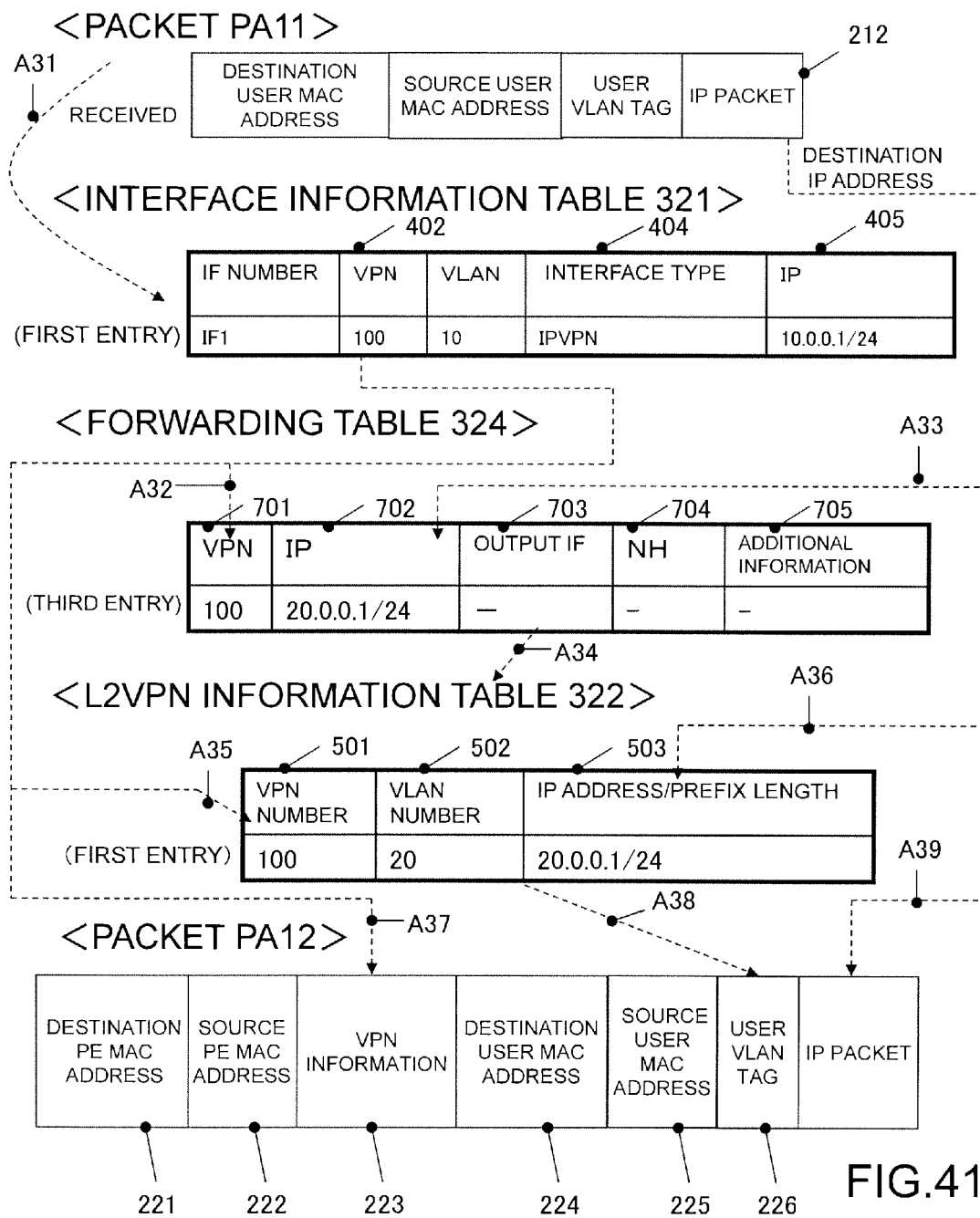
Figure 42:
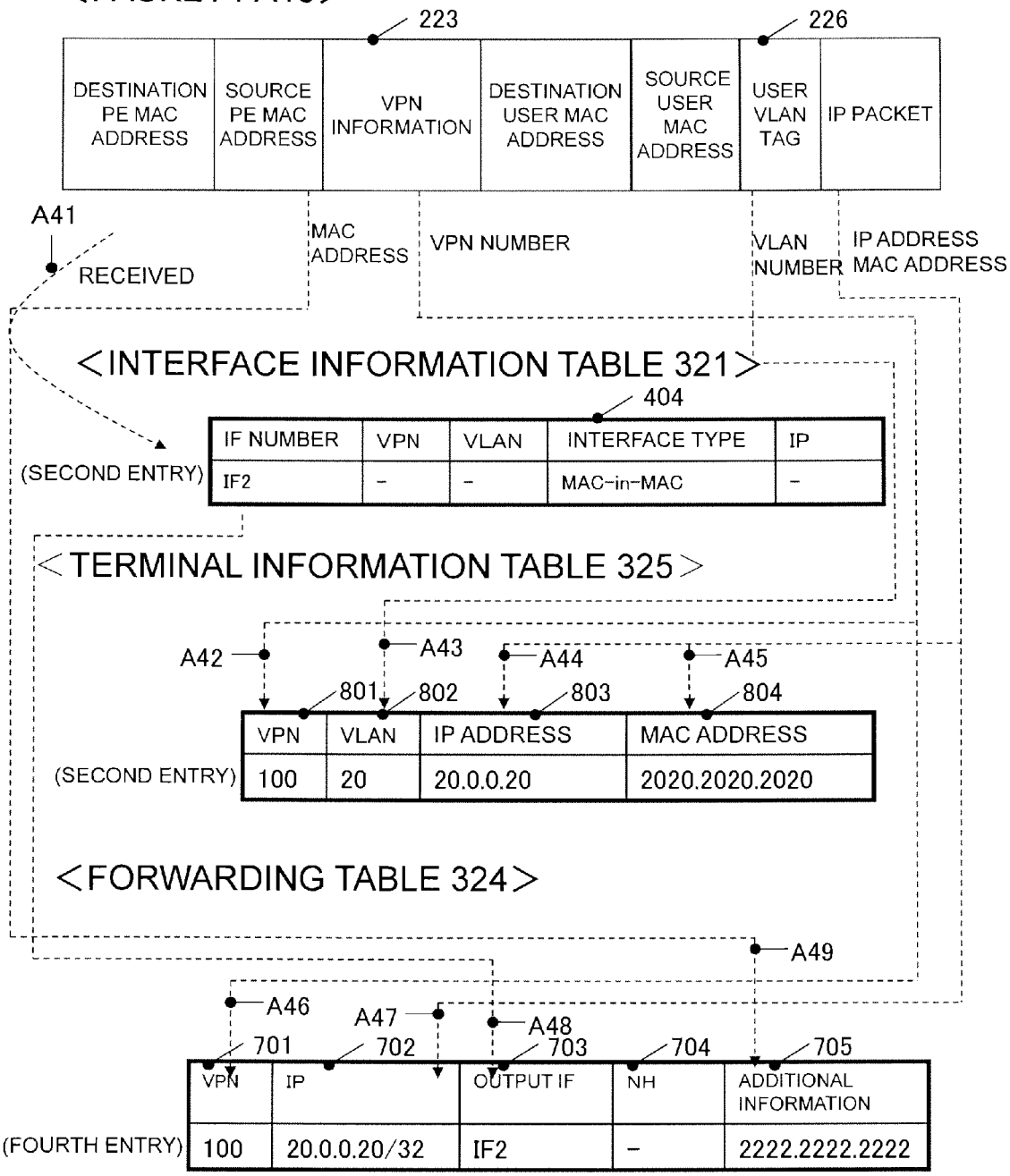
Figure 45:
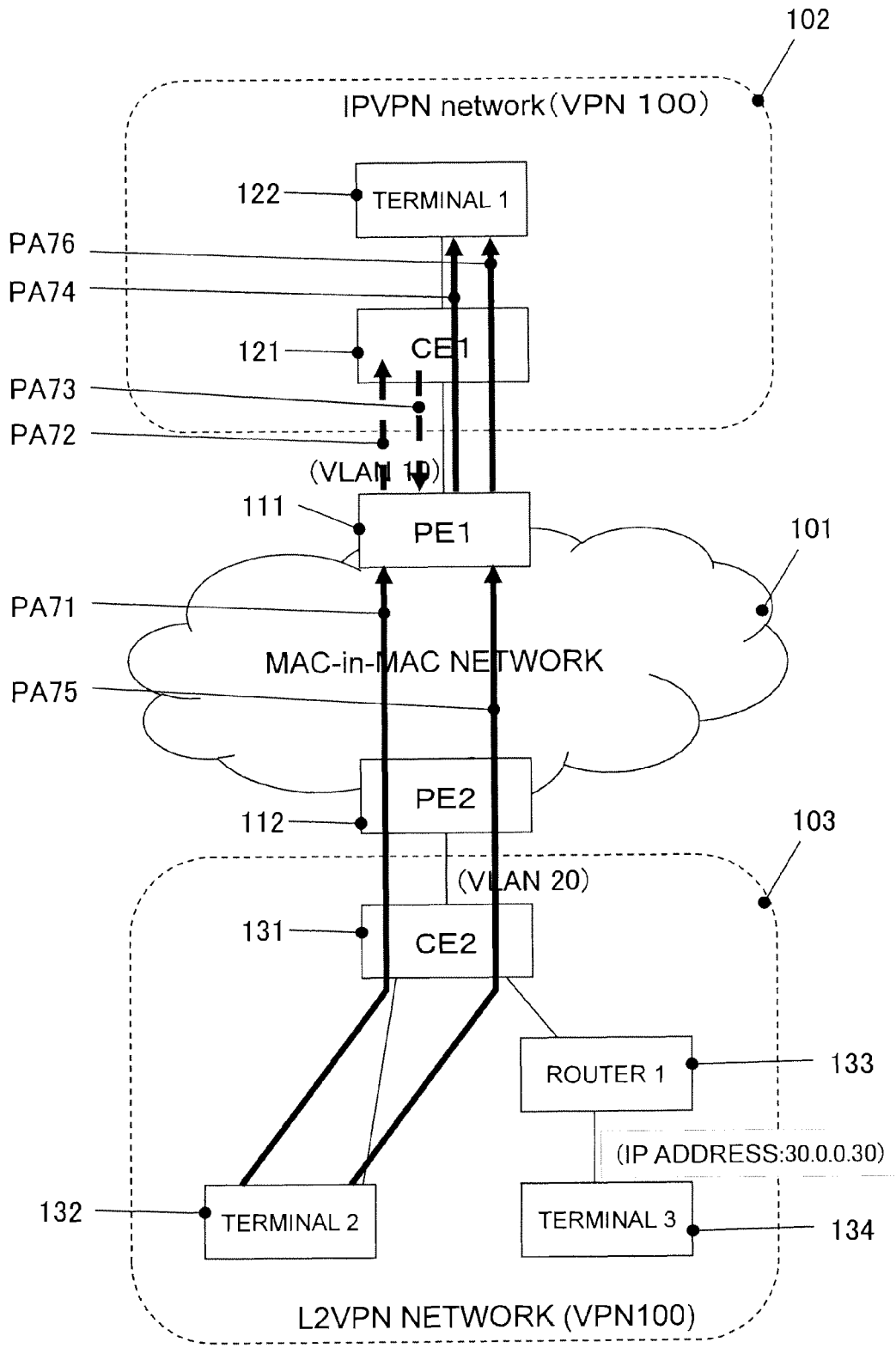
Figure 46:
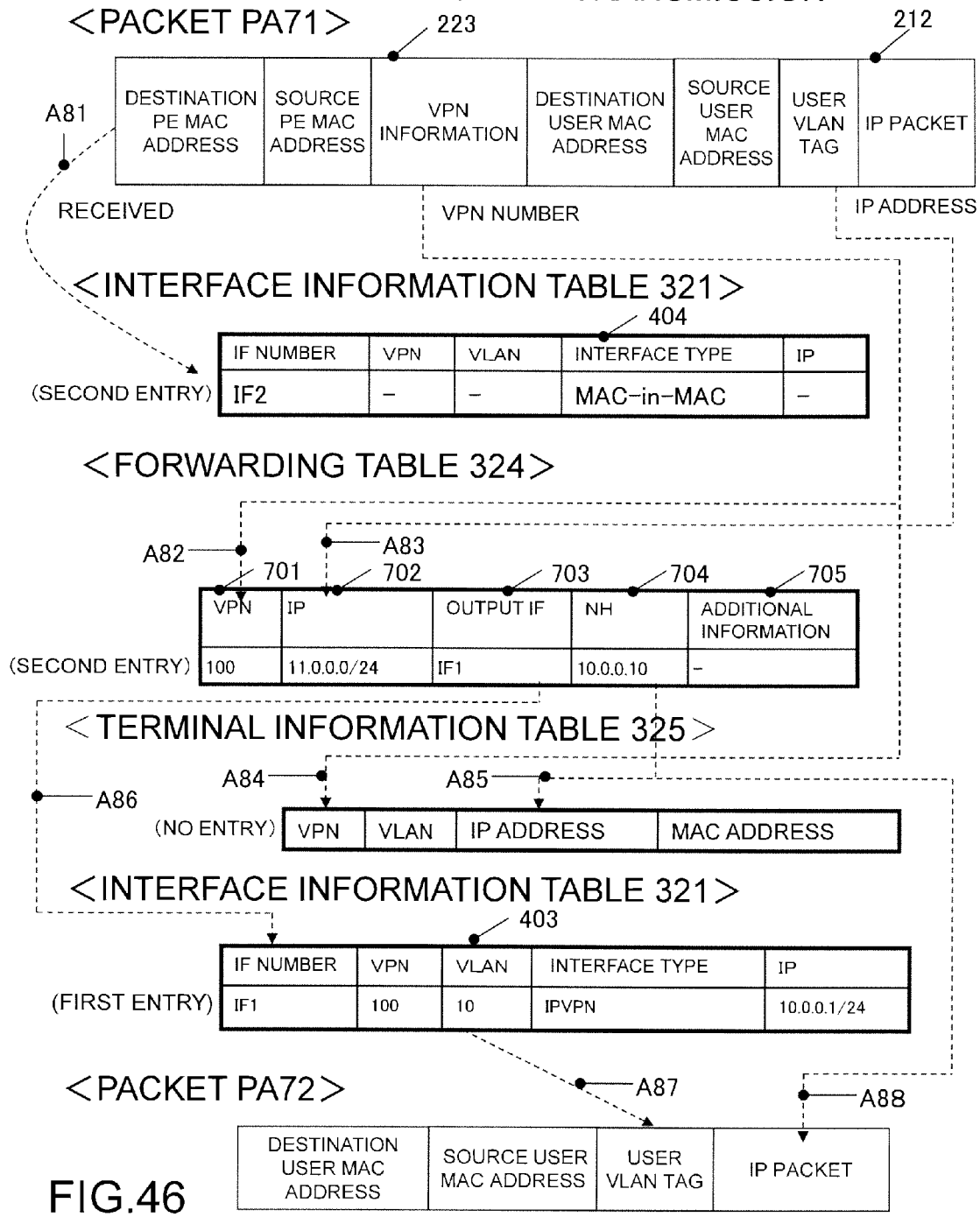
Figure 49:
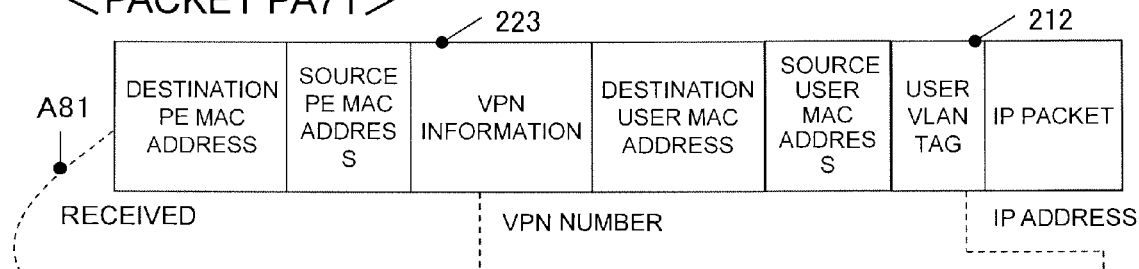
Figure 50:
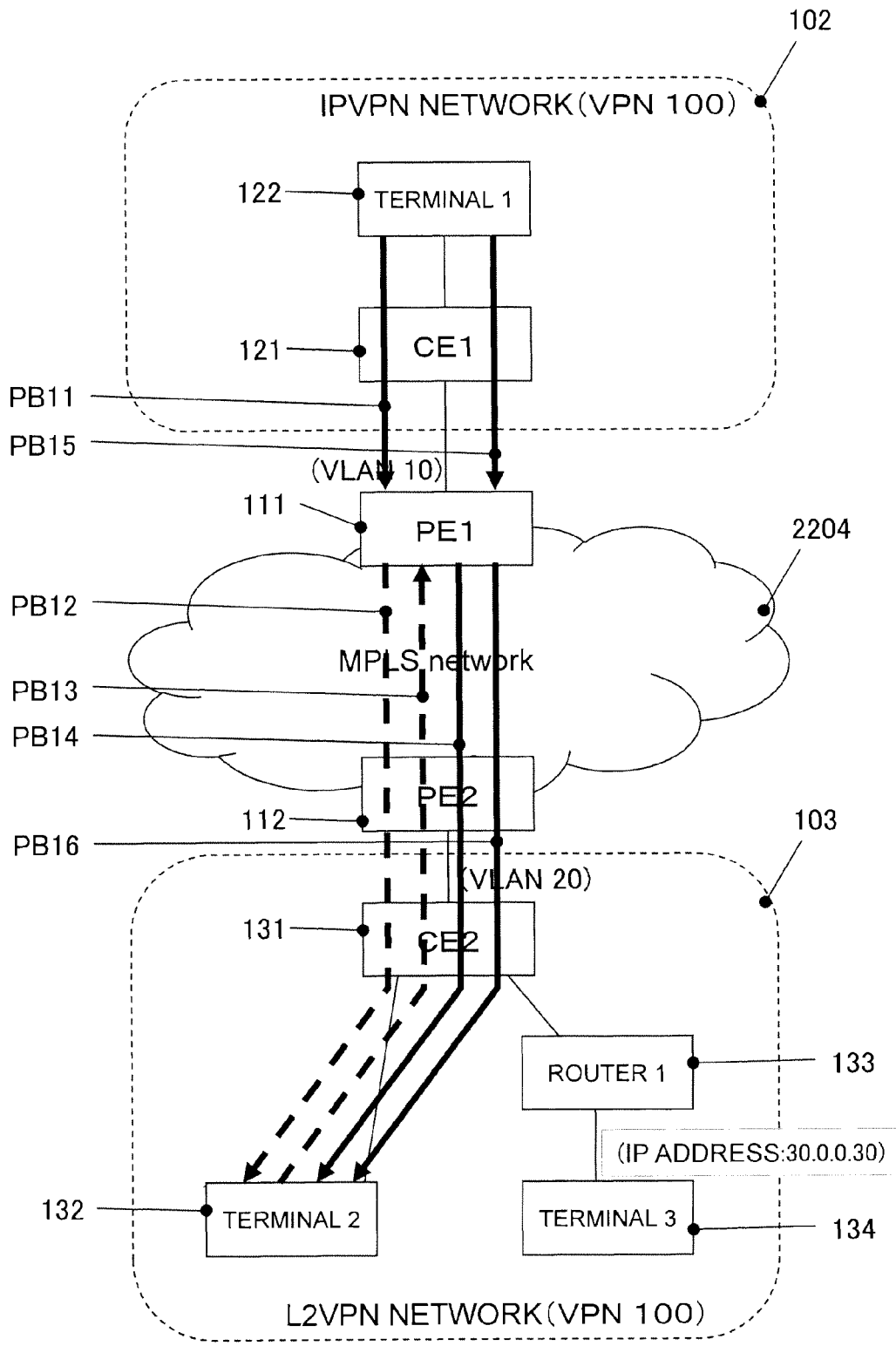
Figure 51:
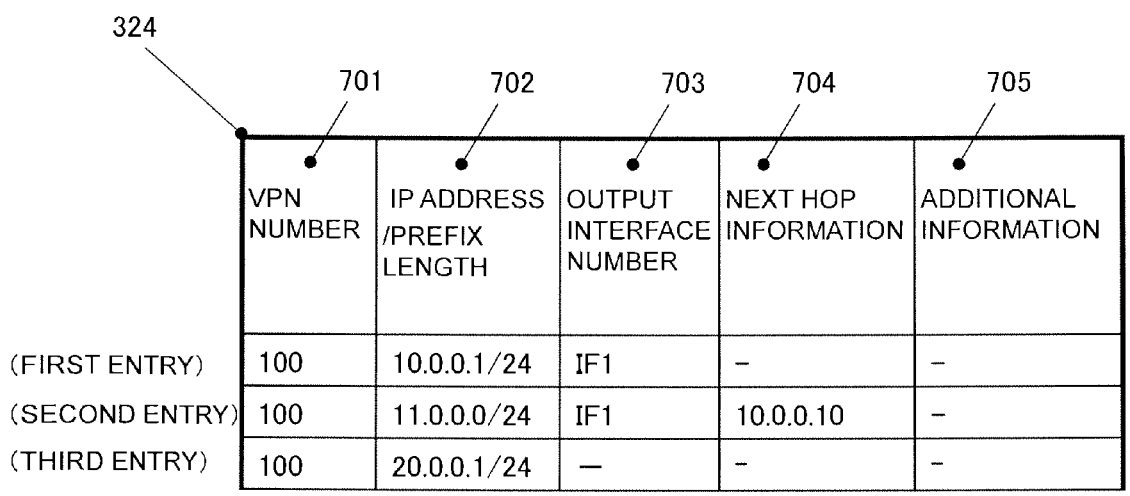
Figure 52:
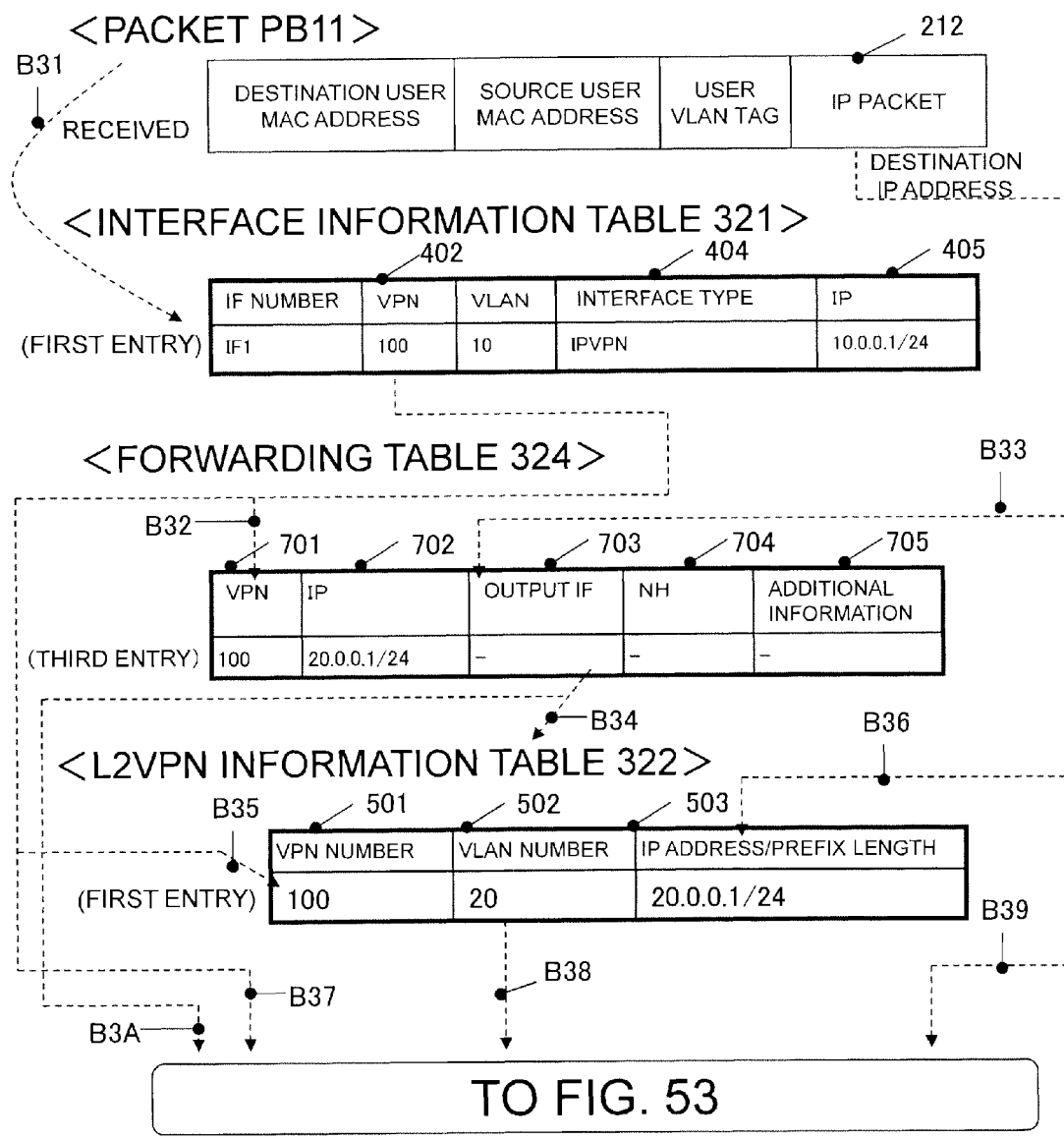
Figure 53:
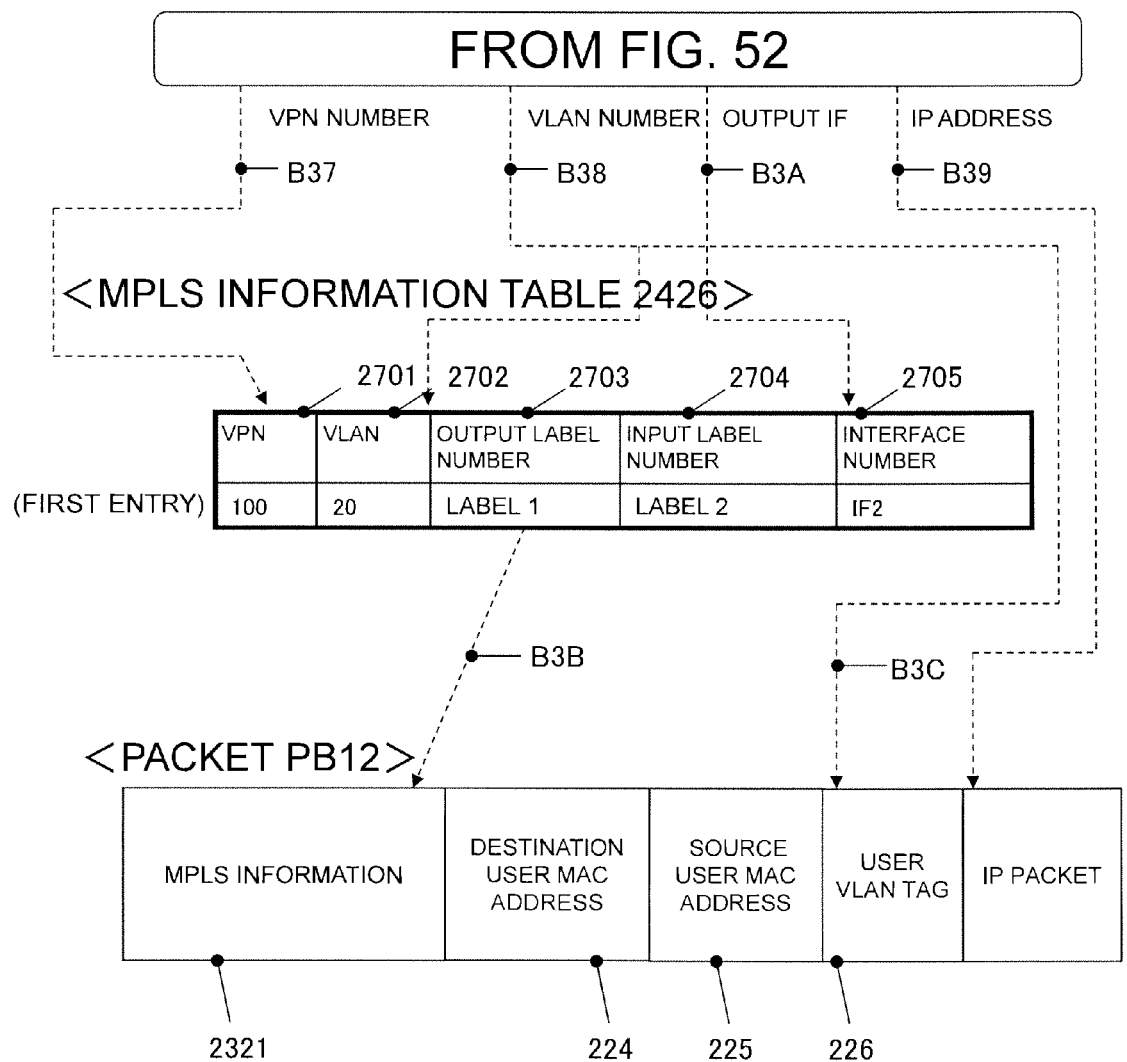
Figure 54:
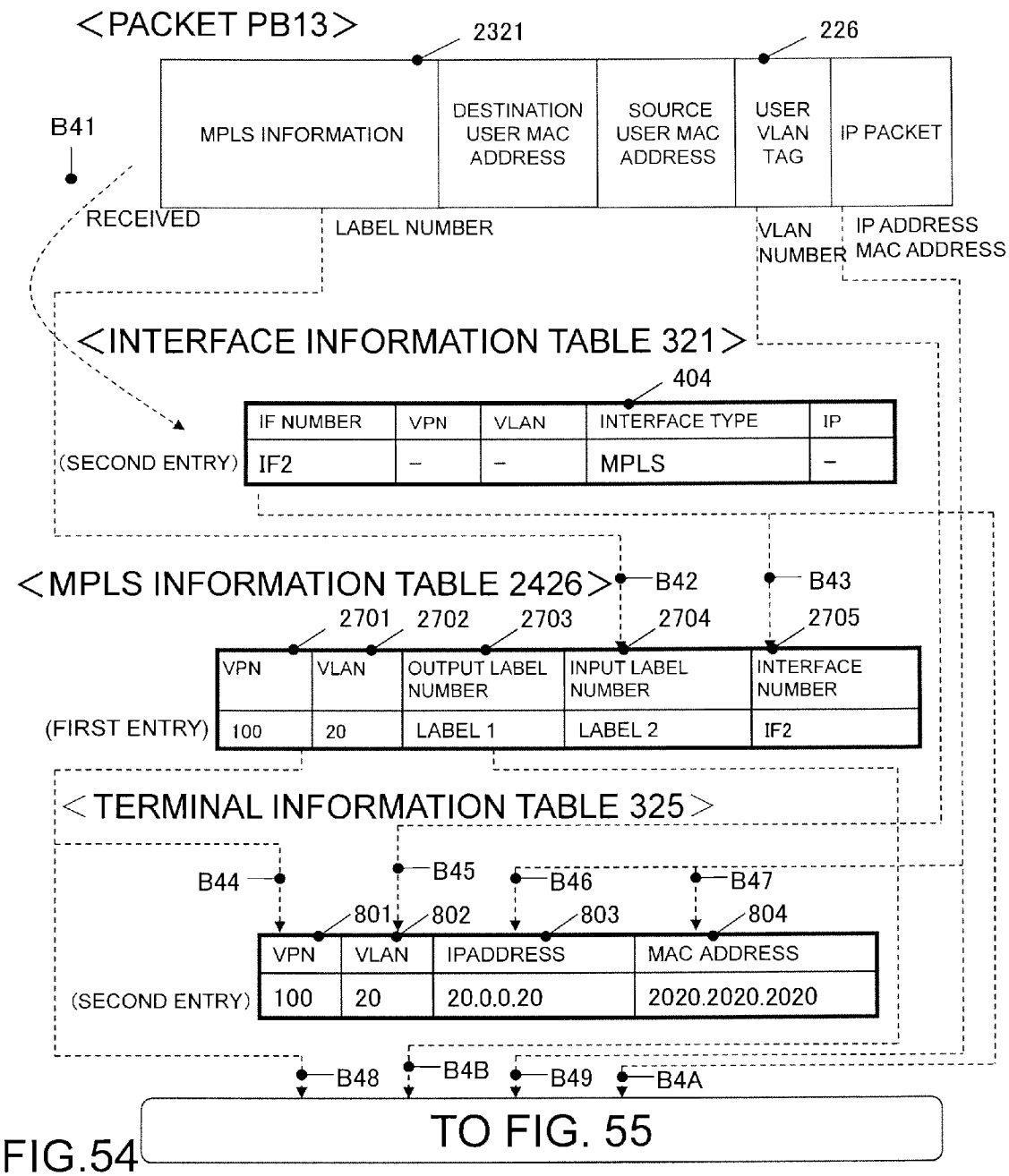
Figure 55:
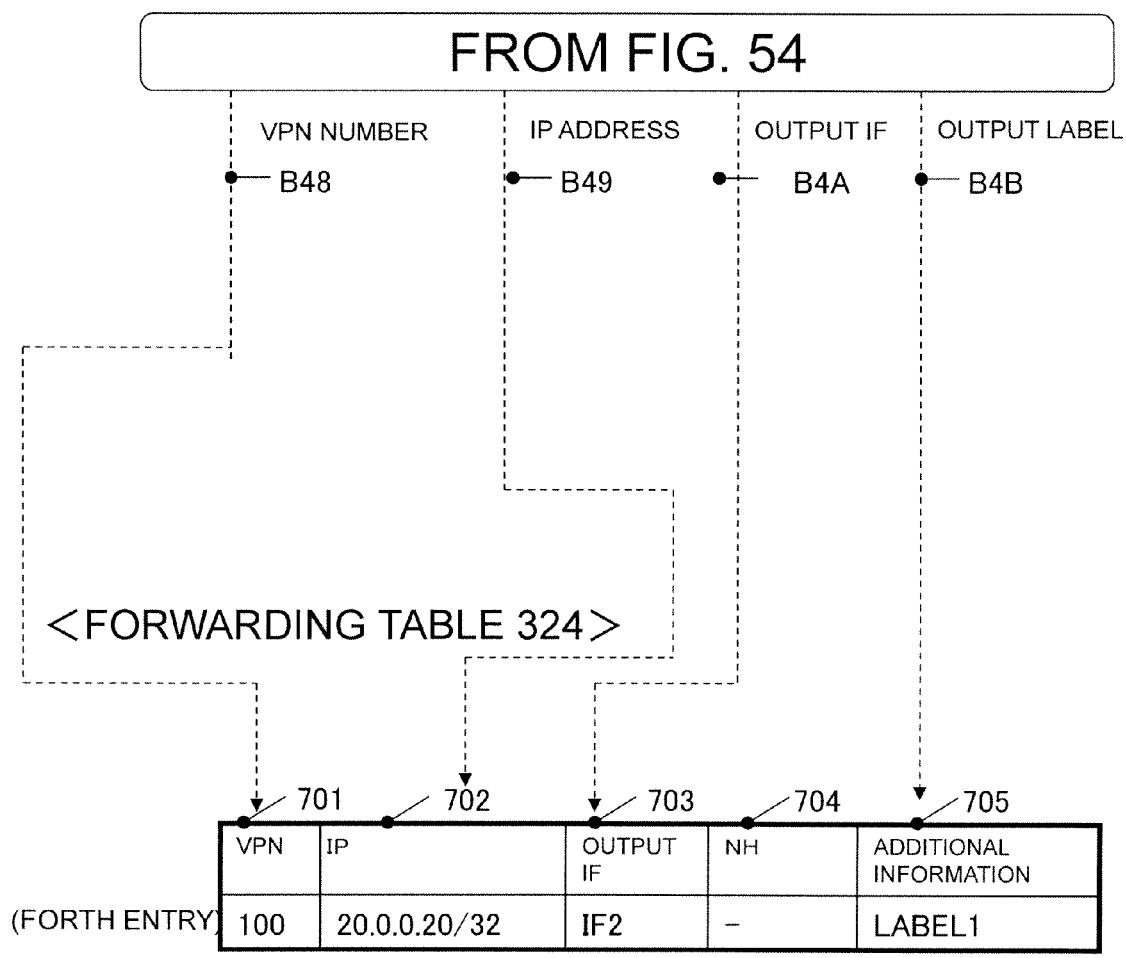
Figure 57:
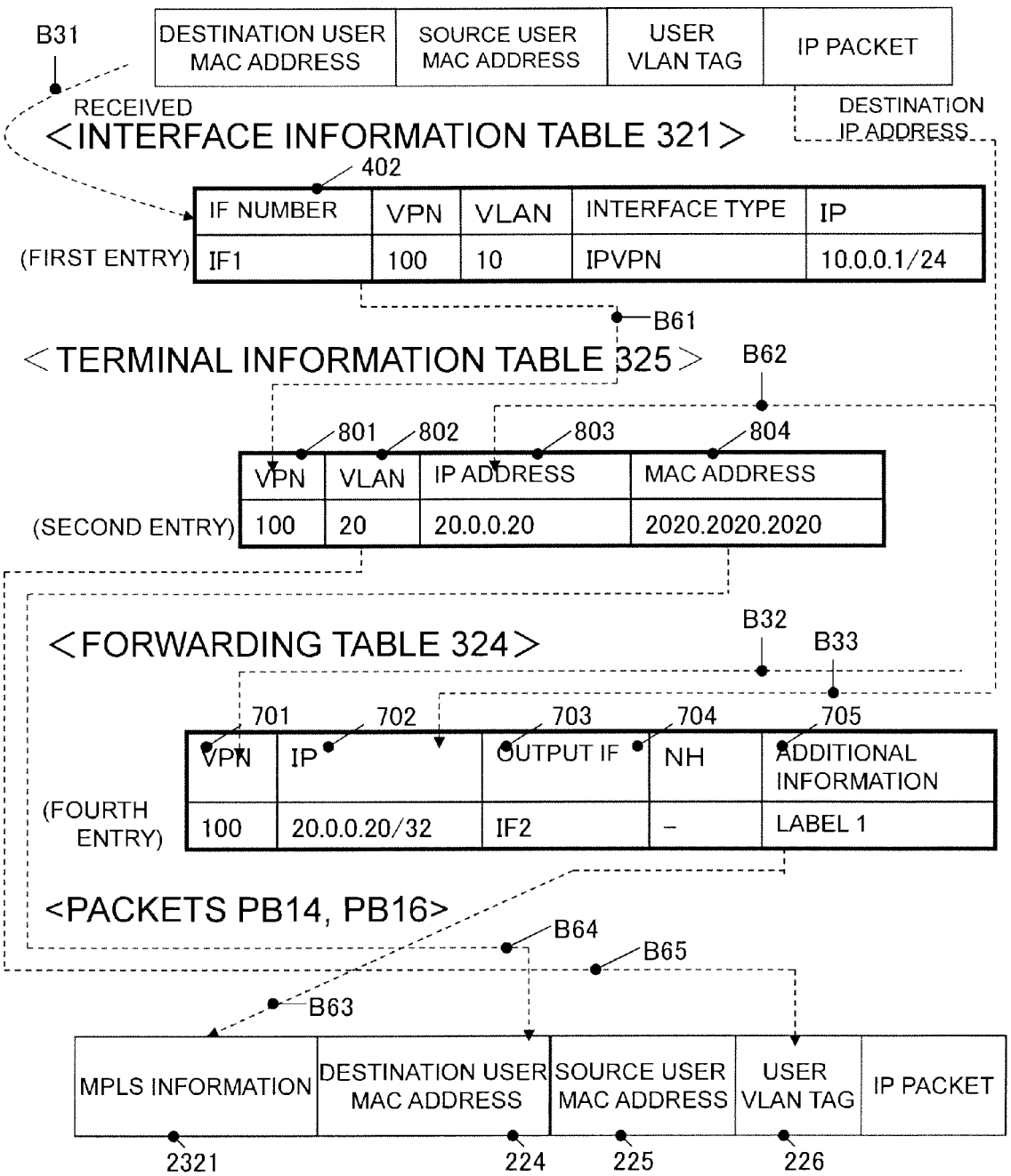
Figure 58:
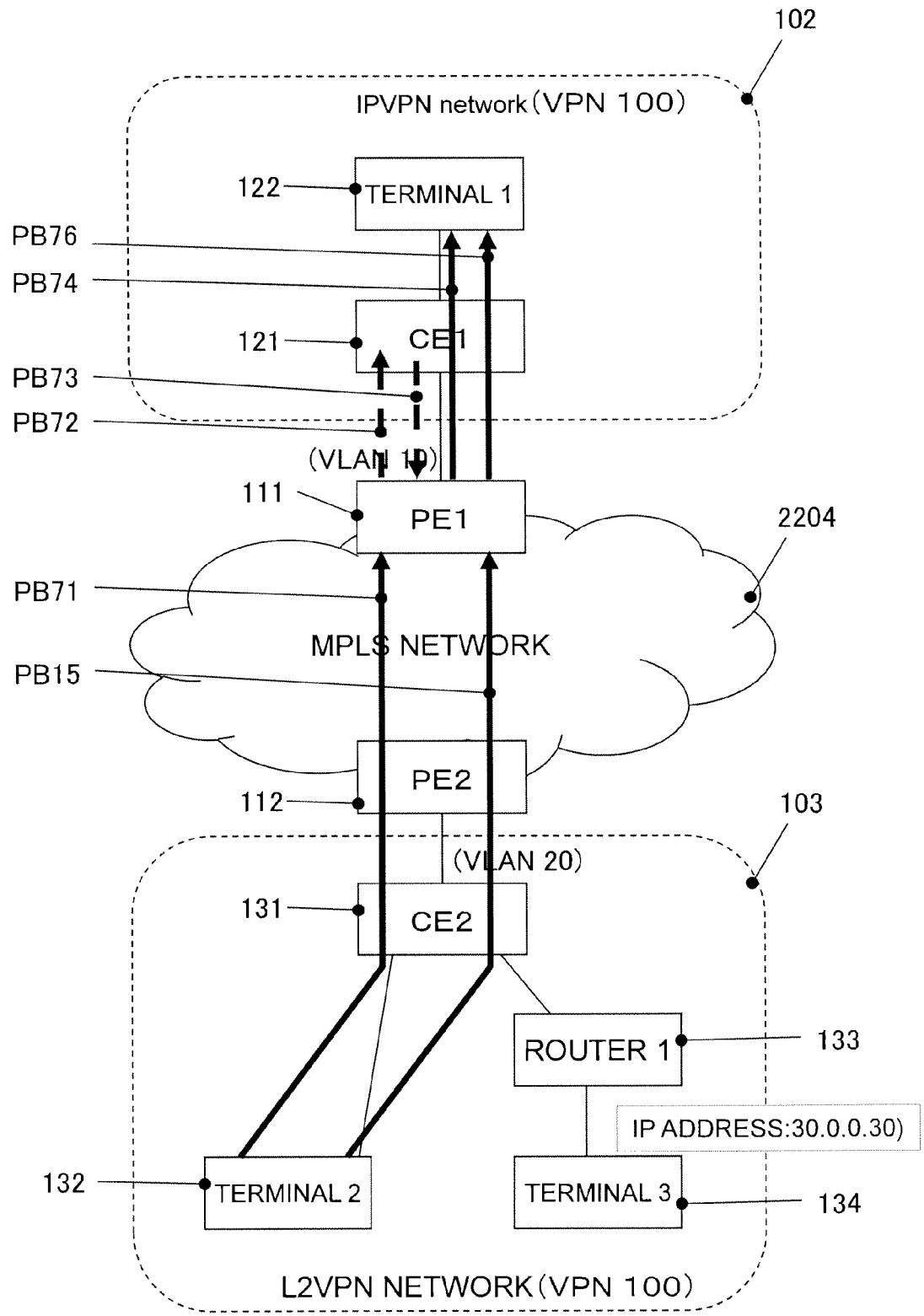
Figure 59:
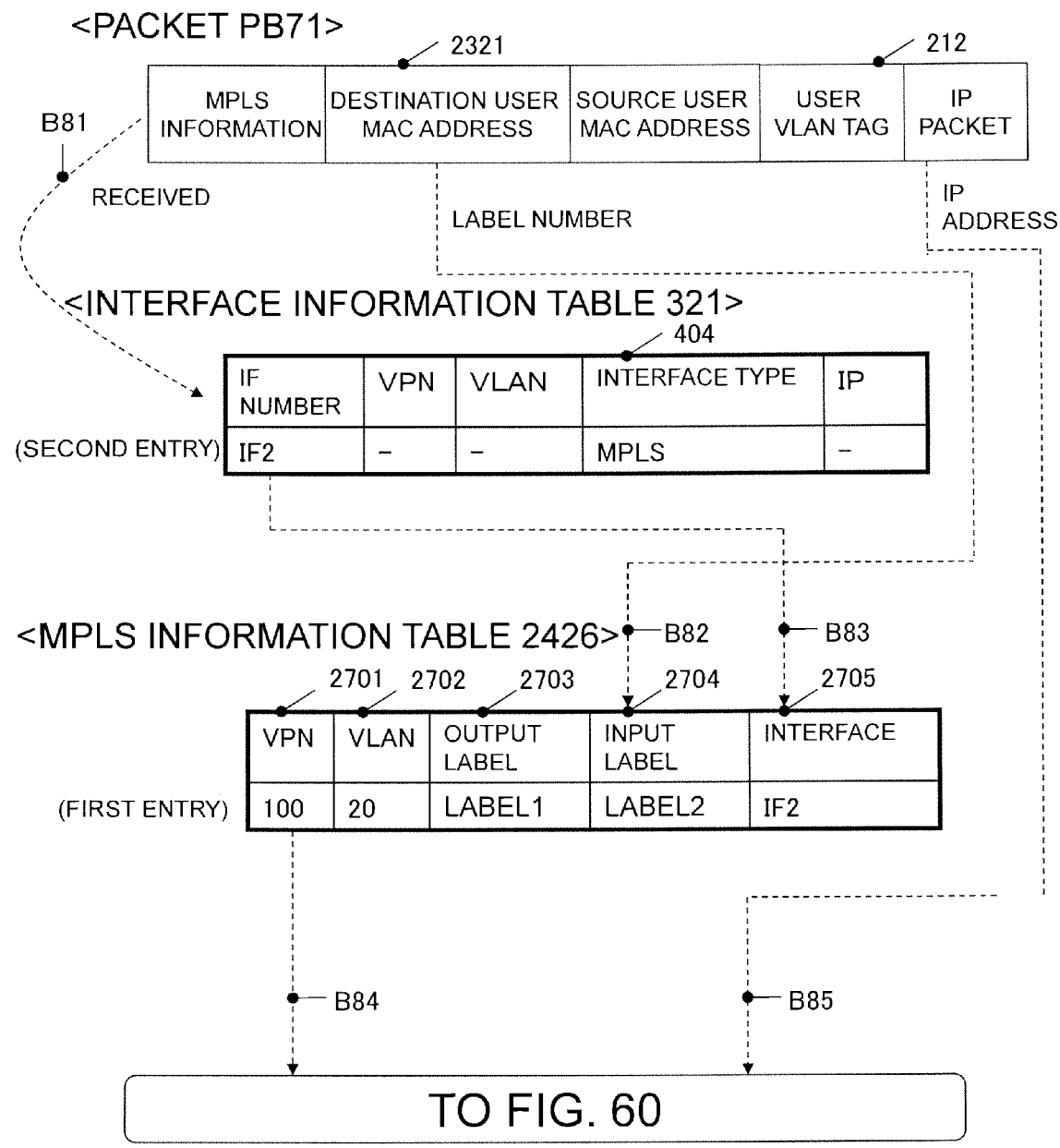
Figure 60:
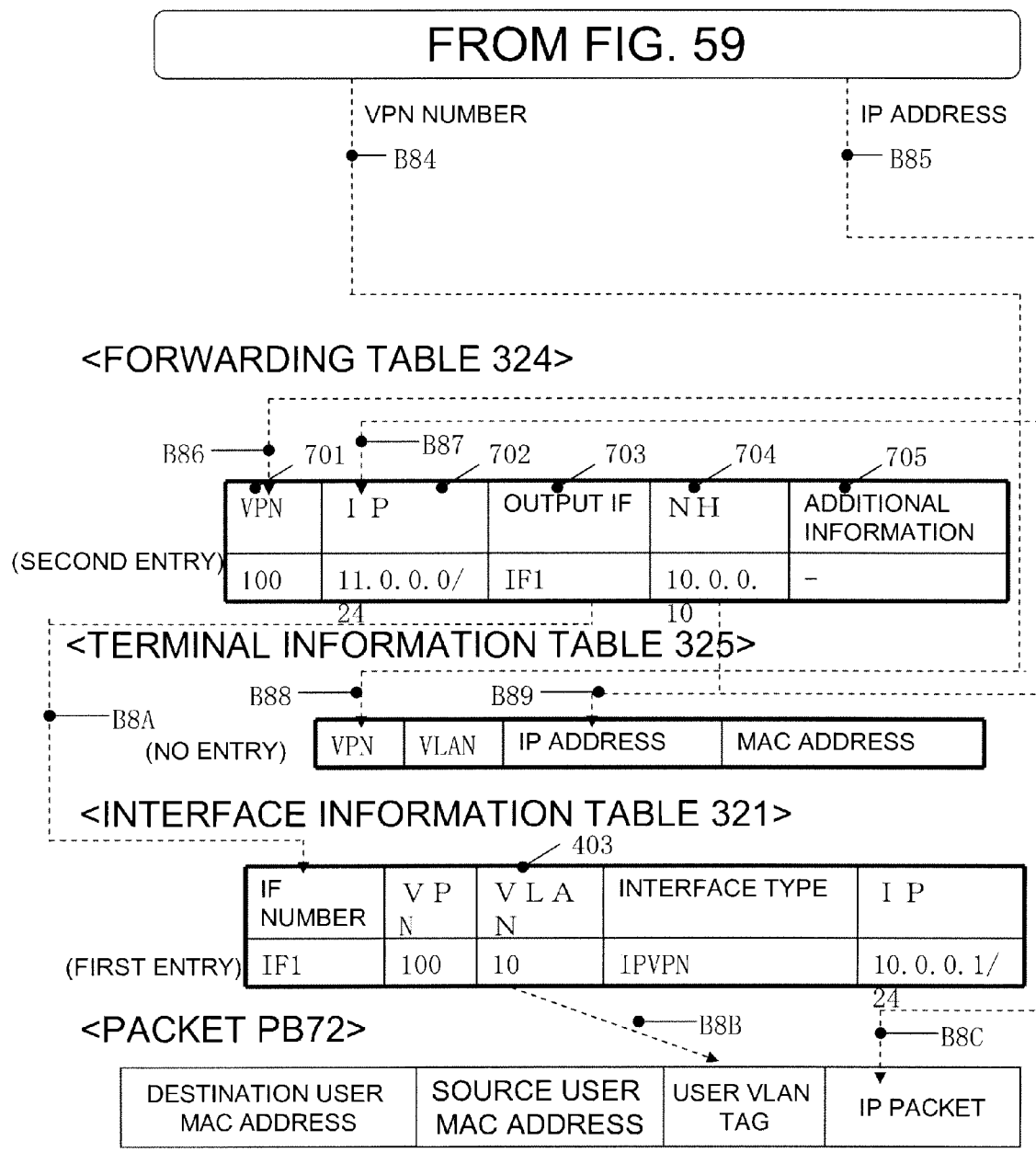
Figure 61:
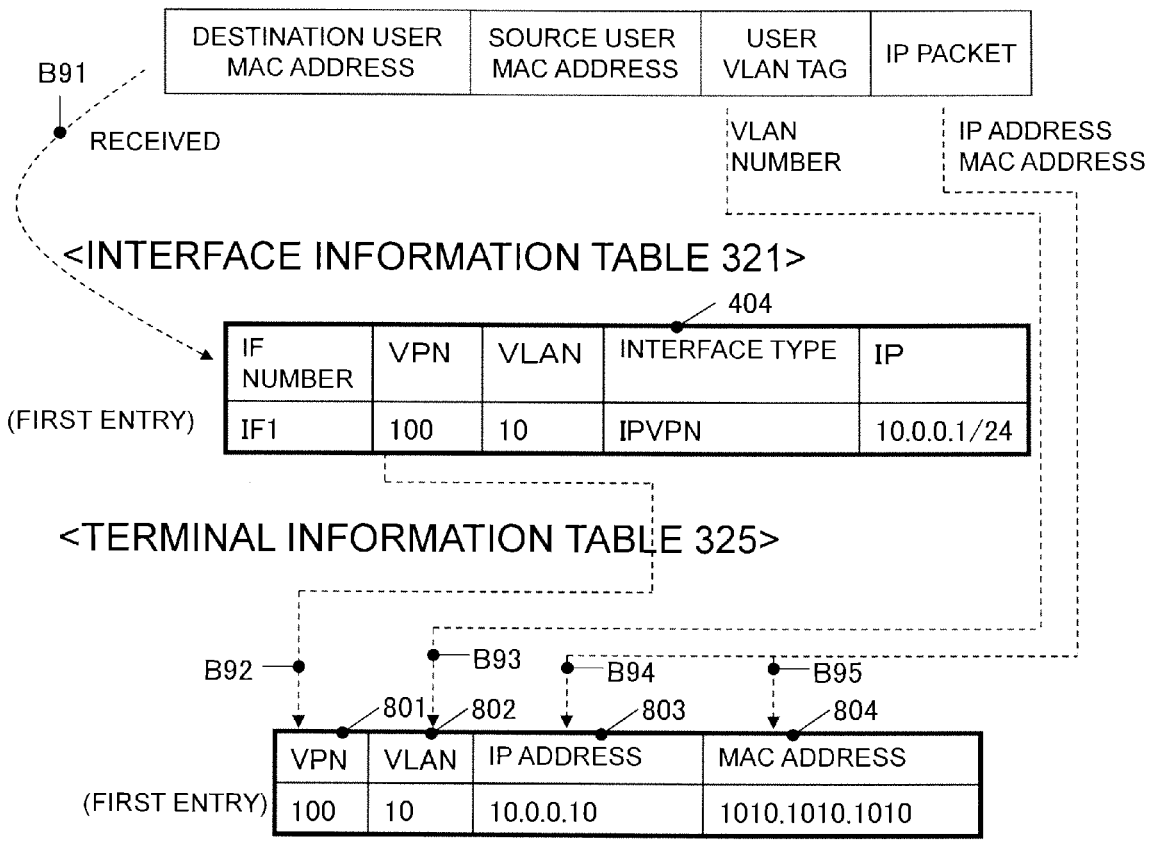

FIG. 17 is a flowchart illustrating a procedure of processing in a VPN connection controller 312 when the VPN connection controller 312 receives the ARP request from the route controller 311;

FIG. 18 is a flowchart illustrating a procedure of processing in the VPN connection controller 312 when the VPN connection controller 312 receives the ARP reply packet from the route controller 311;

FIG. 19 is a flowchart illustrating a procedure of processing in the VPN connection controller 312 when the VPN connection controller 312 receives the ARP request packet from the route controller 311;

FIG. 20 is a flowchart illustrating a procedure of processing in the VPN connection controller 312 when the VPN connection controller 312 receives the ARP request packet from the route controller 311 (continued from FIG. 19);

FIG. 21 is a flowchart illustrating a procedure of processing in the VPN connection controller 312 when the VPN connection controller 312 receives a notification that a route has been registered from the route controller 311;

FIG. 22 is an illustrative view illustrating a configuration of a network system according to a second embodiment;

FIG. 23 is an illustrative view illustrating formats of the packets used in the network system of FIG. 22;

FIG. 24 is an illustrative view illustrating a configuration of the network device 111 which is a provider edge 1 according to the second embodiment;

FIG. 25 is an illustrative view of an interface information table 321 illustrated in FIG. 24;

FIG. 26 is an illustrative view of an forwarding table 324 illustrated in FIG. 24;

FIG. 27 is an illustrative view of an MPLS information table 2426 illustrated in FIG. 24;

FIG. 28 is a flowchart illustrating a procedure to acquiring information related to the destination search from receiving the packet according to the second embodiment;

FIG. 29 is a flowchart illustrating a procedure to forwarding the packet after acquiring the VPN number and the destination IP address according to the second embodiment;

FIG. 30 is a flowchart illustrating a procedure of packet forwarding processing to the MPLS network at S2906 in FIG. 29;

FIG. 31 is a flowchart illustrating a procedure of processing in the route controller 311 when the packet forwarding processor 313 transmits the ARP request to the route controller 311 according to the second embodiment;

FIG. 32 is a flowchart illustrating a procedure of processing in the route controller 311 when the network device 111 receives the ARP reply packet, and the packet forwarding processor 313 determines the received packet as the packet of the routing protocol, and forwards the packet to the route controller 311 according to the second embodiment;

FIG. 33 is a flowchart illustrating a procedure of processing in the route controller 311 when the network device 111 receives the ARP request packet, and the packet forwarding processor 313 determines the received packet as the packet of the routing protocol, and forwards the packet to the route controller 311 according to the second embodiment;

FIG. 34 is a flowchart illustrating a procedure of processing in the route controller 311 when the network device 111 receives the packet of the routing protocol used to control the route, and the packet forwarding processor 313 determines the received packet as the packet of the routing protocol, and forwards the packet to the route controller 311 according to the second embodiment;

FIG. 35 is a flowchart illustrating a procedure of processing in the VPN connection controller 312 when the VPN connection controller 312 receives the ARP request from the route controller 311 according to the second embodiment;

FIG. 36 is a flowchart illustrating a procedure of processing in the VPN connection controller 312 when the VPN connection controller 312 receives the ARP reply packet from the route controller 311 according to the second embodiment;

FIG. 37 is a flowchart illustrating a procedure of processing in the VPN connection controller 312 when the VPN connection controller 312 receives the ARP request packet from the route controller 311 according to the second embodiment;

FIG. 38 is a flowchart illustrating a procedure of processing in the VPN connection controller 312 when the VPN connection controller 312 receives the ARP request packet from the route controller 311 according to the second embodiment (continued from FIG. 37);

FIG. 39 is an illustrative view of a flow of the packet from an IPVPN to an L2VPN;

FIG. 40 is an illustrative view of an initial state of the forwarding table;

FIG. 41 is an illustrative view of processing from packet PA11 reception to packet PA12 transmission;

FIG. 42 is an illustrative view of table update by packet PA13 reception;

FIG. 43 is an illustrative view of an updated table;

FIG. 44 is an illustrative view of transmission of packets PA14 and PA16;

FIG. 45 is an illustrative view of a flow of the packets from the L2VPN to the IPVPN;

FIG. 46 is an illustrative view of processing from a packet PA71 reception to a packet PA72 transmission;

FIG. 47 is an illustrative view of table update by a packet PA73 reception;

FIG. 48 is an illustrative view of an updated table;

FIG. 49 is an illustrative view of transmission of packets PA74 and PA76;

FIG. 50 is an illustrative view of a flow of the packets from the IPVPN to the L2VPN;

FIG. 51 is an illustrative view of the initial state of the forwarding table;

FIG. 52 is an illustrative view of processing (1) from packet PB11 reception to packet PB12 transmission;

FIG. 53 is an illustrative view of processing (2) from the packet PB11 reception to the packet PB12 transmission;

FIG. 54 is an illustrative view of table update by packet PB13 reception (1);

FIG. 55 is an illustrative view of the table update by the packet PB13 reception (2);

FIG. 56 is an illustrative view of an updated table;

FIG. 57 is an illustrative view of transmission of packets PB14 and PB16;

FIG. 58 is an illustrative view of a flow of the packet from the L2VPN to the IPVPN;

FIG. 59 is an illustrative view of processing from a packet PB71 reception to a packet PB72 transmission (1);

FIG. 60 is an illustrative view of processing from the packet PB71 reception to the packet PB72 transmission (2);

FIG. 61 is an illustrative view of table update by packet PB73 reception;

FIG. 62 is an illustrative view of an updated table; and

Figure 63:
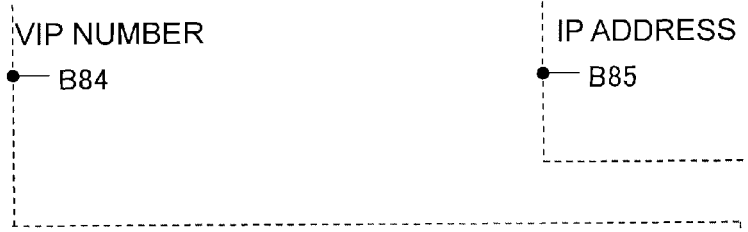

FIG. 63 is an illustrative view of transmission of packets PB74 and PB76.

DETAILED DESCRIPTION OF THE EMBODIMENTS

Hereinafter, embodiments of the present invention will be described in a sequence stated below.
A. First Embodiment
 A1. System Configuration
 A2. Description of Specific Procedure for communication
 A3. Operation of Network Device
 A4. Advantages of First Embodiment
B. Second Embodiment
 B1. System Configuration
 B2. Description of Specific Procedure for communication
 B3. Operation of Network Device
 B4. Advantages of Second Embodiment
C. Modified Example

A. First Embodiment

This embodiment shows an example of a method of enabling a communication between a hub network layer-3-connected and a hub network layer-2-connected over a core network using a MAC-in-MAC connecting a VPN.
A1. System Configuration Now, configurations of a network system and a network device according to this embodiment will be described.

Figure 1:
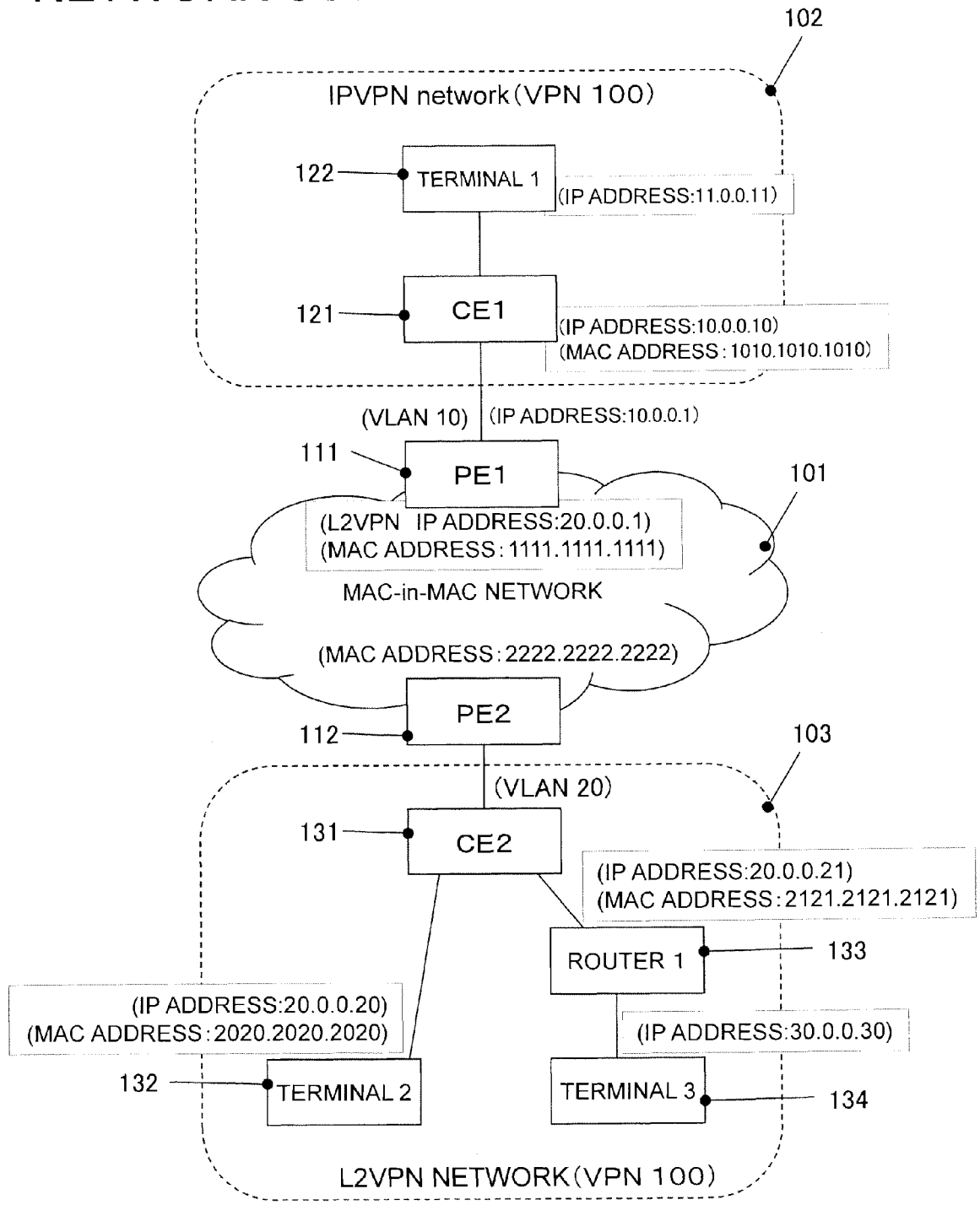
FIG. 1 is an illustrative view illustrating a configuration of a network system according to an embodiment of the present invention.

FIG. 1 is an illustrative view illustrating a configuration of a network system according to an embodiment of the present invention. The network system includes a MAC-in-MAC network 101, an IPVPN network 102, and an L2VPN network 103. The IPVPN network 102 and the L2VPN network 103 can communicate with each other, and the MAC-in-MAC network 101 mediates the communication therebetween. It is assumed that those two VPN networks that can communicate with each other are identified by a VPN number 100.

A network device 111 (hereinafter referred to as "PE1 (provider edge)") and a network device 112 (hereinafter referred to as "PE2") belong to the MAC-in-MAC network 101. The PE1 is connected to the IPVPN network 102, and the PE2 is connected to the L2VPN network 103. The connection between PE1 and the IPVPN network 102 are a layer 3 connection, and the PE1 conducts a layer 3 packet forwarding from the IPVPN network 102. Also, the connection between the PE2 and the L2VPN network 103 are a layer 2 connection, and the PE2 conducts a layer 2 packet forwarding from the L2VPN network 103.

A network device 121 (hereinafter referred to as "CE1 (customer edge)") and a network device 122 (hereinafter referred to as "terminal 1") belong to the IPVPN network 102. With the connection of the CE1 to the PE1, the IPVPN network 102 is connected to the MAC-in-MAC network 101. The terminal 1 conducts a communication using a VPN through the CE1.

A network device 131 (hereinafter referred to as "CE2"), a network device 132 (hereinafter referred to as "terminal 2"), a network device 133 (hereinafter referred to as "router 1") and a network device 134 (hereinafter referred to as "terminal 3") belong to the L2VPN network 103. With the connection of the CE2 to the PE2, the L2VPN network 103 is connected to the MAC-in-MAC network 101. The terminal 2, the router 1, and the terminal 3 conduct communications using the VPN through the CE2. The router 1 assumes layer 3 routing for allowing the terminal 3 to conduct a communication within the L2VPN network. In order that the terminal 3 communicates with the IPVPN network 102, the router 1 exchanges route information on the layer 3 with the PE1 by a routing protocol. The terminals 2 and 3 hold information indicative of a forwarding destination of the layer 3 communication called a "default gateway". The terminal 2 is layer-2-connected to the CE2 and the PE2, and the default gateway is the PE1 that assumes the layer 3 communication. The terminal 3 is under the router 1, and the default gateway is the router 1.

A MAC address and an IP address are allocated to each of the network devices in advance.

An interface that connects the PE1 to the CE1 is a VLAN 10 whose address is 10.0.0.1. The PE1 has an L2VPN IP address 20.0.0.1 as an IP address for conducting the layer 3 packet forwarding to the L2VPN network 103. Also, a MAC address of the PE 1 used within the MAC-in-MAC network 101 is 1111.1111.1111.

An interface that connects the PE2 to the CE2 is a VLAN 20. The VLAN 20 has no IP address because of the layer 2 connection. Also, a MAC address of the PE 2 used within the MAC-in-MAC network 101 is 2222.2222.2222.

An interface that connects the CE1 to the PE1 has an IP address of 10.0.0.10, and a MAC address 1 is 010.1010.1010.

An IP address of the terminal 1 is 11.0.0.11.

The CE2 has no IP address. Also, a MAC address of the CE2 is not used in this embodiment, and therefore will be omitted.

An IP address of the terminal 2 is 20.0.0.20, and a MAC address thereof is 2020.2020.2020.

An IP address of the router 1 is 20.0.0.21, and a MAC address thereof is 2121.2121.2121.

An IP address of the terminal 3 is 30.0.0.30.

FIG. 2 is an illustrative view illustrating formats of packets used in the network system of FIG. 1. Packet formats 200 and 201 illustrated in FIG. 2 are a format of the packet used within the MAC-in-MAC network 101, and a format of the packet used outside of the MAC-in-MAC network 101, that is, the packet used between the PE1 and the CE1, within the IPVPN network 102, between the PE2 and the CE2, and within the L2VPN network 103, respectively.

The packet used within the MAC-in-MAC network 101 shown in a packet format 200 includes a MAC-in-MAC header 210, a user layer 2 header 211, and an IP packet 212, which is a format adding the MAC-in-MAC header 210 to a packet format 201 used outside of the MAC-in-MAC network.

The MAC-in-MAC header 210 includes a destination PE MAC address 221, a source PE MAC address 222, and a VPN information 223. The MAC-in-MAC header 210 is a header only within the MAC-in-MAC network, which is a header in which devices having a function of connecting the VPN such as the PE1 or the PE2 are a destination and a source. Information indicative of the VPN of the forwarding destination is stored in the VPN information 223. Within the MAC-in-MAC network, the packet is forwarded on the basis of the MAC-in-MAC header 210.

The user layer 2 header 211 includes a destination user MAC address 224, a source user MAC address 225, and a user VLAN tag 226. The user layer 2 header 211 is a header of the layer 2 indicative of a destination and a source in the network outside of the MAC-in-MAC network, that is, in the IPVPN network 102 and the L2VPN network 103. VLAN information for conducting the layer 2 packet forwarding is stored in the user VLAN tag 226.

The IP packet 212 is a packet of the layer 3 in which the destination and the source of the layer 3 between the terminals that conduct a communication with each other, and its contents are stored.

The packet used outside of the MAC-in-MAC network 101 shown in the packet format 201 is identical with the packet of the packet format 200 except for removal of the MAC-in-MAC header 210 from the packet format 200. Outside of the MAC-in-MAC network, the packet is forwarded on the basis of the destination and the source of the layer 3 which are stored in the user layer 2 header 211 and the IP packet 212.

In this embodiment, the operation of the network device 111 that is mainly the PE1 will be described below. The network devices other than the PE1, for example, operate according to the related art, and the description of the operation of the respective devices will be minimized.

In this embodiment, an IPv4 is used as the layer 3, but an IPv6 can be used as a protocol of the layer 3.

Figure 3:
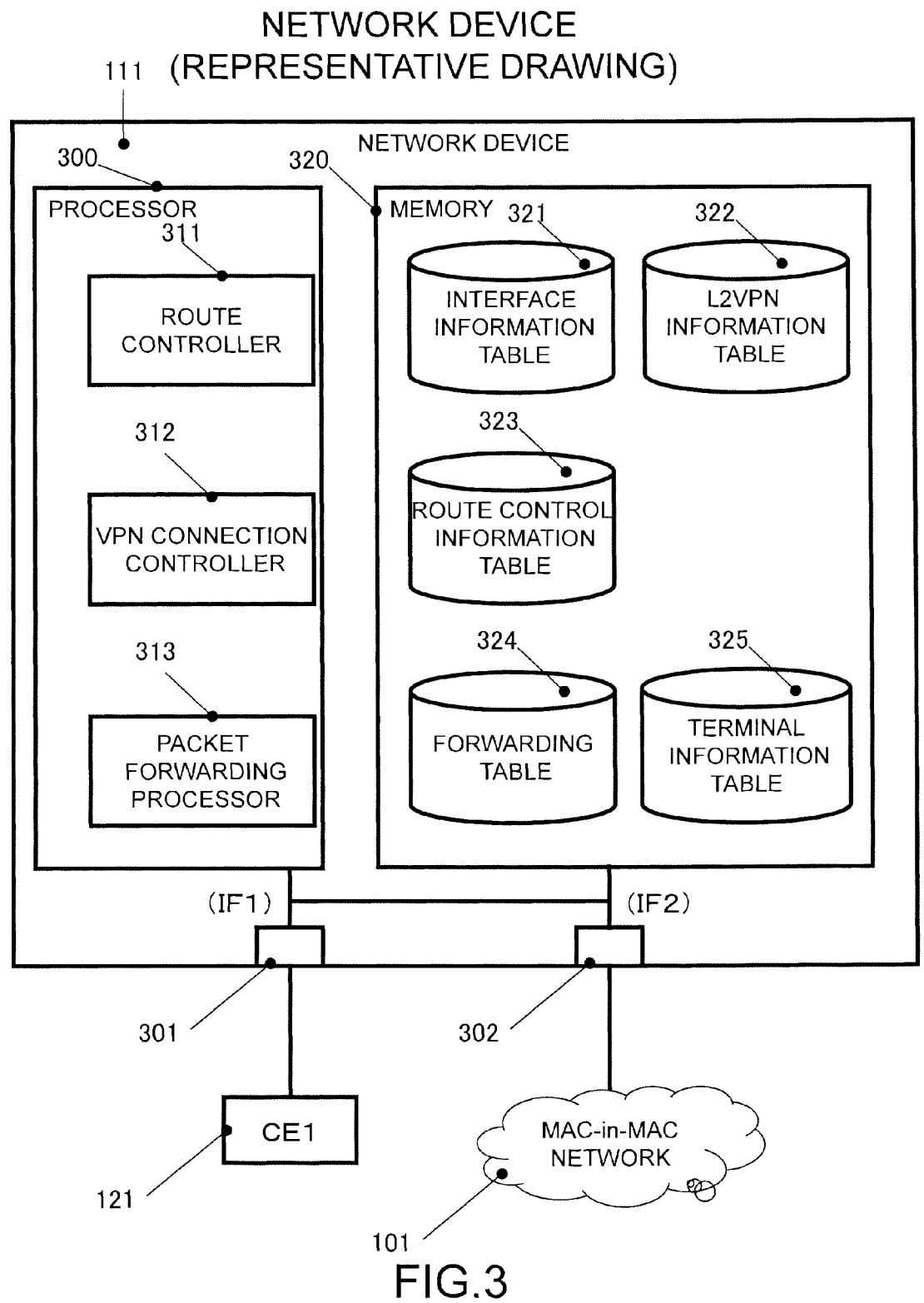
FIG. 3 is an illustrative view illustrating a configuration of a network device 111 which is a provider edge 1.

FIG. 3 is an illustrative view illustrating a configuration of the network device 111 of the which is the PE1.

The network device 111 is a layer 3 switch, and forwards the packets in a second layer (data link layer) and a third layer (network layer) in the OSI reference model. The layer 3 switch can be replaced with a router.

The network device 111 includes two interfaces (interfaces 301 and 302), a memory 320, and a processor 300. The processor 300 includes a route controller 311, a VPN connection controller 312, and a packet forwarding processor 313.

The interface 301 is connected to the CE1. Also, the interface 302 is connected to the MAC-in-MAC network 101. The MAC address and the IP address are allocated to each of the interfaces 301 and 302. Those interfaces 301 and 302 may be physical interfaces such as Ethernet (registered trademark) or logical interfaces such as the VLAN.

The memory 320 stores an interface information table 321, an L2VPN information table 322, a route control information table 323, a forwarding table 324, and a terminal information table 325. The details of the respective tables will be described later.

Each of the route controller 311, the VPN connection controller 312, and the packet forwarding processor 313 is a functional unit that is realized by causing a central processing unit (CPU) not shown to execute a program stored in the memory 320. The CPU can be replaced with an application specific integrated circuit (ASIC) or a field programmable gate array (FPGA).

The route controller 311 conducts processing for route control such as routine protocol of the IPv4, and controls a packet forwarding route. The route controller 311 registers entries necessary for the route control information table 323, the forwarding table 324, and the terminal information table 325 from information on the interface information table 321, the L2VPN information table 322, and the routing protocol. The routing protocol represents a protocol for neighborhood search such as address resolution protocol (ARP), or a protocol for conducting the route control of the layer 3 such as border gateway protocol (BGP) or open shortest path first (OSPF). In this embodiment, the ARP is used as the protocol for the neighborhood search, and the protocol for conducting the route control of the layer 3 is not particularly designated.

The VPN connection controller 312 controls the packet forwarding route for conducting a communication between the IPVPN network 102 and the L2VPN network 103, and registers entries necessary for the forwarding table 324 and the terminal information table 325 on the basis of the information related to the route from the route controller 311.

The packet forwarding processor 313 forwards the packets received by the respective interfaces 301 and 302 on the basis of the forwarding table 324 and the terminal information table 325. Also, the packet forwarding processor 313 has a function of determining whether the packet is to be forwarded between the interfaces or processed by the device per se, and forwards the packet to the route controller 311 if the packet is to be processed by the device per se. The packet to be processed by the device per se represents the packet such as the routing protocol.

FIG. 4 is an illustrative view of the interface information table 321 illustrated in FIG. 3. The interface information table 321 manages various pieces of information on the respective interfaces 301 and 302 provided in the network device 111. In the interface information table 321, various pieces of information is associated with an interface number 401. The interface number 401 represents numbers indicative of the respective interfaces 301 and 302. In this embodiment, IF1 is set as the interface number of the interface 301. Likewise, IF2 is set as the interface number of the interface 302. A VPN number 402 is a field indicating the number of the connected VPN when the interface is connected to the VPN network. The interface not connected to the VPN, that is, the interface connected to the MAC-in-MAC network is set with "-" indicating that the interface is not connected to the VPN. A VLAN number 403 is a field indicative of a VLAN number for conducting the communication using the interface. The interface using no VLAN is set with "-" indicating that no VLAN is used. An interface type 404 is any one of two values of "IPVPN" and "MAC-in-MAC", and indicates whether the interface is connected to the IPVPN network, or the MAC-in-MAC network. An IP address/prefix length 405 represents an IP address set for the interface and a prefix length thereof. The interface set with no IP address is set with "-" indicating that no IP address is set.

The interface information table 321 is registered by the route controller 311 on the basis of the setting of the interfaces 301 and 302 which have been set by a manager of the network device according to a network configuration in advance. The same VPN number and the same VLAN number may be stored in the VPN number 402 and the VLAN number 403 in the interface information table 321, respectively, even if the interface number 401 is different.

In the example of FIG. 4, in a first entry, the interface 301 (IF1) is connected to VPN number 100, and the IF1 uses VLAN 10, and is connected to the IPVPN network. The IP address of the interface is 10.0.0.1, and the prefix length thereof is 24. In a second entry, the interface 302 (IF2) is not connected to the VPN network, uses no VLAN, is connected to the MAC-in-MAC network, and set with no IP address of the interface.

FIG. 5 is an illustrative view of the L2VPN information table 322 illustrated in FIG. 3. The L2VPN information table 322 stores information related to the layer 3 for allowing the network device 111 to conduct a layer 3 communication with the L2VPN network that establishes the layer 2 connection with MAC-in-MAC network 101 therein. In the L2VPN information table 322, the IP address/prefix length are associated with a VPN number 501 and a VLAN number 502. The VPN number 501 represents the VPN number of the network to be subjected to the layer 3 communication, and the VLAN number 502 represents the VLAN number of the L2VPN network to be subjected to the layer 3 communication. An IP address/prefix length 503 represents the IP address and the prefix length of the network device 111 corresponding to the VPN number and the VLAN number.

The L2VPN information table 322 is registered by the route controller 311 on the basis of the setting of the IP address for allowing the PE1 to conduct the layer 3 packet forwarding to the L2VPN network 103, which have been set by the manager of the network device in advance.

In the example of FIG. 5, in the first entry, when the VPN number 501 is 100, and the VLAN number 502 is 20, the IP address/prefix length are 20.0.0.1/24. That is, the network device 111 uses the IP address 20.0.0.1/24 for the communication object of the VPN 100 and the VLAN number 20.

FIG. 6 is an illustrative view of the route control information table 323 illustrated in FIG. 3. The route control information table 323 stores route information used for the layer 3 routing by the route controller 311. The route control information table 323 stores route information on the network device per se based on the interface information table 321, and route information obtained according to the routing protocol. In the route control information table 323, a VPN number 601 and an IP address/prefix length 602 are associated with an output interface number 603 and a next hop information 604. The VPN number 601 represents a VPN number using its entry, and the IP address/prefix length 602 represent the IP address and the prefix length of the route. The output interface number 603 represents an interface number that outputs the packet when using that entry, and the next hop information 604 represents a next hop of the layer 3 when using that entry. The next hop information 604 stores the next hop of the layer 3 therein in the case of the route information obtained according to the routing protocol, and stores "-" indicating that the next hop is undetermined when storing the route information on the network device per se.

In the route control information table 323, the route controller 311 registers the route information on the network device per se based on the interface information table 321 as an initial value. In the entry in which the interface type 404 of the interface information table 321 is IPVPN, the VPN number 402 is associated with the VPN number 601, the IP address/prefix length 405 is associated with the IP address/prefix length 602, the interface number 401 is associated with the output interface number 603, and "-" is stored in the next hop information 604. The route information obtained according to the routing protocol is registered in the route controller 311.

In the example of FIG. 6, the first entry is associated with the first entry of the interface information table 321. The VPN number 601 is 100, the IP address/prefix length 602 is 10.0.0.1/24, the output interface number 603 is IF1, and the next hop information 604 is "-". The second entry and the third entry are the route information obtained according to the respective routing protocols. In the second entry, the VPN number 601 is 100, the IP address/prefix length 602 is 11.0.0.0/24, the output interface number 603 is IF1, and the next hop information 604 is 10.0.0.10. In the third entry, the VPN number 601 is 100, the IP address/prefix length 602 is 30.0.0.0/24, the output interface number 603 is IF2, and the next hop information 604 is 20.0.0.21.

FIG. 7 is an illustrative view of the forwarding table 324 illustrated in FIG. 3. The forwarding table 324 is used for conducting the layer 3 packet forwarding by the packet forwarding processor 313. On the forwarding table 324 are registered an entry based on the route control information table 323, an entry based on the L2VPN information table 322, an entry created according to a protocol related to neighborhood search such as the ARP by the VPN connection controller 312. In the forwarding table 324, a VPN number 701 and an IP address/prefix length 702 are associated with an output interface number 703, a next hop information 704, and an additional information 705. The VPN number 701 represents a VPN number using that entry, and the IP address/prefix length 702 represent the IP address and the prefix length of the route. The output interface number 703 represents an interface number that outputs the packet when using that entry, and the next hop information 704 represents the layer 3 next hop when using that entry. The output interface number 703 stores "-" in the case of the entry based on the L2VPN information table 322. The next hop information 704 stores, when there is the next hop information in the basic entry based on the route control information table 323, a value of the basic entry, and in the other cases, "-" therein. The additional information 705 stores the MAC address used to create the MAC-in-MAC header therein when the entry represents that the packet is forwarded to the MAC-in-MAC network. In the other cases, the additional information 705 stores "-" therein.

In the forwarding table 324, the entry based on the route control information table 323 is divided into two kinds of registration methods according to the value of the interface type 404 in the entry of the interface information table 321 related to the interface of the output interface number 603. In the entry in which the interface type 404 is IPVPN, a corresponding entry is registered by the route controller 311. More specifically, a value of the VPN number 601 is stored in the VPN number 701, a value of the IP address/prefix length 602 is stored in the IP address/prefix length 702, and a value of the output interface number 603 is stored in the output interface number 703. Also, a value of the next hop information 604 is stored in the next hop information 704, and "-" is stored in the additional information 705. The entry in which the interface type 404 is not the IPVPN will be described in detail with reference to FIG. 21 later. The entry based on the L2VPN information table 322 is registered as an initial value by the route controller 311. A value of the VPN number 501 is stored in the VPN number 701, a value of the IP address/prefix length 503 is stored in the IP address/prefix length 702, "-" is stored in the output interface number 703, "-" is stored in the next hop information 704, and "-" is stored in the additional information 705. The entry created according to the protocol related to the neighborhood search such as the ARP by the VPN connection controller 312 will be described in detail with reference to FIGS. 18 and 19 later.

In the example of FIG. 7, the first entry and the second entry are registered by the route controller 311 on the basis of the first entry and the second entry of the route control information table. In the first entry, the VPN number 701 is 100, the IP address/prefix length 702 are 10.0.0.1/24, the output interface number 703 is IF1, the next hop information 704 is "-", and the additional information 705 is "-". In the second entry, the VPN number 701 is 100, the IP address/prefix length 702 are 11.0.0.1/24, the output interface number 703 is IF1, the next hop information 704 is 10.0.0.10, and the additional information 705 is "-". The third entry is registered by the VPN connection controller 312 on the basis of the L2VPN information table 322. The VPN number 601 is 100, and the IP address/prefix length 602 is 30.0.0.0/24. "-" is stored in the output interface number 703, "-" is stored in the next hop information 704, and "-" is stored in the additional information 705. The fourth and fifth entries are registered according to the protocol related to the neighborhood search such as the ARP by the VPN connection controller 312. In the fourth entry, the VPN number 701 is 100, the IP address/prefix length 702 are 20.0.0.20/32, the output interface number 703 is IF2, the next hop information 704 is "-", and the additional information 705 is a MAC address 2222.2222.2222. In the fifth entry, the VPN number 701 is 100, the IP address/prefix length 702 are 20.0.0.21/32, the output interface number 703 is IF2, the next hop information 704 is "-", and the additional information 705 is a MAC address 2222.2222.2222. The sixth entry is registered on the basis of the third entry of the route control information table 323 by the VPN connection controller 312. In the sixth entry, the VPN number 701 is 100, the IP address/prefix length 702 are 30.0.0.0/24, the output interface number 703 is IF2, the next hop information 704 is 20.0.0.21, and the additional information 705 is a MAC address 2222.2222.2222.

Figure 8:
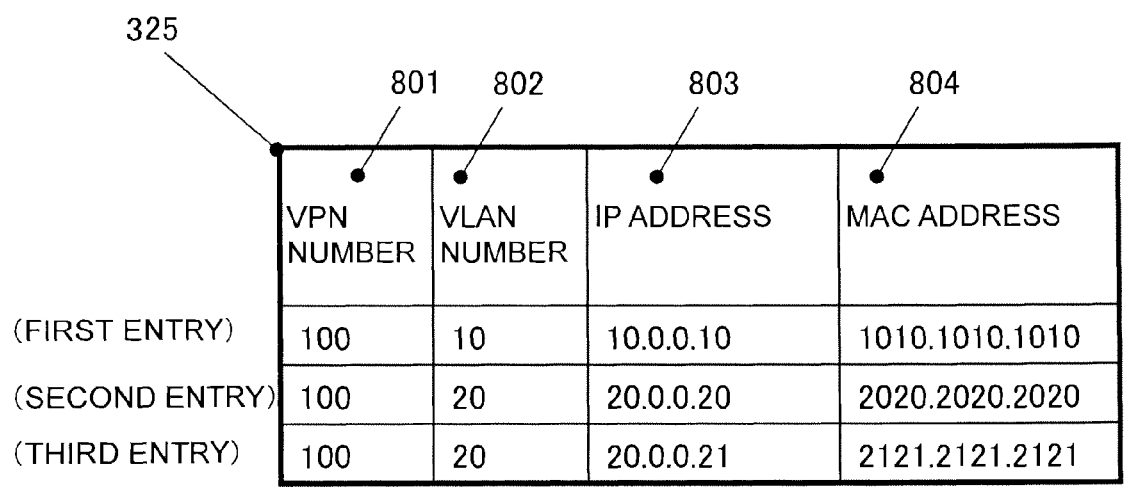
FIG. 8 is an illustrative view of a terminal information table 325 illustrated in FIG. 3.

FIG. 8 is an illustrative view of the terminal information table 325 illustrated in FIG. 3. The terminal information table 325 stores the results of the neighborhood search such as the ARP by the route controller 311 and the VPN connection controller 312, and is also used for conducting the layer 3 packet forwarding by the packet forwarding processor 313. In the terminal information table 325, a VPN number 801, a VLAN number 802, and an IP address 803 are associated with a MAC address 804. The VPN number 801 represents a VPN number using that entry, and the VLAN number 802, the IP address 803, and the MAC address 804 store information on the terminal obtained by the neighborhood search such as the ARP therein.

There are two cases in which the terminal information table 325 stores the results of the neighborhood search which is processed between the route controller 311 and the VPN network by the route controller 311, and the terminal information table 325 stores the results of the neighborhood search which is processed through the MAC-in-MAC network by the VPN connection controller 312. The respective cases will be described in detail with reference to FIGS. 14, 15, 18, and 19 later.

In the example of FIG. 8, the first entry is registered by the route controller 311, and the VPN number 801 is 100, the VLAN number 802 is 10, the IP address 803 is 10.0.0.10, and the MAC address 804 is 1010.1010.1010. The second entry and the third entry are registered by the VPN connection controller. In the second entry, the VPN number 801 is 100, the VLAN number 802 is 20, the IP address 803 is 20.0.0.20, and the MAC address 804 is 2020.2020.2020. In the third entry, the VPN number 801 is 100, the VLAN number 802 is 20, the IP address 803 is 20.0.0.21, and the MAC address 804 is 2121.2121.2121.

A2. Description of Specific Procedure for Communication

Now, a description will be given of a relationship among a specific procedure for communication, the respective tables provided in the device, and the packets to be forwarded according to the first embodiment of the present invention.

(1) Flow from IPVPN to L2VPN

First, a description will be given of a specific procedure when the terminal within the IPVPN network 102 communicates with the terminal within the L2VPN network 103.

First, the general operation will be described.

FIG. 39 is an illustrative view of a flow of the packet when a communication is conducted from the terminal 1 within the IPVPN network 102 toward the terminal 2 within the L2VPN network 103.

When the terminal 1 transmits a packet PA11, the PA11 arrives at the PE1 through the CE1. The PE1 searches the forwarding table 324 by using the IP address of the terminal 2 which is a destination IP address of the packet PA11. If there is no entry necessary for the packet forwarding, the PE1 temporarily saves the packet, and conducts the neighborhood search according to the ARP.

The PE1 transmits an ARP request packet PA12 to the terminal 2 through the MAC-in-MAC network 101.

When the terminal 2 returns an ARP reply packet PA13 as a reply to the ARP request packet, the ARP reply packet PA13 arrives at the PE1 through the MAC-in-MAC network 101.

The PE1 updates the forwarding table 324 and the terminal information table 325 according to the ARP reply packet PA13. Also, the PE1 conducts the forwarding processing of the packet PA11 that has been temporarily saved by using that information, and transmits a packet PA14. The packet PA14 arrives at the terminal 2 through the MAC-in-MAC network 101.

Thereafter, a packet PA15 transmitted toward the terminal 2 by the terminal 1 can obtain a necessary entry by searching the forwarding table 324 by the PE1, and the packet processing is conducted without conducting the neighborhood search according to the ARP. A packet PA16 is transmitted, and can arrive at the terminal 2.

Hereinafter, the operation of the PE1 in a flow of the packet illustrated in FIG. 39 will be described in detail with reference to the packet format and the tables.

It is assumed that the interface information table 321, the L2VPN information table 322, and the route control information table 323 are in the states of FIGS. 4, 5, and 6 before the PE1 receives the packet PA11 in FIG. 39, respectively. Those tables are registered on the basis of the information set by the network manager in advance, and the information obtained according to the routing protocol.

FIG. 40 is an illustrative view illustrating an initial state of the forwarding table 324 before the PE1 receives the packet PA11 of FIG. 39. As described in FIG. 7, the first entry and the second entry are registered on the basis of the route control information table 323, and the third entry is registered on the basis of the L2VPN information table 322.

It is assumed that in an initial state of the terminal information table 325, no entry is registered.

When the terminal 1 transmits the packet PA11, the packet PA11 arrives at the interface 301 (IF1) of the PE1. The packet PA11 has a format of the packet format 201 illustrated in FIG. 2.

A procedure since the PE1 receives the packet PA11 until the PE1 transmits the ARP request packet PA12 will be described with reference to FIG. 41.

The PE1 searches an entry corresponding to the interface IF1 that has received the packet from the interface information table 321 illustrated in FIG. 4 as an initial procedure for obtaining a forwarding destination of the packet PA11 (A31), and finds the first entry. The PE1 then acquires the VPN number (100) from the VPN number 402 of the first entry. Also, at the same time, the PE1 acquires the destination IP address (20.0.0.20) included in the IP packet 212 of the received packet. The destination IP address is an IP address of the terminal 2.

Then, the PE1 searches the forwarding table 324 illustrated in FIG. 40 by using the acquired VPN number (100) and destination IP address (20.0.0.20) so as to obtain the forwarding destination (A32, A33). The third entry is found, but because the output interface number 703 is undetermined, the packet forwarding destination is unclear. Therefore, the PE1 determines that there is a need to conduct the neighborhood search, and the packet PA11 is temporarily saved, and an ARP request packet PA12 transmission is processed.

The PE1 needs to obtain the VLAN number in producing the ARP request packet PA12 illustrated in FIG. 39. However, because the output interface number 703 is undetermined, the PE1 searches the L2VPN information table 322 illustrated in FIG. 5 by using the VPN number (100) and the destination IP address (20.0.0.2) (A34, A35, A36), finds the first entry, and obtains the VLAN number (20) from the VLAN number 502.

Thereafter, the PE1 creates the ARP request packet by using the information obtained up to now. The format of the packet to be created is the packet format 200 illustrated in FIG. 2. The destination PE MAC address 221 is set to a broadcast address, the source PE MAC address 222 is set to the MAC address of the PE1, the VPN information 223 is set to the acquired VPN number (100) (A37), and the destination user MAC address 224 is set to the broadcast address. Also, the source user MAC address 225 is set to the MAC address of the PE1, the user VLAN tag 226 is set to the VLAN number (20) acquired from the first entry of the L2VPN information table 322 (A38), and the IP packet 212 is set to the format of a general ARP packet for transmitting the ARP request of the destination IP address (20.0.0.2) (A39).

The PE1 transmits the created ARP request packet PA12 toward the MAC-in-MAC network.

When the ARP request packet PA12 passes through the PE2, the MAC-in-MAC header 210 is deleted. Thereafter, the ARP request packet PA12 passes through the CE2, and arrives at the terminal 2 in the form of the packet format 201. The terminal 2 returns the ARP reply packet in the form of the packet format 201 as a reply to the ARP request packet. The ARP reply packet passes through the CE2, and then passes through the PE2 with the addition of the MAC-in-MAC header 210. The packet PA13 that has been in the form of the packet format 200 arrives at the PE1. The PE2 is a device that operates by a general technique, and therefore a description thereof will be omitted.

A procedure since the PE1 receives the PA13 until the PE1 transmits a packet PA14 will be described with reference to FIGS. 42, 43, and 44.

A procedure since receiving the PA13 until updating the tables in the PE1 will be described with reference to FIG. 42.

In order to determine the contents to be processed as a first procedure for processing related to the ARP reply packet PA13 reception, the PE1 searches an entry corresponding to the interface IF2 that has received the packet from the interface information table 321 illustrated in FIG. 4 (A41), finds the second entry, and determines that the processing when the packet is received from the interface in which the interface type is the MAC-in-MAC is conducted.

Then, the PE1 registers an entry corresponding to the received ARP reply packet on the terminal information table 325 and the forwarding table 324. The entry to be registered on the terminal information table 325 is necessary to create the destination user MAC address 224 and the user VLAN tag 226 in forwarding the packet to the terminal 2. The entry to be registered on the forwarding table 324 is necessary to determine an output target interface in forwarding the packet to the terminal 2, and create the destination PE MAC address 221.

The contents of the second entry in the example illustrated in FIG. 8 are registered on the terminal information table 325. The VPN number 801 is stored in the VPN information 223 of the received packet PA13, and the VPN number (100) to which the terminal 2 belongs (A42). The VLAN number 802 is stored in the user VLAN tag 226 of the received packet PA13, and the VLAN number (100) to which the terminal 2 belongs (A42). The VLAN number 802 is stored in the user VLAN tag 226 of the received packet PA13, and the VLAN number (20) to which the terminal 2 belongs (A43). The IP address 803 is the IP address (20.0.0.20) of the terminal 2 of the ARP packet stored in the IP packet 212 (A44). The MAC address 804 is the MAC address (2020.2020.2020) of the terminal 2 of the ARP packet stored in the IP packet 212 (A45).

The contents of the fourth entry in the example illustrated in FIG. 7 are registered on the forwarding table 324. The VPN number 701 is stored in the VPN information 223 of the received packet PA13, and the VPN number (100) to which the terminal 2 belongs (A46). The IP address/prefix length 702 are the IP address (20.0.0.20) of the terminal 2 of the ARP packet stored in the IP packet 212, and 32 which is a maximum prefix length (A47). The output interface number 703 is the IF2 which is an interface that receives the packet PA13 (A48), and the next hop information 704 is "-" representing that the next hop information 704 is not set because the next hop information 704 is unnecessary in this case. The additional information 705 is the MAC address (2222.2222.2222) of the PE2 stored in the source PE MAC address 222 of the received packet PA13 (A49). The source PE MAC address of the packet PA13 is created by the PE2, and the address of the PE2 is stored.

FIG. 43 is an illustrative view illustrating a state of the forwarding table 324 and the terminal information table 325 after the table has been updated as illustrated in FIG. 42. In the forwarding table 324, the fourth entry is added to FIG. 40 which is a state before the packet PA11 is received. In the terminal information table 325, the second entry is added from a state in which there is no entry.

A description will be given of a procedure until the forwarding processing of the PA11 temporarily saved is conducted to transmit the packet PA14, using the updated table, after the table update processing illustrated in FIG. 42 has been completed, with reference to FIG. 44.

The PE1 searches the forwarding table 324 illustrated in FIG. 43 according to the VPN number (100) and the destination IP address (20.0.0.20) which have been acquired (A31) in the procedure described in FIG. 41, and obtains the forwarding destination (A32, A33). This search is a longest match search using the IP address, and not the third entry but the fourth entry longer in the prefix length is found, and the output interface number 703 is the IF2 in the fourth entry. Therefore, the processing for forwarding the packet toward the IF2 is conducted. Because the interface type of the IF2 is the MAC-in-MAC in the interface information table 321, the packet is forwarded to the MAC-in-MAC network, that is, the packet of the packet format 200 is created and forwarded.

In order to create the packet to be forwarded, there is a need to obtain the VLAN number and the MAC address in addition to the forwarding table 324. Therefore, with reference to the VPN number (100) and the destination IP address (20.0.0.20), the PE1 searches the terminal information table 325 illustrated in FIG. 43 (A61, A62), and finds the second entry. The PE1 uses the VLAN number and the MAC address of this entry for packet creation.

The PE1 creates the packet PA14 illustrated in FIG. 39 by using the information obtained up to now. The format of the packet to be created is the packet format 200 illustrated in FIG. 2. The destination PE MAC address 221 is set to the MAC address (2222.2222.2222) of the PE2 stored in the additional information 705 of the fourth entry in the forwarding table 324. The source PE MAC address 222 is set to the MAC address of the PE1, the VPN information 223 is set to the acquired VPN number (100) (A64), and the destination user MAC address 224 is set to the MAC address (2020.2020.2020) of the terminal 2 stored in the MAC address 804 of the second entry in the terminal information table 325 (A65). The source user MAC address 225 is set to the MAC address of the PE1, the user VLAN tag 226 is set to the VLAN number (20) to which the terminal 2 belongs, which is stored in the VLAN number 802 of the second entry in the terminal information table 325 (A66), and the IP packet 212 is not changed from the packet PA11.

Finally, the PE1 transmits the created packet PA14 toward the IF2 that is an interface connected to the MAC-in-MAC network, which is stored in the output interface number 703 of the forwarding table 324.

The MAC-in-MAC header 210 is deleted from the packet PA14 when the packet PA14 passes through the PE2, and thereafter the packet PA14 passes through the CE2, and arrives at the terminal 2 in the form of the packet format 201.

The PE2 is a device that operates by a general technique, and therefore a description thereof will be omitted.

Thereafter, the packet PA15 to be transmitted toward the terminal 2 by the terminal 1 can obtain the fourth entry from the beginning by allowing the PE1 to search the forwarding table 324. The processing described in FIG. 44 is conducted to create and forward the packet PA16 without conducting the neighborhood search according to the ARP. The packet PA16 arrives at the terminal 2 as with the packet PA14.

(2) Flow from L2VPN to IPVPN

Subsequently, a description will be given of a specific procedure in which the terminal within the L2VPN network 103 communicates with the terminal within the IPVPN network 102.

First, the general operation will be described.

FIG. 45 is an illustrative view of a flow of the packet when the terminal 2 within the L2VPN network 103 communicates toward the terminal 1 within the IPVPN network 102.

When the terminal 2 transmits a packet PA71, the PA71 arrives at the PE1 through the CE2 and the PE2. The PE1 searches the forwarding table 324 by using the IP address of the terminal 1 which is a destination IP address of the packet PA71 to find that a subsequent forwarding destination is the CE1. Then, the PE1 searches the terminal information table 325 for the CE1, and if there is no entry necessary for the packet forwarding, the PE1 temporarily saves the packet, and conducts the neighborhood search according to the ARP.

The PE1 transmits an ARP request packet PA72 to the CE1 toward the IPVPN network 102, and the ARP request packet PA72 arrives at the CE1.

When the CE1 returns the ARP reply packet in response to the ARP request packet, a packet PA73 arrives at the PE1.

The PE1 updates the terminal information table 325 by the aid of the ARP reply packet PA73, conducts the forwarding processing of the packet PA71 temporarily saved by using information thereof, and transmits a packet PA74. The packet PA74 passes through the CE1, and arrives at the terminal 1.

Thereafter, a packet PA75 transmitted toward the terminal 1 by the terminal 2 can obtain a necessary entry by searching the forwarding table 324 and the terminal information table 325 by the PE1, and the packet processing is conducted without conducting the neighborhood search according to the ARP. A packet PA76 can be transmitted, and arrive at the terminal 1.

Hereinafter, the operation of the PE1 in a flow of the packet illustrated in FIG. 45 will be described in detail with reference to the packet format and the tables.

It is assumed that the interface information table 321, the L2VPN information table 322, and the route control information table 323 are in the states of FIGS. 4, 5, and 6 before the PE1 receives the packet PA11 in FIG. 39, respectively. Those tables are registered on the basis of the information set by the network manager in advance, and the information obtained according to the routing protocol.

An initial state of the forwarding table 324 before the PE1 receives the packet PA11 of FIG. 39 is identical with that illustrated in FIG. 40.

It is assumed that in an initial state of the terminal information table 325, no entry is registered.

When the terminal 2 transmits the packet PA71, the packet PA71 passes through the PE2, and arrives at the interface 302 (IF2) of the PE1. The packet PA71 that arrives at the PE1 has a format of the packet format 200 illustrated in FIG. 2.

A procedure since the PE1 receives the packet PA71 until the PE1 transmits the ARP request packet PA72 will be described with reference to FIG. 46.

The PE1 searches an entry corresponding to the interface IF2 that has received the packet from the interface information table 321 illustrated in FIG. 4 as an initial procedure for obtaining a forwarding destination of the packet PA71 (A81), and finds the second entry. The interface type 404 of the second entry is the MAC-in-MAC, and in this case, the PE1 acquires both of the VPN number and the destination IP address from the received packet. In the received packet, the VPN number is the VPN number (100) included in the VPN information 223, and the destination IP address is the destination IP address (11.0.0.11) included in the IP packet 212. The destination IP address is the IP address of the terminal 1.

Then, the PE1 searches the forwarding table 324 illustrated in FIG. 40 by using the acquired VPN number (100) and destination IP address (11.0.0.11) so as to obtain the forwarding destination (A82, A83). The second entry is found, and in the forwarding destination of the packet, the output interface number 703 is the IF1, and the next hop information 704 is 10.0.0.10 of the CE1. Because the output interface number 703 is the IF1 in the second entry, the PE1 conducts processing for forwarding the packet toward the IF1. Because the interface type of the IF1 is IPVPN in the interface information table 321, the PE1 forwards the packet toward the IPVPN network, that is, creates and forwards the packet of the packet format 201.

Subsequently, in order to obtain the MAC address of the CE1 that is a forwarding destination of the packet, the PE1 searches the terminal information table 325 according to the VPN number (100) and the IP address (10.0.0.10) of the CE1 (S84, S85). However, because there is no entry, the PE1 determines that the neighborhood search of the packet forwarding destination needs to be conducted, temporarily saves the packet PA71, and conducts the processing of the ARP request packet PA72 transmission.

The PE1 needs to obtain the VLAN number in creation of the ARP request packet PA72 illustrated in FIG. 45, searches the interface information table 321 by the IF1 that is the forwarding destination of the packet (A86), finds the first entry, and obtains the VLAN number (10) from the VLAN number 403.

Thereafter, the PE1 creates the ARP request packet PA72 by using the information obtained up to now. The format of the packet to be created is the packet format 201 illustrated in FIG. 2. The destination user MAC address 224 is set to a broadcast address, the source user MAC address 225 is set to the MAC address of the PE1, the user VLAN tag 226 is set to the VLAN number (10) (A87) acquired from the first entry of the interface information table 321, and the IP packet 212 is set to the format of the general ARP packet for transmitting the ARP request of the IP address (10.0.0.10) of the CE1 which is the forwarding destination (A88).

The PE1 transmits the created ARP request packet PA72 toward the IF1 which is an interface of the forwarding destination.

The ARP request packet PA72 arrives at the CE1. The CE1 returns the ARP reply packet PA73 in the form of the packet format 201 in response to the ARP request packet, and the packet PA73 arrives at the PE1.

A procedure since the PE1 receives the packet PA73 until the PE1 transmits the PA74 will be described with reference to FIGS. 47, 48, and 49.

A procedure since receiving the packet PA73 until updating the tables in the PE1 will be described with reference to FIG. 47.

In order to determine the contents to be processed as a first procedure for processing related to the ARP reply packet PA73 reception, the PE1 searches an entry corresponding to the interface IF1 that has received the packet from the interface information table 321 illustrated in FIG. 4 (A91), finds the first entry, and determines that the processing when the packet is received from the interface in which the interface type is the IPVPN is conducted.

Then, the PE1 registers an entry corresponding to the received ARP reply packet on the terminal information table 325. The entry registered on the terminal information table 325 is necessary to create the destination user MAC address 224 of the packet format and the user VLAN tag 226 in forwarding the packet to the terminal 1.

The contents of the first entry in the example illustrated in FIG. 8 are registered on the terminal information table 325. The VPN number 801 is stored in the VPN number 402 of the first entry in the interface information table 321 obtained by search of A91, and the VPN number (100) to which the CE1 belongs (A92). The VLAN number 802 is stored in the user VLAN tag 226 of the received packet PA73, and the VLAN number (10) to which the CE1 belongs (A93). The IP address 803 is the IP address (10.0.0.10) of the CE1 of the ARP packet stored in the IP packet 212 (A94). The MAC address 804 is the MAC address (1010.1010.1010) of the CE1 of the ARP packet stored in the IP packet 212 (A95).

FIG. 48 is an illustrative view illustrating a state of the forwarding table 324 and the terminal information table 325 after the table has been updated as illustrated in FIG. 47. The forwarding table 324 is not changed from a time point of FIG. 40 illustrating an initial state, and in the terminal information table 325, the first entry is added from a state in which there is no entry.

A description will be given of a procedure until the forwarding processing of the PA71 temporarily saved is conducted to transmit the packet PA74, using the updated table, after the table update processing illustrated in FIG. 47 has been completed, with reference to FIG. 49.

A procedure until, in the procedure described in FIG. 46, the PE1 searches the interface information table 321 from the received interface (IF2) (A81), acquires the VPN number (100) and the destination IP address (11.0.0.11) from the packet received on the basis of the search results, searches the forwarding table 324 illustrated in FIG. 48 (A82, A83) to obtain the second entry, finds that the forwarding destination interface of the packet is the IF1, and the next hop is the CE1 (10.0.0.10), and searches the terminal information table 325, is identical with that described with reference to FIG. 46.

Because there is a need to obtain the VLAN number and the MAC address aside from the information on the forwarding table 324 in order to create the packet to be forwarded, the PE1 searches the terminal information table 325 illustrated in FIG. 48 by using the VPN number (100) and the IP address (10.0.0.10) of the CE1 which is an forwarding destination of the packet (A61, A62), and finds the first entry. The VLAN number and the MAC address of this entry are used for packet creation.

The PE1 creates the packet PA74 illustrated in FIG. 45 by using the information obtained up to now. The format of the packet to be created is the packet format 201 illustrated in FIG. 2. The destination user MAC address 224 is set to the MAC address (1010.1010.1010) of the CE1 stored in the MAC address 804 of the first entry in the terminal information table 325 (A113). The source user MAC address 225 is set to the MAC address of the PE1, the user VLAN tag 226 is set to the VLAN number (10) to which the CE1 belongs, which is stored in the VLAN number 802 of the first entry in the terminal information table 325 (A114), and the IP packet 212 is not changed from the packet PA71.

Finally, the PE1 transmits the created packet PA74 toward the IF1 which is an interface connected to the IPVPN network, which is stored in the output interface number 703 of the forwarding table 324.

The packet PA74 arrives at the terminal 1 in the form of the packet format 201 through the CE1. The CE1 is a device that operates by a general technique, and therefore a description thereof will be omitted.

Thereafter, the packet PA75 to be transmitted toward the terminal 1 by the terminal 2 can obtain the first entry from the beginning by allowing the PE1 to search the forwarding table 324. The processing described in FIG. 49 is conducted to create and forward the packet PA76 without conducting the neighborhood search according to the ARP. The packet PA76 arrives at the terminal 1 as with the packet PA74.

The above description is given of the specific procedure for communication in this embodiment, and the relationship between the respective tables provided in the device of this embodiment and the packets to be forwarded in order to conduct two-way communication between the terminal 1 belonging to the IPVPN network and the terminal 2 belonging to the L2VPN network.

A3. Operation of Network Device

Now, the operation of the network device 111 will be described.

(1) Packet Forwarding Processor 313

FIGS. 9, 10, 11, and 12 are flowcharts illustrating procedures of packet forwarding processing to be executed in the packet forwarding processor 313 of the network device 111.

Figure 9:
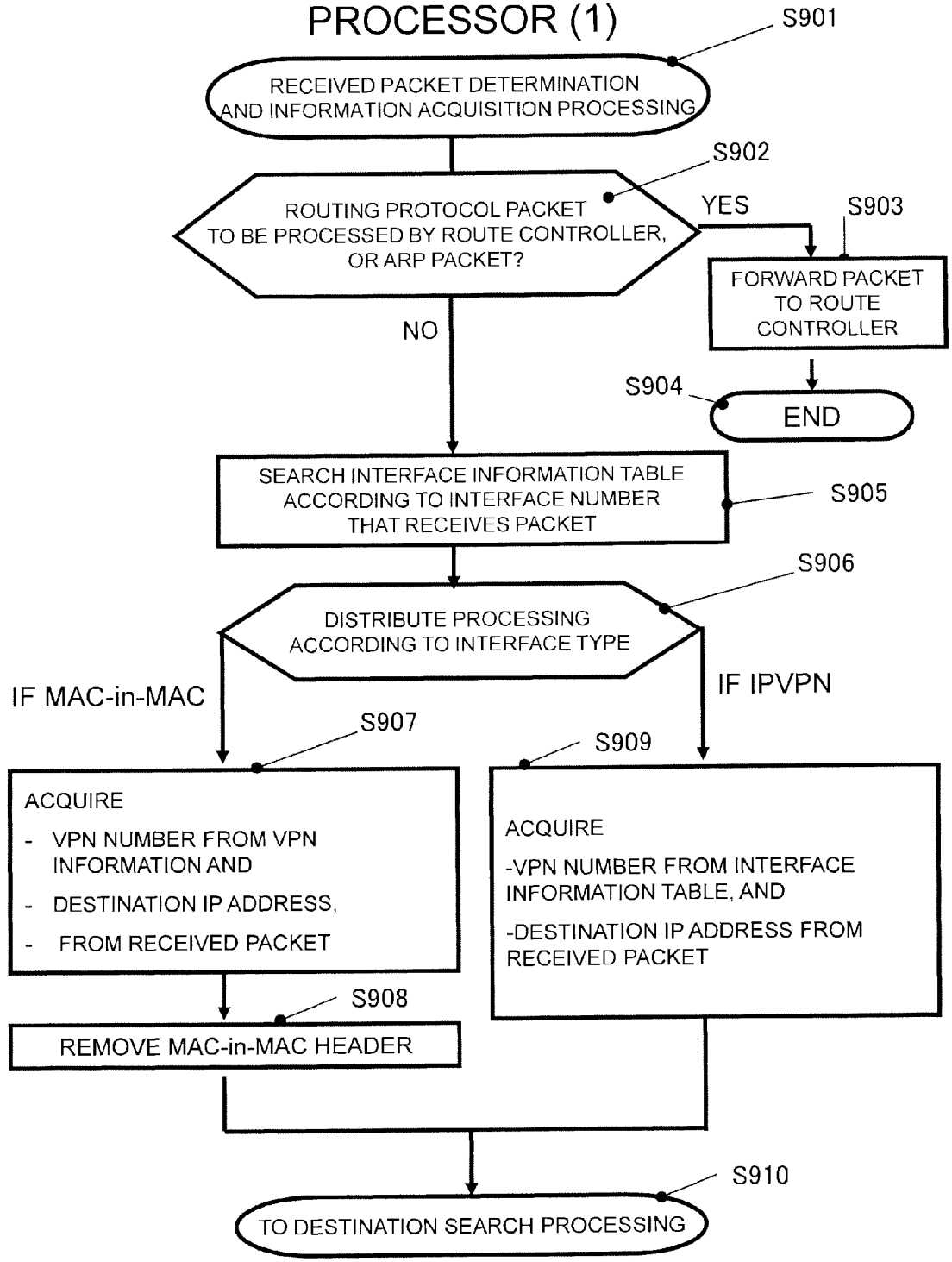
FIG. 9 is a flowchart illustrating a procedure from receiving a packet to acquiring information related to destination search.

FIG. 9 is a flowchart illustrating a procedure since receiving the packet until acquiring information related to the destination search.

Upon receiving the packet, the network device 111 starts processing for determining the received packet and acquiring information related to the destination search with respect to the packet received in the packet forwarding processor 313 (S901).

If the received packet is a packet of the routing protocol to be processed by the route controller 311 or a packet of the ARP (S902), the packet forwarding processor 313 forwards the packet to the route controller 311 (S903), and the packet forwarding processor 313 completes the processing (S904). A method of determining whether the received packet is the packet of the routing protocol or the packet of the ARP is conducted by general means without any change, and therefore, a description thereof will be omitted.

If the receive packet is not the packet of the routing protocol to be processed by the route controller 311 (S902), the packet forwarding processor 313 searches the interface information table 321 with an interface number that has received the packet as a search key (S905), and distributes the processing according to a value of the interface type 404 in the appropriate entry (S906).

If the interface type is the MAC-in-MAC in S906, the packet forwarding processor 313 receives the packet of the packet format 200 illustrated in FIG. 2, acquires the VPN number from the VPN information 223 of the received packet and the destination IP address from the IP packet 212 (S907), and deletes the MAC-in-MAC header 210 from the packet (S908).

If the interface type is the IPVPN in S906, the packet forwarding processor 313 receives the packet of the packet format 201 illustrated in FIG. 2, and acquires the VPN number from the VPN number 402 of the entry searched in S905 and the destination IP address from the IP packet 212 (S909).

Figure 10:
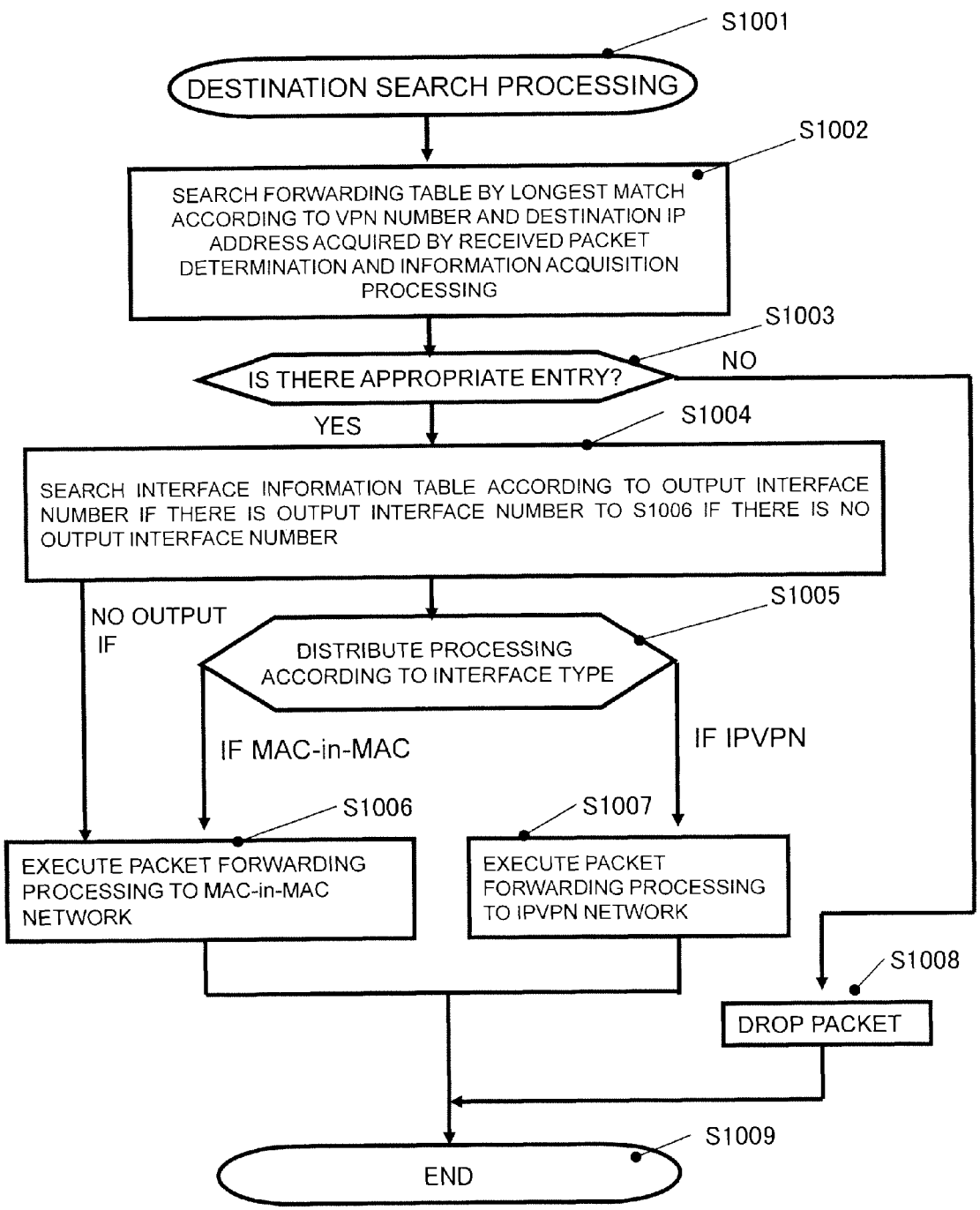
FIG. 10 is a flowchart illustrating a procedure until forwarding the packets after acquiring a VPN number and a destination IP address.

After the VPN number and the destination IP address have been acquired, the processing is continued to destination search processing in FIG. 10 (S910).

FIG. 10 is a flowchart illustrating a procedure until forwarding the packets after acquiring a VPN number and a destination IP address.

The processing is continued from S910 of FIG. 9 (S1001).

The packet forwarding processor 313 searches the forwarding table 324 with the acquired VPN number and destination IP address as search keys. The search is conducted by longest match search using the prefix length stored in the IP address/prefix length 702 of the forwarding table 324 (S1002). The packet forwarding processor 313 distributes the processing depending on whether there is an appropriate entry, or not (S1003).

If there is no appropriate entry in S1003, the packet forwarding processor 313 drops the received packet (S1008), and the packet forwarding processor 313 completes the processing (S1009).

If there is the appropriate entry in S1003, and the output interface number 703 of the appropriate entry is "-" indicative of no setting, the packet forwarding processor 313 shifts the processing of S1006, and executes the packet forwarding processing to the MAC-in-MAC network which will be described later with reference to FIG. 11 (S1006). Then, the packet forwarding processor 313 completes the processing (S1009).

If there is the appropriate entry in S1003, and the output interface number 703 of the appropriate entry is set, the packet forwarding processor 313 searches the interface information table 321 with the output interface number 703 as the search key (S1004), and distributes the processing according to the interface type 404 of the appropriate entry (S1005).

If the interface type is the MAC-in-MAC in S1005, the packet forwarding processor 313 executes the packet forwarding processing to the MAC-in-MAC network which will be described later with reference to FIG. 11 (S1006), and the packet forwarding processor 313 completes the processing (S1009).

If the interface type is the IPVPN in S1005, the packet forwarding processor 313 executes the packet forwarding processing to the IPVPN network which will be described with reference to FIG. 12 (S1007), and the packet forwarding processor 313 completes the processing (S1009).

Figure 11:
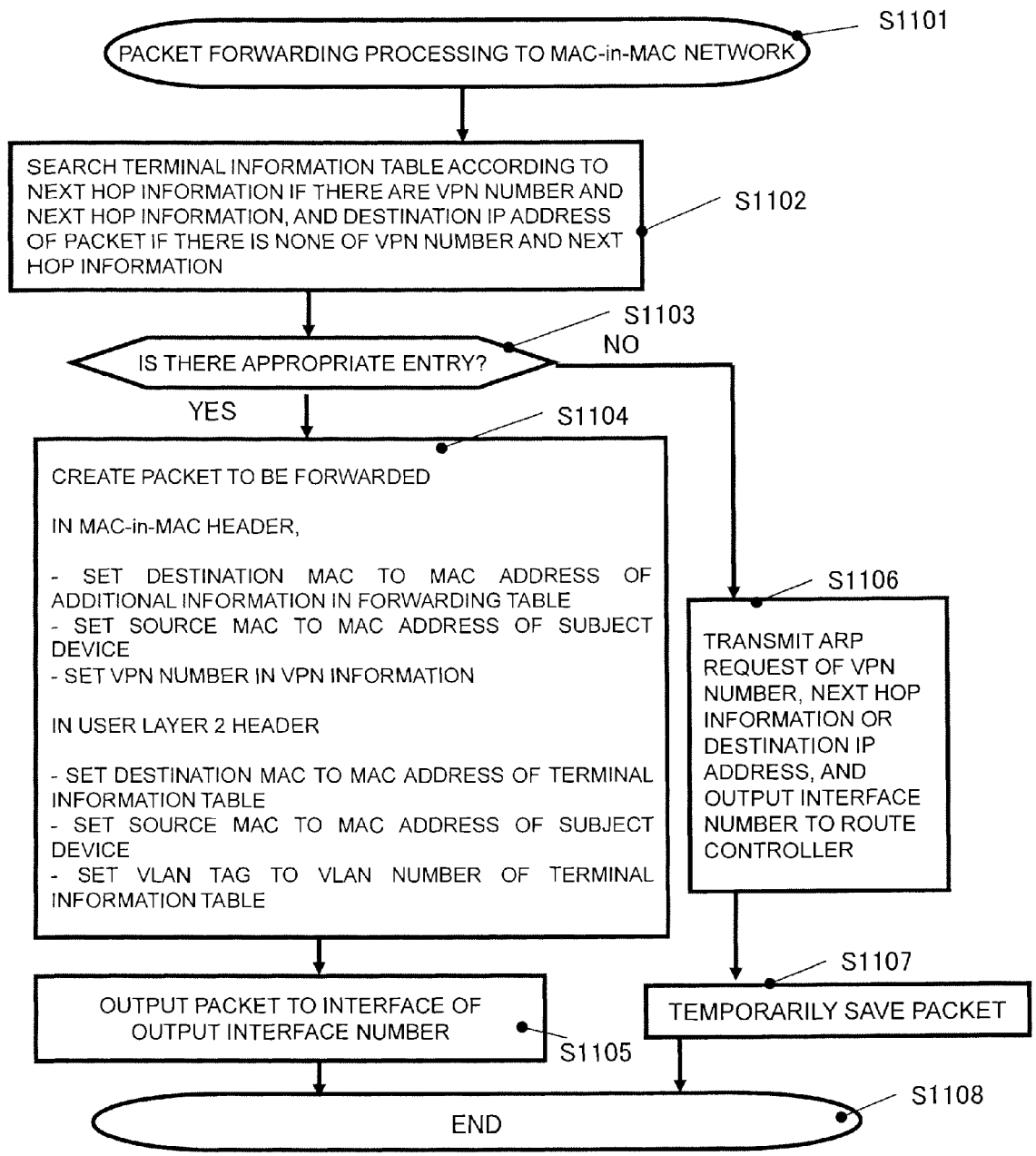
FIG. 11 is a flowchart illustrating a procedure of packet forwarding processing to a MAC-in-MAC network at S1006 in FIG. 10.

FIG. 11 is a flowchart illustrating a procedure of the packet forwarding processing to the MAC-in-MAC network in S1006 of FIG. 10.

In the flowchart of FIG. 10, if the processing arrives at S1006, the packet forwarding processing to the MAC-in-MAC network starts (S1101).

When the processing starts, the packet forwarding processor 313 searches the terminal information table 325 (S1102). As the values used for the search key, there are used the VPN number acquired in the flowchart of FIG. 9, and the next hop information 704 if the next hop information 704 of the entry searched in S1002 is set, and the destination IP address acquired in the flowchart of FIG. 9 if there is "-" indicating that the next hop information 704 is not set. The packet forwarding processor 313 searches an entry in which two values of the VPN number 801 and the IP address 803 match each other, without using the VLAN number 802 of the terminal information table 325 in this search. This search is unique if there is the appropriate entry.

The packet forwarding processor 313 distributes the processing according to whether there is the appropriate entry, or not, in the search of S1102 (S1103).

If there is no appropriate entry in S1103, the packet forwarding processor 313 transmits, to the route controller 311, the ARP request using the combination of the output interface number 703 of the entry searched in S1002 of FIG. 10 with the VPN number acquired in the flowchart of FIG. 9, and the next hop information 704 if the next hop information 704 searched in S1002 is set in the IP address, and the destination IP address acquired in the flowchart of FIG. 9 if there is "-" indicating that the next hop information 704 is not set (S1106). Thereafter, the packet forwarding processor 313 temporarily saves the received packet (S1107), and suspends the packet forwarding processing to the MAC-in-MAC network once (S1108). The packet temporarily saved in S1107 is used in S1804 of FIG. 18 which will be described later.

If there is the appropriate entry in S1103, the packet forwarding processor 313 creates the packet to be forwarded to the MAC-in-MAC network (S1104). The packet to be created has the format of the packet format 200 in FIG. 2. The destination PE MAC address 221 of the MAC-in-MAC header 210 is set to the MAC address stored in the additional information 705 of the entry searched in S1002, the source PE MAC address 222 of the MAC-in-MAC header 210 is set to the MAC address of the network device 111, and the VPN information 223 of the MAC-in-MAC header 210 is set to the VPN number acquired in the flowchart of FIG. 9. Also, the destination user MAC address 224 of the user layer 2 header 211 is set to the MAC address 804 stored in the entry searched in S1102, the source user MAC address 225 of the user layer 2 header 211 is set to the MAC address of the network device 111, the user VLAN tag 226 of the user layer 2 header 211 is set to the VLAN number 802 stored in the entry searched in S1102, and the IP packet 212 is not changed from the received packet. The IP header stored in the IP packet 212 may conduct the processing such as the TTL subtraction which is conducted by a general layer 3 relay processing, or those processing may be omitted and not conducted at all. This is not particularly referred to in this example.

Finally, the packet forwarding processor 313 outputs the packet created in S1104 to the output interface number 703 of the entry searched in S1002 (S1105), and completes the packet forwarding processing to the MAC-in-MAC network (S1108).

Figure 12:
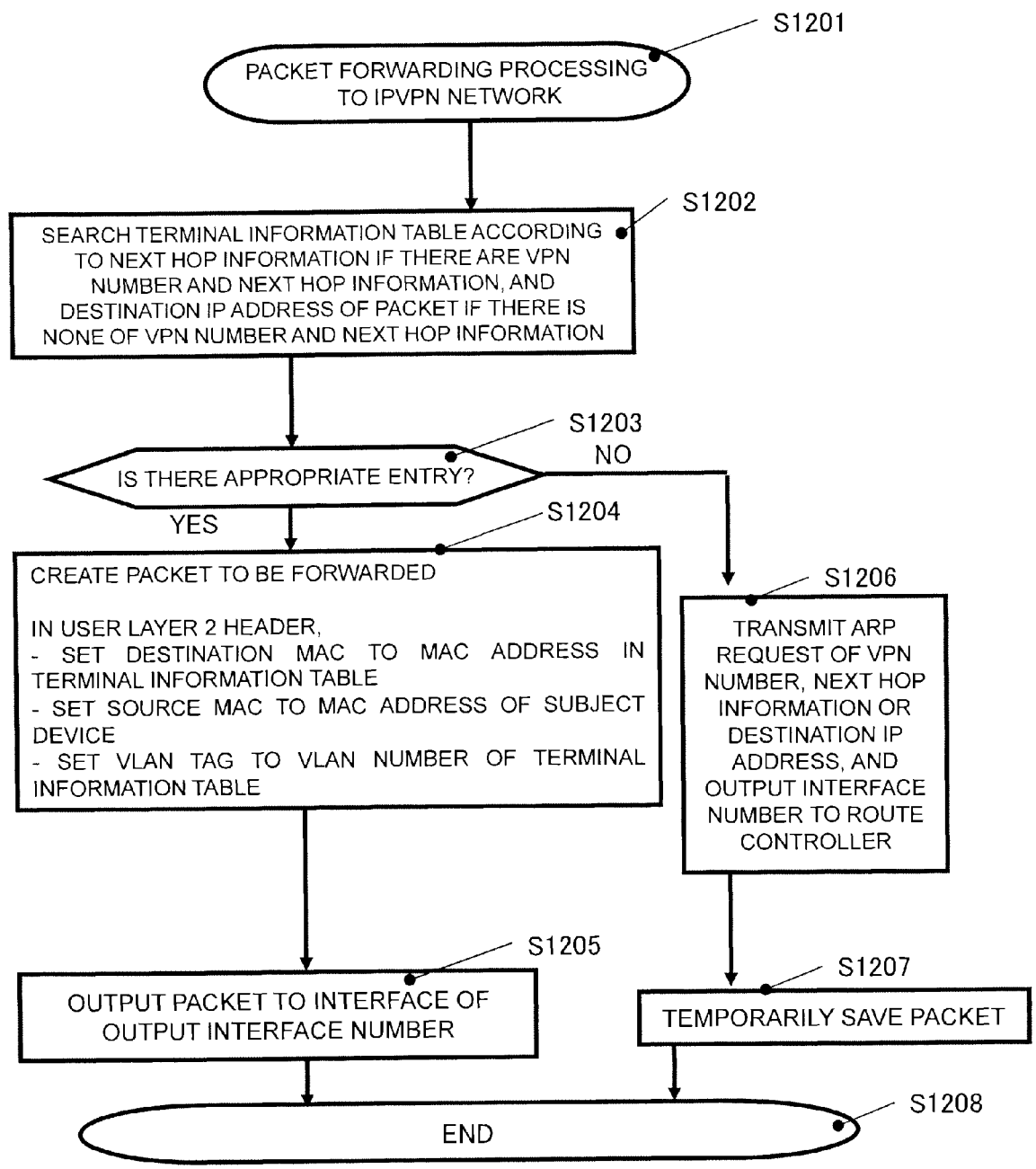
FIG. 12 is a flowchart illustrating a procedure of the packet forwarding processing to an IPVPN network at S1007 in FIG. 10.

FIG. 12 is a flowchart illustrating a procedure of the packet forwarding processing to the IPVPN network in S1007 of FIG. 10.

In the flowchart of FIG. 10, if the processing arrives at S1007, the packet forwarding processor 313 starts the packet forwarding processing to the IPVPN network (S1201).

When the processing starts, the packet forwarding processor 313 searches the terminal information table 325 (S1202). As the values used for the search key, there are used the VPN number acquired in the flowchart of FIG. 9, and the next hop information 704 if the next hop information 704 of the entry searched in S1002 is set, and the destination IP address acquired in the flowchart of FIG. 9 if there is "-" indicating that the next hop information 704 is not set. The packet forwarding processor 313 searches an entry in which two values of the VPN number 801 and the IP address 803 match each other, without using the VLAN number 802 of the terminal information table 325 in this search. This search is unique if there is the appropriate entry.

The packet forwarding processor 313 distributes the processing according to whether there is the appropriate entry, or not, in the search of S1202 (S1203).

If there is no appropriate entry in S1203, the packet forwarding processor 313 transmits, to the route controller 311, the ARP request using the combination of the output interface number 703 of the entry searched in S1002 of FIG. 10 with the VPN number acquired in the flowchart of FIG. 9, and the next hop information 704 if the next hop information 704 searched in S1002 is set in the IP address, and the destination IP address acquired in the flowchart of FIG. 9 if there is "-" indicating that the next hop information 704 is not set (S1206). Thereafter, the packet forwarding processor 313 temporarily saves the received packet (S1207), and suspends the packet forwarding processing to the IPVPN network once (S1208). The packet temporarily saved in S1207 is used in S1406 of FIG. 14 which will be described later.

If there is the appropriate entry in S1203, the packet forwarding processor 313 creates the packet to be forwarded to the IPVPN network (S1204). The packet to be created has the format of the packet format 201 in FIG. 2. The destination user MAC address 224 of the user layer 2 header 211 is set to the MAC address 804 stored in the entry searched in S1202, the source user MAC address 225 of the user layer 2 header 211 is set to the MAC address of the network device 111, the user VLAN tag 226 of the user layer 2 header 211 is set to the VLAN number 802 stored in the entry searched in S1202, and the IP packet 212 is not changed from the received packet. The IP header stored in the IP packet 212 may conduct the processing such as the TTL subtraction which is conducted by a general layer 3 relay processing, or those processing may be omitted and not conducted at all. This is not particularly referred to in this example.

Finally, the packet forwarding processor 313 outputs the packet created in S1204 to the output interface number 703 of the entry searched in S1002 (S1205), and completes the packet forwarding processing to the IPVPN network (S1208).

(2) Route Controller 311

FIGS. 13, 14, 15, and 16 are flowcharts illustrating procedures of the processing to be executed in the packet forwarding processor 313 of the network device 111.

Figure 13:
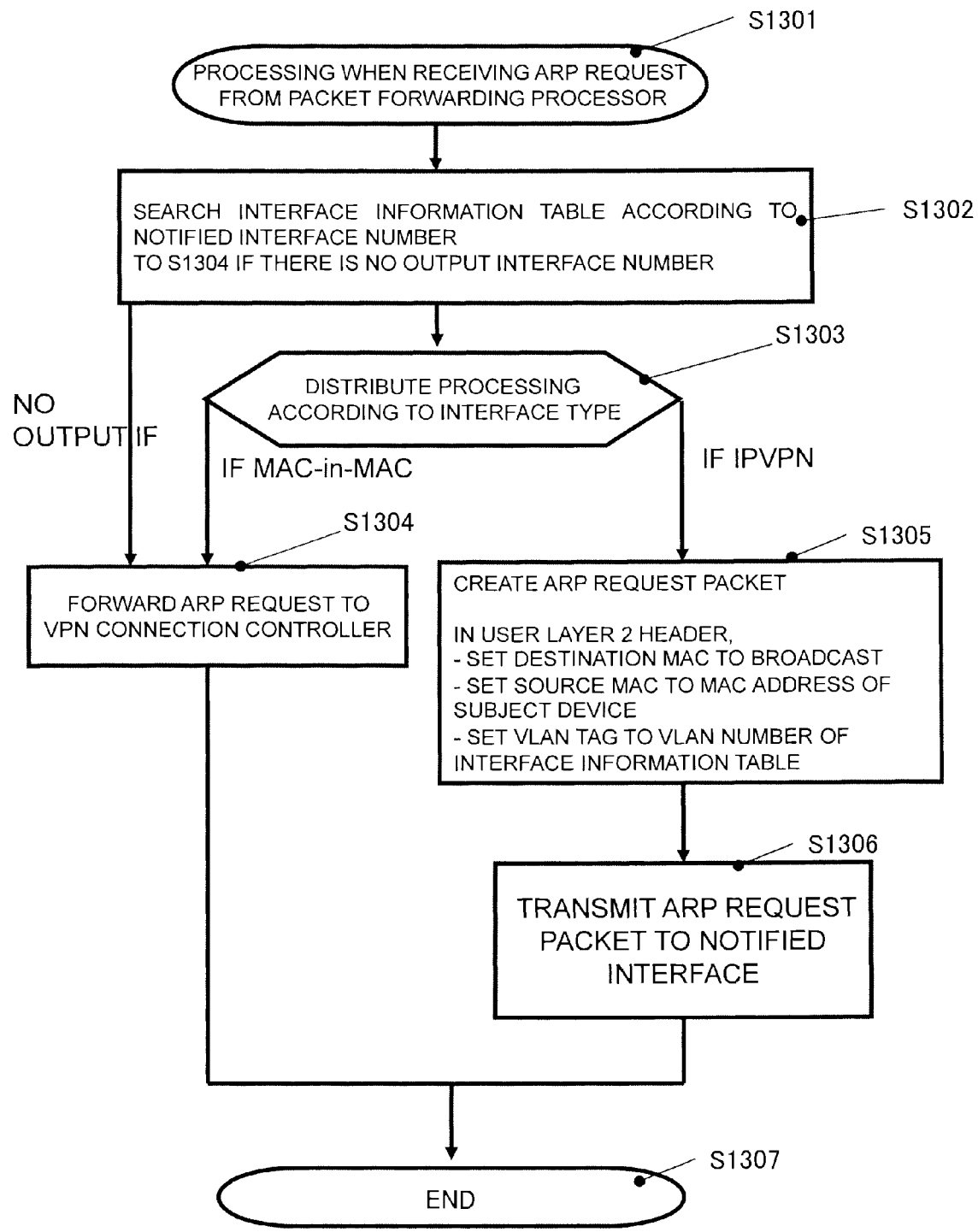
FIG. 13 is a flowchart illustrating a procedure of processing in a route controller 311 when a packet forwarding processor 313 transmits an ARP request to the route controller at S1106 and S1206 in FIGS. 11 and 12.

FIG. 13 is a flowchart illustrating a procedure of the processing in the route controller 311 when the packet forwarding processor 313 transmits the ARP request to the route controller 311 in S1106 of FIG. 11 and S1206 in FIG. 12.

The route controller 311 starts the processing upon receiving the ARP request from the packet forwarding processor 313 (S1301).

The route controller 311 searches the interface information table 321 with an interface number notified from the packet forwarding processor 313 as the search key (S1302), and distributes the processing according to the value of the interface type 404 in the appropriate entry (S1303). If the interface number notified from the packet forwarding processor 313 is "-" in S1302, the route controller 311 shifts to the processing of S1304 without any search. This is a case in which the output interface number 703 of the entry in the forwarding table 324 searched in S1002 of FIG. 10 is "-", and the entry is registered on the basis of the L2VPN information table 322 among the entries registered on the forwarding table 324. This is conducted during the procedure for forwarding the packet to the MAC-in-MAC network, and shifts to S1304.

If the interface type is the MAC-in-MAC in S1303, or the interface number is "-" in S1302, the route controller 311 forwards the ARP request from the packet forwarding processor 313 to the VPN connection controller 312 (S1304), and the route controller 311 completes the processing (S1307).

If the interface type is the IPVPN in S1303, the route controller 311 creates the ARP request packet to be output to the IPVPN network (S1305). The packet to be created has the format of the packet format 201 in FIG. 2. The destination user MAC address 224 of the user layer 2 header 211 is set to the broadcast address, the source user MAC address 225 of the user layer 2 header 211 is set to the MAC address of the network device 111, the user VLAN tag 226 of the user layer 2 header 211 is set to the VLAN number 403 stored in the entry searched in S1302, and the IP packet 212 has the format of the general ARP packet. The ARP packet stores the IP address notified from the packet forwarding processor 313 as the IP address of the device to be subjected to ARP resolution, and uses the value of the IP address of the IP address/prefix length 405 stored in the entry searched in S1302 as the IP address of the subject device.

Finally, the route controller 311 outputs the ARP request packet created in S1305 to the interface notified from the packet forwarding processor 313 (S1306), and completes the processing (S1307).

Figure 14:
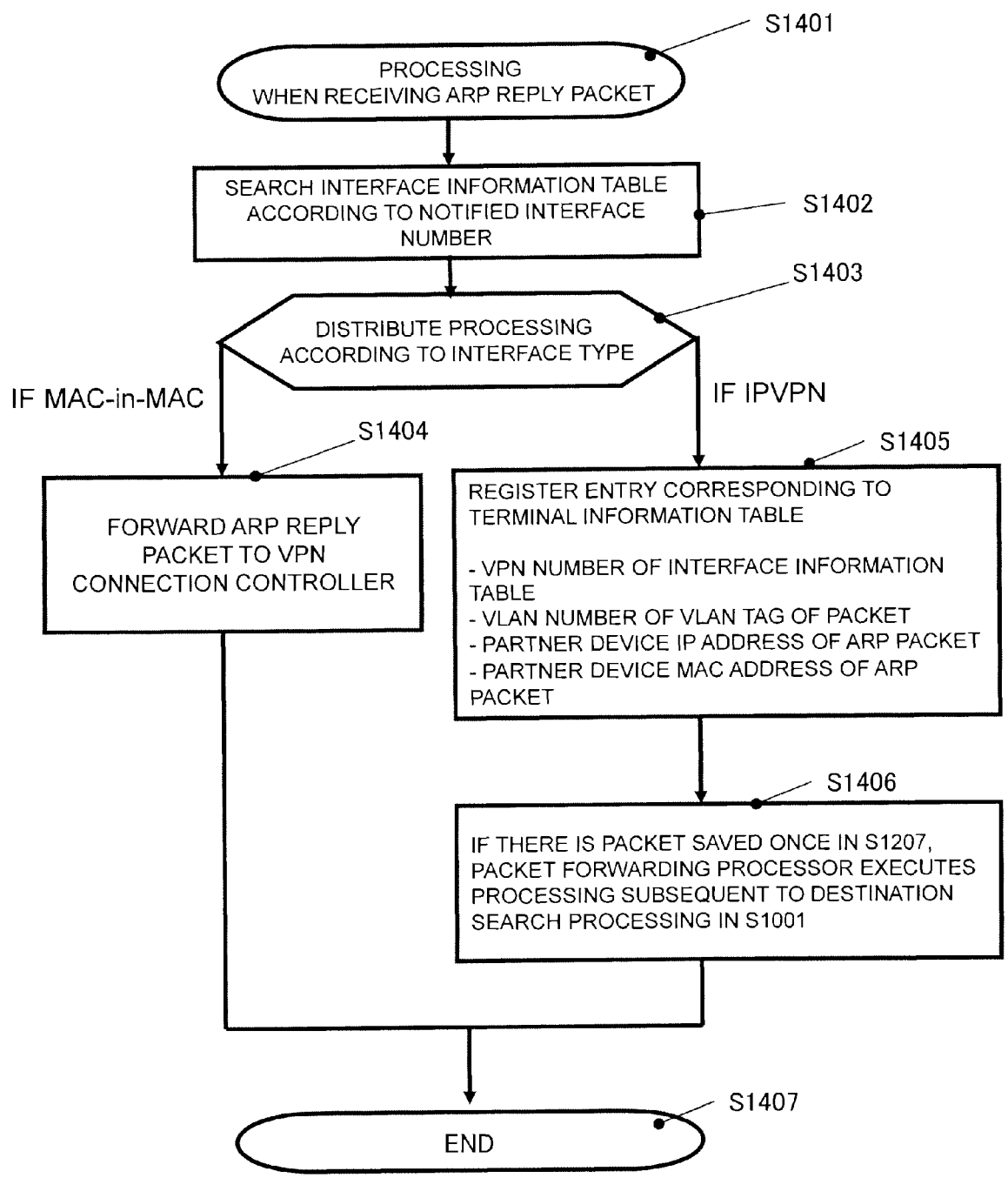
FIG. 14 is a flowchart illustrating a procedure of processing in the route controller 311 when the network device 111 receives an ARP reply packet, and a packet forwarding processor 313 determines the received ARP reply packet as a packet of the routing protocol through the processing illustrated at S902 and S903 in FIG. 9, and transmits the packet to the route controller 311.

FIG. 14 is a flowchart illustrating a procedure of the processing in the route controller 311 when the network device 111 receives the ARP reply packet, and the packet forwarding processor 313 determines the received ARP reply packet as a packet of the routing protocol through the processing illustrated in S902 and S903 of FIG. 9, and transmits the packet to the route controller 311.

The route controller 311 starts the processing when the ARP reply packet is forwarded from the packet forwarding processor 313 (S1401).

The route controller 311 searches the interface information table 321 with the interface number that has received the packet notified from the packet forwarding processor 313 as the search key (S1402), and distributes the processing according to the value of the interface type 404 of the appropriate entry (S1403).

If the interface type is the MAC-in-MAC in S1403, the route controller 311 forwards the ARP reply packet from the packet forwarding processor 313 to the VPN connection controller 312 (S1404), and the route controller 311 completes the processing (S1407).

If the interface type is the IPVPN in S1403, the route controller 311 registers the information related to the received ARP reply packet on the terminal information table 325 (S1405). In the contents to be registered, the VPN number 801 is the VPN number 402 of the entry searched in S1402, the VLAN number 802 is the VLAN number stored in the user VLAN tag 226 of the received ARP reply packet, the IP address 803 is the IP address of a partner device which is stored in the ARP reply packet, and the MAC address 804 is the MAC address of the partner device which is stored in the ARP reply packet.

Finally, if there is a packet that matches the VPN number that has received the packet and the IP address of the partner device stored in the ARP reply packet among the packets temporarily saved described in S1207 of FIG. 12, the route controller 311 conducts the processing subsequent to S1001 in FIG. 10 on that packet in the packet forwarding processor 313 (S1406), and the route controller 311 completes the processing (S1407).

Figure 15:
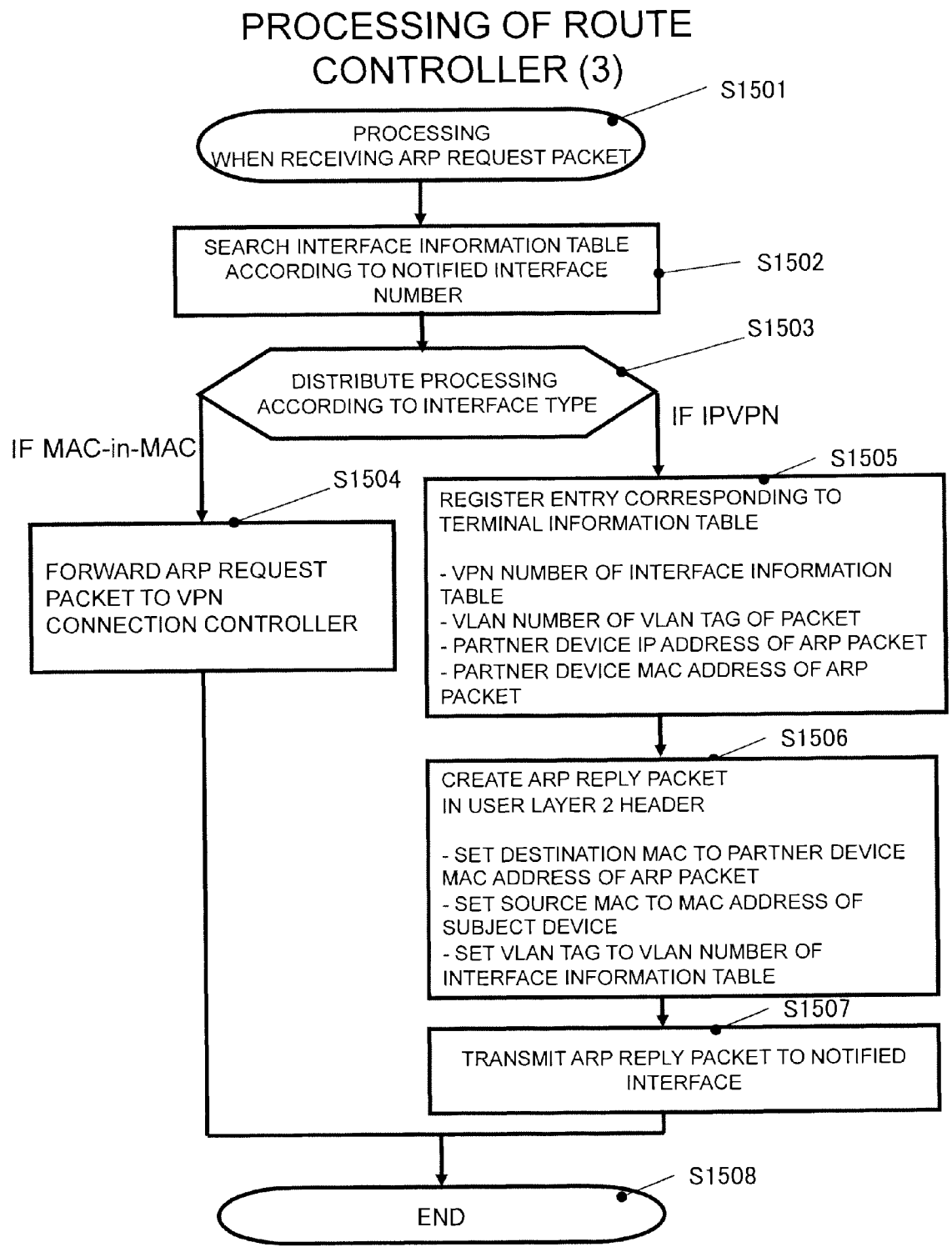
FIG. 15 is a flowchart illustrating a procedure of processing in the route controller 311 when the network device 111 receives an ARP request packet, and the packet forwarding processor 313 determines the received ARP request packet as the packet of the routing protocol through the processing illustrated at S902 and S903 in FIG. 9, and forwards the packet to the route controller 311.

FIG. 15 is a flowchart illustrating a procedure of the processing in the route controller 311 when the network device 111 receives the ARP request packet, and the packet forwarding processor 313 determines the received ARP request packet as the packet of the routing protocol through the processing illustrated in S902 and S903 of FIG. 9, and forwards the packet to the route controller 311.

The route controller 311 starts the processing when the ARP request packet is forwarded from the packet forwarding processor 313 (S1501).

The route controller 311 searches the interface information table 321 with the interface number that has received the packet notified from the packet forwarding processor 313 as the search key (S1502), and distributes the processing according to the value of the interface type 404 of the appropriate entry (S1503).

If the interface type is the MAC-in-MAC in S1503, the route controller 311 forwards the ARP request packet from the packet forwarding processor 313 to the VPN connection controller 312 (S1504), and the route controller 311 completes the processing (S1508).

If the interface type is the IPVPN in S1503, the route controller 311 registers the information related to the received ARP request packet on the terminal information table 325 (S1505). In the contents to be registered, the VPN number 801 is the VPN number 402 of the entry searched in S1502, the VLAN number 802 is the VLAN number stored in the user VLAN tag 226 of the received ARP request packet, the IP address 803 is the IP address of the partner device which is stored in the ARP request packet, and the MAC address 804 is the MAC address of the partner device which is stored in the ARP reply packet.

Subsequent to S1505, the route controller 311 creates the ARP reply packet to be output to the IPVPN network (S1506). The packet to be created has the format of the packet format 201 in FIG. 2. The destination user MAC address 224 of the user layer 2 header 211 is set to the MAC address of the partner device which is stored in the received ARP request packet, the source user MAC address 225 of the user layer 2 header 211 is set to the MAC address of the network device 111, the user VLAN tag 226 of the user layer 2 header 211 is set to the VLAN number 802 stored in the entry searched in S1502, and the IP packet 212 has the format of the general ARP packet. In the ARP packet, the IP address responsive to the ARP request is set to the IP address of the IP address/prefix length 405 stored in the entry searched in S1502, and the MAC address responsive to the ARP request is set to a value of the MAC address of the network device 111.

Finally, the route controller 311 outputs the ARP reply packet created in S1506 to the interface notified from the packet forwarding processor 313 (S1507), and completes the processing (S1508).

Figure 16:
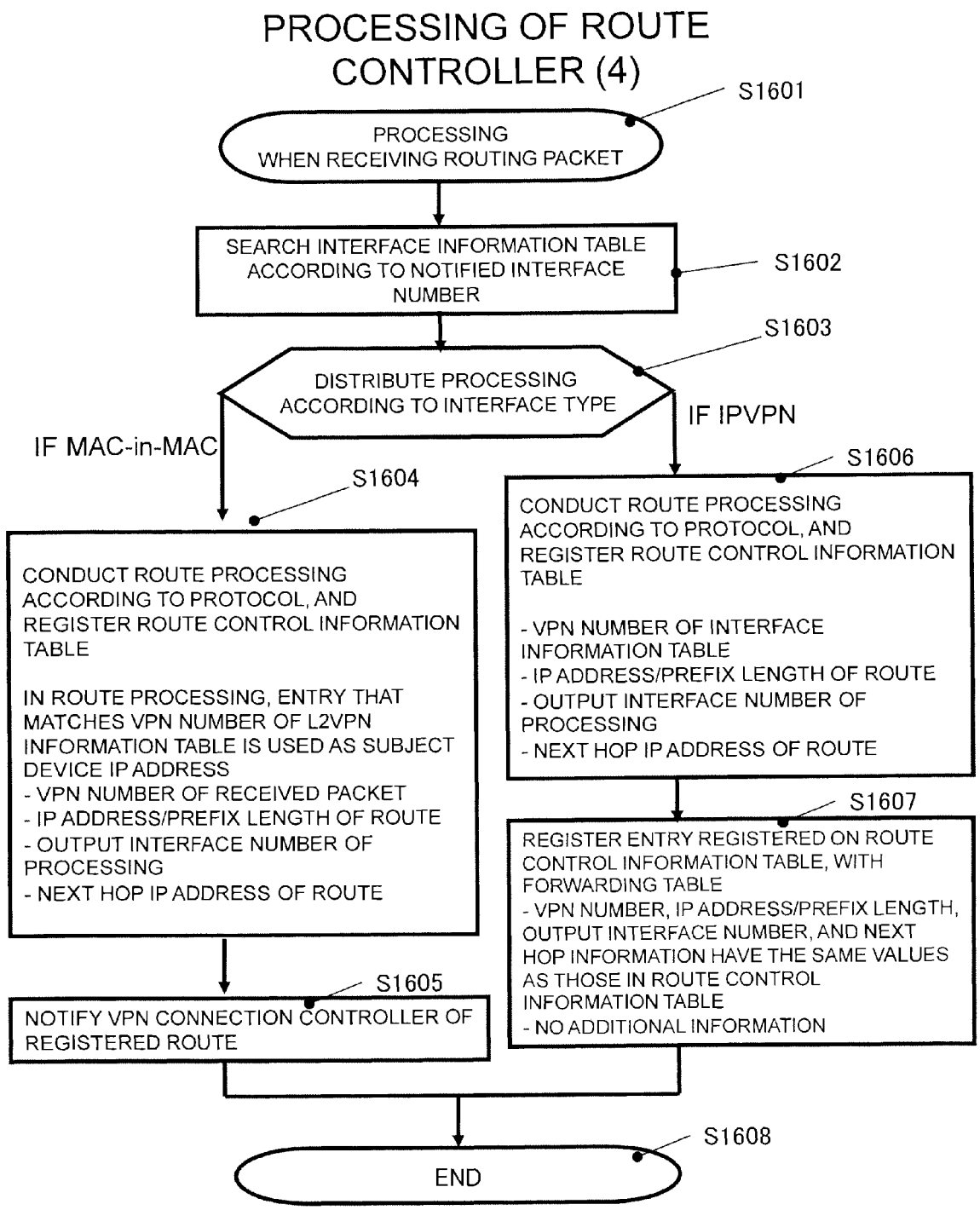
FIG. 16 is a flowchart illustrating a procedure of processing in the route controller 311 when the network device 111 receives a packet of the routing protocol used to control the route, and the packet forwarding processor 313 determines the received packet as the packet of the routing protocol through the processing illustrated at S902 and S903 in FIG. 9, and forwards the packet to the route controller 311.

FIG. 16 is a flowchart illustrating a procedure of the processing in the route controller 311 when the network device 111 receives the packet of the routing protocol used to control the route, and the packet forwarding processor 313 determines the received packet as the packet of the routing protocol through the processing illustrated in S902 and S903 of FIG. 9, and forwards the packet to the route controller 311.

The route controller 311 starts the processing when the packet of the routing protocol is forwarded from the packet forwarding processor 313 (S1601).

The route controller 311 searches the interface information table 321 with the interface number that has received the packet notified from the packet forwarding processor 313 as the search key (S1602), and distributes the processing according to the value of the interface type 404 of the appropriate entry (S1603).

If the interface type is the MAC-in-MAC in S1603, the route controller 311 conducts the route processing according to the protocol, and registers the resultant route on the route control information table 323 (S1604). In the contents to be registered, the VPN number 601 is the VPN number of the VPN information 223 of the MAC-in-MAC header 210 in the received packet, the IP address/prefix length 602 is the IP address/prefix length of the processed route, the output interface number 603 is the output interface number of the processed route, and the next hop information 604 is the next hop of the processed route. The route processing according to the protocol is the processing of a general routing protocol, and a description thereof will be omitted. The IP address of the device per se used in the protocol processing is the IP address of the IP address/prefix length 503 of the entry in which the VPN number 501 matches the VPN number of the VPN information 223 of the MAC-in-MAC header 210 in the received packet, and the VLAN number 502 matches the VLAN number of the user VLAN tag 226 of the user layer 2 header 221, among the entries registered on the L2VPN information table 322.

Subsequent to S1604, the route controller 311 notifies the VPN connection controller of the information on the route registered in S1604 (S1605), and the route controller 311 completes the processing (S1608).

If the interface type is the IPVPN in S1603, the route controller 311 conducts the route processing according to the protocol, and registers the resultant route on the route control information table 323 (S1606). In the contents to be registered, the VPN number 601 is the VPN number 402 of the entry searched in S1602, the IP address/prefix length 602 is the IP address/prefix length of the processed route, the output interface number 603 is the output interface number of the processed route, and the next hop information 604 is the next hop of the processed route.

Subsequent to S1606, the route controller 311 registers the information on the route registered in S1606 on the forwarding table 324 (S1607). In the contents to be registered, the VPN number 701, the IP address/prefix length 702, the output interface number 703, and the next hop information 704 are identical with the contents registered on the route control information table 323, and the additional information 705 registers "-" indicative of no setting. Upon completion of the registration, the route controller 311 completes the processing (S1608).

(3) VPN Connection Controller 312

FIGS. 17, 18, 19, 20, and 21 are flowcharts illustrating procedures of the processing to be executed in the VPN connection controller 312 of the network device 111.

FIG. 17 is a flowchart illustrating a procedure of the processing in the VPN connection controller 312 when the VPN connection controller 312 receives the ARP resolution request from the route controller 311.

The VPN connection controller 312 starts the processing upon receiving the ARP resolution request from the route controller 311 (S1701).

When the processing starts, the VPN connection controller 312 searches the L2VPN information table 322 with the VPN number of the notification received from the route controller 311 and the IP address as the search keys (S1702). The VPN connection controller 312 searches the IP address according to the longest match to the IP address/prefix length 503.

Subsequent to S1702, the VPN connection controller 312 creates the ARP request packet to be output to the MAC-in-MAC network (S1703). The packet to be created is the format of the packet format 200 in FIG. 2. The destination PE MAC address 221 of the MAC-in-MAC header 210 is set to the broadcast, the source PE MAC address 222 of the MAC-in-MAC header 210 is set to the MAC address of the network device 111, the VPN information 223 of the MAC-in-MAC header 210 is set to the VPN number of the notification received from the route controller 311, and the destination user MAC address 224 of the user layer 2 header 211 is set to the broadcast address. Also, the source user MAC address 225 of the user layer 2 header 211 is set to the MAC address of the network device 111, the user VLAN tag 226 of the user layer 2 header 211 is set to the VLAN number 503 of the entry searched in S1702, and the IP packet 212 is the format of the general ARP packet. The ARP packet stores the IP address notified from the route controller 311 as the IP address of the device to be subjected to ARP resolution, and uses a value of the IP address of the IP address/prefix length 503 stored in the entry searched in S1702 as the IP address of itself.

Finally, the VPN connection controller 312 outputs the packet created in S1704 to the interface notified from the route controller 311 (S1704), and the VPN connection controller 312 completes the processing (S1705). If the interface number notified from the route controller 311 is the VPN connection controller 312 transmits the same packet to all of the interfaces in which the interface type 404 is the MAC-in-MAC in S1704. This is a case in which the output interface number 703 of the entry in the forwarding table 324 searched in S1002 of FIG. 10 is "-", and there is the entry registered on the basis of the L2VPN information table 322 among the entries registered on the forwarding table 324. In this case, it is undetermined which interface the packet is to be transmitted among the interfaces to be connected to the MAC-in-MAC network by the network device 111 of PE1, and the packet is transmitted to all of the interfaces connected to the MAC-in-MAC network, that is, the overall MAC-in-MAC network. The ARP reply packet which is responsive to that packet is received from any one interface.

FIG. 18 is a flowchart illustrating a procedure of the processing in the VPN connection controller 312 when the VPN connection controller 312 receives the ARP reply packet from the route controller 311.

The VPN connection controller 312 starts the processing when receiving the ARP reply packet from the route controller 311 (S1801).

When the processing starts, the VPN connection controller 312 registers the information related to the notified ARP reply packet on the terminal information table 325 (S1802). In the contents to be registered, the VPN number 801 is the VPN number stored in the VPN information 223 of the received ARP reply packet, and the VLAN number 802 is the VLAN number stored in the user VLAN tag 226 of the received ARP reply packet. Also, the IP address 803 is the IP address of the partner device which is stored in the ARP reply packet, and the MAC address 804 is the MAC address of the partner device which is stored in the ARP reply packet.

Subsequent to S1802, the VPN connection controller 312 registers the entry corresponding to the forwarding table 324 (S1803). In the contents to be registered, the VPN number 701 is the VPN number stored in the VPN information 223 of the received ARP reply packet, and the IP address/prefix length 702 is the IP address of the partner device which is stored in the ARP reply packet, and the maximum value of the prefix length. Also, the output interface number 703 is the interface number that has received the ARP reply packet, the next hop information 704 is "-" representative of no setting, and the additional information 705 is the source PEMAC address 222 of the MAC-in-MAC header 210 in the received packet. That the prefix length is the maximum length represents that a length of the IP address and a value of the prefix length match each other, which are, for example, 32 in the case of IPv4, and 128 in the case of IPv6.

Finally, the VPN connection controller 312 controls so that if there is a packet that matches the VPN number and the IP address of the partner device which is stored in the ARP reply packet among the packets temporarily saved described in S1107 of FIG. 11, the packet forwarding processor 313 conducts the processing subsequent to S1001 in FIG. 10 on that packet (S1804), and the route controller 311 completes the processing (S1805).

FIGS. 19 and 20 are flowcharts illustrating a procedure of the processing in the VPN connection controller 312 when the VPN connection controller 312 receives the ARP request packet from the route controller 311.

The VPN connection controller 312 starts the processing when receiving the ARP request packet from the route controller 311 (S1901).

When the processing starts, the VPN connection controller 312 registers the information related to the notified ARP request packet on the terminal information table 325 (S1902). In the contents to be registered, the VPN number 801 is the VPN number of the notification received from the route controller 311, and the VLAN number 802 is the VLAN number stored in the user VLAN tag 226 of the received ARP request packet. Also, the IP address 803 is the IP address of the partner device which is stored in the ARP request packet, and the MAC address 804 is the MAC address of the partner device which is stored in the ARP request packet.

Subsequent to S1902, the VPN connection controller 312 registers the entry corresponding to the forwarding table 324 (S1903). In the contents to be registered, the VPN number 701 is the VPN number of the notification received from the route controller 311, and the IP address/prefix length 702 is the IP address of the partner device which is stored in the ARP request packet, and the maximum value of the prefix length. Also, the output interface number 703 is the interface number that has received the ARP request packet, the next hop information 704 is "-" representative of no setting, and the additional information 705 is the source PEMAC address 222 of the MAC-in-MAC header 210 in the received packet.

Subsequent to S1903, the VPN connection controller 312 creates the ARP request packet to be output to the MAC-in-MAC network (S1904). The packet to be created is the format of the packet format 200 in FIG. 2. The destination PE MAC address 221 of the MAC-in-MAC header 210 is set to the source PE MAC address 222 of the MAC-in-MAC header 210 in the received packet, the source PE MAC address 222 of the MAC-in-MAC header 210 is set to the MAC address of the network device 111, the VPN information 223 of the MAC-in-MAC header 210 is set to the VPN number of the notification received from the route controller 311, and the destination user MAC address 224 of the user layer 2 header 211 is set to the MAC address of the partner device which is stored in the received ARP request packet. Also, the source user MAC address 225 of the user layer 2 header 211 is set to the MAC address of the network device 111, the user VLAN tag 226 of the user layer 2 header 211 is set to the VLAN number stored in the user VLAN tag 226 of the user layer 2 header 211 in the received ARP request packet, and the IP packet 212 has the format of the general ARP packet. In the ARP packet, the IP address responsive to the ARP request is the IP address of the subject device transmitting the resolution request which is stored in the received ARP request packet, and the MAC address responsive to the ARP request is a value of the MAC address of the network device 111.

Finally, the VPN connection controller 312 outputs the packet created in S1904 to the interface that has received the ARP request (S1905), and the VPN connection controller 312 completes the processing (S1906).

FIG. 21 is a flowchart illustrating a procedure of the processing in the VPN connection controller 312 when the VPN connection controller 312 receives a notification that a route has been registered from the route controller 311.

The VPN connection controller 312 starts the processing when receiving a notification that the route has been registered from the route controller 311 (S2101).

When the processing starts, the VPN connection controller 312 searches the forwarding table 324 by the aid of information on the route that has received the notification. The search is conducted by the longest match search by using the notified VPN number, the next hop information notified the IP address of, and the maximum length of the prefix length (S2102).

Subsequently, the VPN connection controller 312 acquires the additional information 705 of the entry searched by S2102 (S2103).

The VPN connection controller 312 registers the entry on the forwarding table by using the information on the route that has received the notification, and the additional information acquired by S2103 (S2102). In the contents to be registered, the VPN number 701, the IP address/prefix length 702, the output interface number 703, and the next hop information 704 are the respective contents of the route that has received the notification, and the additional information 705 is the additional information acquired by S2103. When the registration has been completed, the VPN connection controller 312 completes the processing (S2103).

(4) Communication Between IPVPN and L2VPN

A communication can be conducted between the IPVPN network 102 layer-3-connected to the MAC-in-MAC network 101 and the L2VPN network 103 layer-2-connected to the MAC-in-MAC network 101 by the operation of the network device 111 described above.

More specifically, when the terminal within the IPVPN network 102 needs to communicate with the terminal within the L2VPN network 103, the ARP resolution over the MAC-in-MAC network is conducted by the operation of the VPN connection controller 312 described mainly with reference to FIGS. 17 and 18, and the entry including the additional information 705 in the forwarding table 324 is registered. Also, the packet including the MAC-in-MAC header 210 is created and transferred by using the additional information 705 and the like in the forwarding table 324 and forwarded while conducting the layer 3 forwarding, by the operation of the packet forwarding processor 313 described mainly with reference to FIG. 11. As a result, the PE2 (network device 112) of the MAC-in-MAC network 101 can conduct the layer 2 forwarding, and the packet can arrive at the L2VPN network 103 from the IPVPN network 102.

Likewise, when the terminal within the L2VPN network 103 needs to communicate with the terminal within the IPVPN network 102, the terminal within the L2VPN network 103 can designate the PE1 (network device 111) as a default gateway or a next hop of a communication destination by the operation of the VPN connection controller 312 described mainly with reference to FIGS. 19 and 20, and the operation of the packet forwarding processor 313 described mainly with reference to FIG. 12. The packet can arrive at the IPVPN network 102 from the L2VPN network 103.

Further, the route information can be exchanged between the PE1 (network device 111) and the router within the L2VPN network 103, and reflect the packet forwarding, through the processing of the route using the routing protocol described mainly with reference to FIGS. 16 and 21. As a result, even if the router is disposed within the L2VPN network 103, the two-way communication can be achieved likewise.

A4. Advantages of First Embodiment

The advantages of this embodiment are described below.

According to this embodiment, a communication can be conducted between the hub network layer-3-connected to the core network of the MAC-in-MAC and the hub network layer-2-connected to the core network. As a result, the layer-3-connection method and the layer-2-connection method can be freely selected. Even if there is a need to switch between the layer-3-connection and the layer-2-connection, the connection can be conducted by only a partial change so that the overall stop can be avoided.

B. Second Embodiment

This embodiment shows an example of a method that can communicate between the layer-3-connected hub network and the layer-2-connected hub network over the core network using the MPLS instead of the core network using the MAC-in-MAC described in the first embodiment.

Many portions of the second embodiment are identical with those of the first embodiment, and therefore differences from the first embodiment is explicitly described.

B1. System Configuration

Now, configurations of a network system and a network device according to this embodiment will be described.

FIG. 22 is an illustrative view illustrating the configuration of the network system according to an embodiment of the present invention. This configuration is different from the configuration of the first embodiment illustrated in FIG. 1 in that the core network is an MPLS network 2204. The MPLS network 2204 mediates a communication between the IPVPN network 102 and the L2VPN network 103. The network device 111 (PE1) and the network device 112 (PE2) are network devices in which the MPLS operates, and connected to the IPVPN network 102 and the L2VPN network 103, respectively.

The functions of the respective devices, the IP addresses, and the MAC addresses are identical with those in the first embodiment, and therefore will be omitted.

FIG. 23 is an illustrative view illustrating formats of the packets used in the network system of FIG. 22.

A packet 2300 within the MPLS has an MPLS header 2310, and stores an MPLS information 2321 therein.

The MPLS information includes information having a label of the MPLS and a layer 2 header. However, the MPLS information allows a general MPLS operation, and therefore a description of the contents will be omitted. The other fields are identical with those in the packet format 200 described in the first embodiment.

The packet outside of the MPLS network is identical with the packet format 201 described in the first embodiment.

In this embodiment, the operation of the network device 111 which is the PE1 will be mainly described. The network devices aside from the PE1 are identical in operation with related art devices, and therefore a description of the operation of the respective devices will be minimized.

In this embodiment, the IPv4 is used as the layer 3, but an IPv6 can be used as the protocol of the layer 3.

FIG. 24 is an illustrative view illustrating a configuration of the network device which is a provider edge according to the second embodiment.

This configuration is different from the configuration of the first embodiment illustrated in FIG. 3 in that an MPLS information table 2426 is stored in the memory 320. The detail of the MPLS information table 2426 will be described later.

Also, the route controller 311 conducts processing of the MPLS in addition to the functions described in the first embodiment, and registers entries necessary for the MPLS information table 2426.

The other configurations are identical with those in the first embodiment, and therefore a description thereof will be omitted.

FIG. 25 is an illustrative view of the interface information table 321 illustrated in FIG. 24.

This configuration is different from the configuration of the first embodiment illustrated in FIG. 4 in that the interface type 404 is any one of two values of "IPVPN" and "MPLS".

In the example of FIG. 25, in the second entry, the interface 302 (IF2) is connected to the MPLS network.

The other configurations are identical with those in the first embodiment, and therefore a description thereof will be omitted.

The L2VPN information table 322 and the route control information table 323 described in the first embodiment with reference to FIGS. 5 and 6 are identical with those in the first embodiment, and therefore a description thereof will be omitted.

FIG. 26 is an illustrative view of the forwarding table 324 illustrated in FIG. 24.

This configuration is different from the configuration of the first embodiment illustrated in FIG. 7 in the value stored in the additional information 705. Label information used for creating the MPLS header is stored in the additional information 705 if the entry indicates that the packet is forwarded to the MPLS network. In the other cases, "-" is stored in the additional information 705.

The forwarding table 324 is identical with that in the first embodiment when a value of the interface type 404 of the interface information table 321 related to the interface of the output interface number 603 is the IPVPN in the entry based on the route control information table 323. The entry of the MPLS will be described in detail later.

In the example of FIG. 26, in the fourth to sixth entries, the interface type 404 related to the output interface number 703 is the MPLS, and the label information is stored in the additional information.

The terminal information table 325 described in the first embodiment with reference to FIG. 8 is identical with that in the first embodiment, and therefore a description thereof will be omitted.

FIG. 27 is an illustrative view of the MPLS information table 2426 illustrated in FIG. 24. The MPLS information table 2426 stores the processing results according to the MPLS protocol by the route controller 311. In the MPLS information table 2426, a VPN number 2701 and a VLAN number 2702 are associated with an output label number 2703, an input label number 2704, and an interface number 2705. The VPN number 2701 indicates the VPN number using that entry. The VLAN number 2702 stores the VLAN number to which the label is allocated, the output label number 2703 and the input label number 2704 store the label number allocated by the MPLS protocol, and the interface number 2705 stores the interface number using the output label number 2703 and the input label number 2704.

The MPLS information table 2426 stores the label information allocated to the combination of the output label number 2703 and the input label number 2704 according to the MPLS protocol by the route controller 311 over the MPLS network 2204. One method of configuring the combination of the output label number 2703 and the input label number 2704 is the combination of the labels used for transmission and reception for a virtual circuit (VC) in the MPLS protocol.

In the example of FIG. 27, in the first entry, the VPN number 2701 is 100, the VLAN number 2702 is 10, the output label number 2703 is label 1, the input label number 2704 is label 2, and the interface number 2705 is IF2. That is, the label 1 is used for the packet to be transmitted to the VLAN 20 within the IPVPN network 102 which is the VPN number 100. On the contrary, the label 2 is stored in the packet received from the VLAN 20. The interface number 2705 represents that a communication by the combination of the label 1 and the label 2 is conducted through the interface IF2. Plural combinations of the output label number and the input label number may be registered for one combination of the VPN number and the VLAN number, and there may be the plural same interface numbers corresponding to the plural combinations, or different interface numbers may be registered.

B2. Description of Specific Procedure for Communication

Now, a description will be given of a relationship among a specific procedure for communication, the respective tables provided in the device, and the packets to be forwarded according to the second embodiment of the present invention.

(1) Flow from IPVPN to L2VPN

First, a description will be given a specific procedure when the terminal within the IPVPN network 102 communicates with the terminal within the L2VPN network 103.

First, the general operation will be described.

FIG. 50 is an illustrative view of a flow of the packets when the terminal 1 within the IPVPN network 102 communicates toward the terminal 2 within the L2VPN network 103.

When the terminal 1 transmits a packet PB11, the packet PB11 arrives at the PE1 through the CE1. The PE1 searches the forwarding table 324 by using the IP address of the terminal 2 which is a destination IP address of the packet PB11. If there is no entry necessary for the packet forwarding, the PE1 temporarily saves the packet, and conducts the neighborhood search according to the ARP.

The PE1 transmits an ARP request packet PB12 to the terminal 2 through the MPLS network 2204.

When the terminal 2 returns an ARP reply packet PB13 as a reply to the ARP request packet, the ARP reply packet PB13 arrives at the PE1 through the MPLS network 2204.

The PE1 updates the forwarding table 324 and the terminal information table 325 according to the ARP reply packet PB13. Also, the PE1 conducts the forwarding processing of the packet PB11 that has been temporarily saved by using that information, and transmits a packet PB14. The packet PB14 arrives at the terminal 2 through the MPLS network 2204.

Thereafter, a packet PB15 transmitted toward the terminal 2 by the terminal 1 can obtain a necessary entry by searching the forwarding table 324 by the PE1, and the packet processing is conducted without conducting the neighborhood search according to the ARP. A packet PB16 can be transmitted, and arrive at the terminal 2.

Hereinafter, the operation of the PE1 in a flow of the packet illustrated in FIG. 50 will be described in detail with reference to the packet format and the tables.

It is assumed that the interface information table 321, the L2VPN information table 322, and the route control information table 323 are in the states of FIGS. 25, 5, and before the PE1 receives the packet PB11 in FIG. 50, respectively. Those tables are registered on the basis of the information set by the network manager in advance, and the information obtained according to the routing protocol.

FIG. 51 is an illustrative view illustrating an initial state of the forwarding table 324 before the PE1 receives the packet PB11 of FIG. 50. As described in FIG. 26, the first entry and the second entry are registered on the basis of the route control information table 323, and the third entry is registered on the basis of the L2VPN information table 322.

It is assumed that in an initial state of the terminal information table 325, no entry is registered.

It is assumed that an initial state of the MPLS information table 2426 is illustrated in FIG. 27. This is information stored by the route controller 311 according to the MPLS protocol.

When the terminal 1 transmits the packet PB11, the packet PB11 arrives at the interface 301 (IF1) of the PE1. The packet PB11 has a format of the packet 201 illustrated in FIG. 23.

A procedure since the PE1 receives the packet PB11 until the PE1 transmits the ARP request packet PB12 will be described with reference to FIGS. 52 and 53.

The PE1 searches an entry corresponding to the interface IF1 that has received the packet from the interface information table 321 illustrated in FIG. 25 as an initial procedure for obtaining a forwarding destination of the packet PB11 (B31), and finds the first entry. The PE1 then acquires the VPN number (100) from the VPN number 402 of the first entry. Also, at the same time, the PE1 acquires the destination IP address (20.0.0.20) included in the IP packet 212 of the received packet. The destination IP address is an IP address of the terminal 2.

Then, the PE1 searches the forwarding table 324 illustrated in FIG. 51 by using the acquired VPN number (100) and destination IP address (20.0.0.20) so as to obtain the forwarding destination (B32, B33). The third entry is found, but because the output interface number 703 is undetermined, the packet forwarding destination is unclear. Therefore, the PE1 determines that there is a need to conduct the neighborhood search, and the packet PB11 is temporarily saved, and an ARP request packet PB12 transmission is processed.

The PE1 needs to obtain the VLAN number and the label number in producing the ARP request packet PB12 illustrated in FIG. 50. However, because the output interface number 703 is undetermined, the PE1 searches the L2VPN information table 322 illustrated in FIG. 5 by using the VPN number (100) and the destination IP address (20.0.0.2) (B34, 535, 536), finds the first entry, and obtains the VLAN number (20) from the VLAN number 502. The label number is obtained according to the VPN number, the VLAN number, and the output interface number by using the MPLS information table 2426 illustrated in FIG. 27. However, because the output interface number 703 (B3A) is undetermined, the PE1 acquires the VLAN number and the interface number from all of the interfaces in which the VPN number 2701 matches the VPN number (100) (B37), and the VLAN number 2702 matches the VLAN number (20) (B38) among the entries in the MPLS information table 2426. In this case, the PE1 finds the first entry, and acquires the combination of the output label (label 1) and the interface number (IF2). The PE1 may find plural entries in acquiring the label number. However, in the example illustrated in FIG. 27, the PE1 finds only one entry.

Thereafter, the PE1 creates the ARP request packet by using the information obtained up to now. The format of the packet to be created is the packet format 2300 illustrated in FIG. 23. The acquired output label number (label 1) is set for the MPLS information 2321 (B3B), the destination user MAC address 224 is set to the broadcast address, and the source user MAC address 225 is set to the MAC address of the PE1. Also, the user VLAN tag 226 is set to the VLAN number (20) acquired from the first entry of the L2VPN information table 322 (B3C), and the IP packet 212 has the format of the general ARP packet for transmitting the ARP resolution request of the destination IP address (20.0.0.2) (B39).

The PE1 transmits the created ARP request packet PB12 to the interface (IF2) acquired from the MPLS information table 2426 toward the MPLS network. IF the PE1 finds plural entries in searching the MPLS information table 2426 for acquiring the label, the PE1 creates packets storing the respective label numbers, and outputs the packets to the interface of its combination.

When the ARP request packet PB12 passes through the PE2, the MPLS header 2310 is deleted. Thereafter, the ARP request packet PB12 passes through the CE2, and arrives at the terminal 2 in the form of the packet format 201. The terminal 2 returns the ARP reply packet in the form of the packet format 201 as a reply to the ARP request packet. The ARP reply packet passes through the CE2, and then passes through the PE2 with the addition of the MPLS header 2310. The packet PB13 that has been in the form of the packet format 200 arrives at the PE1. The PE2 is a device that operates by a general technique, and therefore a description thereof will be omitted.

A procedure since the PE1 receives the PB13 until the PE1 transmits the packet PB14 will be described with reference to FIGS. 54, 55, 56, and 57.

A procedure since receiving the packet PB13 until updating the tables in the PE1 will be described with reference to FIGS. 54 and 55.

In order to determine the contents to be processed as a first procedure for processing related to the ARP reply packet PB13 reception, the PE1 searches an entry corresponding to the interface IF2 that has received the packet from the interface information table 321 illustrated in FIG. 25 (B41), finds the second entry, and determines the processing when the packet is received from the interface in which the interface type is the MPLS.

Then, the PE1 registers an entry corresponding to the received ARP reply packet on the terminal information table 325 and the forwarding table 324. The entry registered on the terminal information table 325 is necessary to create the destination user MAC address 224 and the user VLAN tag 226 in forwarding the packet to the terminal 2. The entry to be registered on the forwarding table 324 is necessary to determine an output target interface in forwarding the packet to the terminal 2, and create the MPLS information 2321.

The contents of the second entry in the example illustrated in FIG. 8 are registered on the terminal information table 325. A value of the VPN number 801 to be registered is obtained from the MPLS information table 2426. The PE1 finds the first entry according to the label number (label 2) (B42) stored in the MPLS information 2321 of the received packet, and the interface (IF2) (B43) that has received the packet. Then, the PE1 registers the VPN number (100) of the VPN number 2701 on the VPN number 801 (B44). This VPN number is a VPN number to which the terminal 2 belongs. The VLAN number 802 is stored in the user VLAN tag 226 of the received packet PB13, and the VLAN number (20) to which the terminal 2 belongs (B45). The IP address 803 is the IP address (20.0.0.20) of the terminal 2 of the ARP packet stored in the IP packet 212 (A46). The MAC address 804 is the MAC address (2020.2020.2020) of the terminal 2 of the ARP packet stored in the IP packet 212 (A47).

The contents of the fourth entry in the example illustrated in FIG. 26 are registered on the forwarding table 324. The VPN number 701 is the VPN number (100) to which the same terminal 2 as that registered on the terminal information table 325 belongs (B48). The IP address/prefix length 702 are the IP address (20.0.0.20) of the terminal 2 of the ARP packet stored in the IP packet 212, and 32 which is a maximum prefix length (B49). The output interface number 703 is the interface IF2 that has received the packet PA13 (B4A). The next hop information 704 is "-" representing that the next hop information 704 is not set because the next hop information 704 is unnecessary in this case. The additional information 705 is a value (label 1) of the output label number 2703 of the first entry of the MPLS information table 2426 searched in registering the entry on the terminal information table 325 (B4B).

The label 1 is a label number for transmission toward the PE2 in correspondence with the label number stored in the MPLS information of the ARP reply packet PB13.

FIG. 56 is an illustrative view illustrating states of the forwarding table 324 and the terminal information table 325 after the table update illustrated in FIGS. 54 and 55 has been conducted. The forwarding table 324 is added with a fourth entry as compared with FIG. 51 illustrating a state in which the packet PB11 has not yet been received. The terminal information table 325 is added with the second entry from a state of no entry.

A description will be given of a procedure until the forwarding processing of the PB11 temporarily saved is conducted to transmit the packet PB14, using the updated table, after the table update processing illustrated in FIGS. 54 and 55 has been completed, with reference to FIG. 57.

The PE1 searches the forwarding table 324 illustrated in FIG. 56 according to the VPN number (100) and the destination IP address (20.0.0.20) which have been acquired (B31) in the procedure described in FIGS. 52 and 53, and obtains the forwarding destination (B32, B33). This search is a longest match search using the IP address, and not the third entry but the fourth entry longer in the prefix length is found, and the output interface number 703 is the IF2 in the fourth entry. Therefore, the processing for forwarding the packet toward the IF2 is conducted. Because the interface type of the IF2 is the MPLS in the interface information table 321, the packet is forwarded to the MPLS network, that is, the packet of the packet format 2300 is created and forwarded.

In order to create the packet to be forwarded, there is a need to obtain the VLAN number and the MAC address in addition to the forwarding table 324. Therefore, the PE1 searches the terminal information table 325 illustrated in FIG. 56 with reference to the VPN number (100) and the destination IP address (20.0.0.20) (B61, B62), and finds the second entry. The PE1 uses the VLAN number and the MAC address of this entry for packet creation.

The PE1 creates the packet PB14 illustrated in FIG. 50 by using the information obtained up to now. The format of the packet to be created is the packet format 2300 illustrated in FIG. 23. The MPLS information 2321 is set to the label number (label 1) for transmission to the PE2 stored in the additional information 705 of the forth entry in the forwarding table 324 (B63). The destination user MAC address 224 is set to the MAC address (2020.2020.2020) of the terminal 2 stored in the MAC address 804 of the second entry in the terminal information table 325 (B64). The source user MAC address 225 is set to the MAC address of the PE1, the user VLAN tag 226 is set to the VLAN number (20) to which the terminal 2 belongs, which is stored in the VLAN number 802 of the second entry in the terminal information table 325 (B65), and the IP packet 212 is not changed from the packet PB11.

Finally, the PE1 transmits the created packet PB14 toward the IF2 that is an interface connected to the MPLS network, which is stored in the output interface number 703 of the forwarding table 324.

The MPLS header 2310 is deleted from the packet PB14 when the packet PB14 passes through the PE2, and thereafter the packet PB14 passes through the CE2, and arrives at the terminal 2 in the form of the packet format 201. The PE2 is a device that operates by a general technique, and therefore a description thereof will be omitted.

Thereafter, the packet PB15 to be transmitted toward the terminal 2 by the terminal 1 can obtain the fourth entry from the beginning by allowing the PE1 to search the forwarding table 324. The processing described in FIG. 57 is conducted to create and forward the packet PB16 without conducting the neighborhood search according to the ARP. The packet PB16 arrives at the terminal 2 as with the packet PB14.

(2) Flow from L2VPN to IPVPN

Subsequently, a description will be given of a specific procedure in which the terminal within the L2VPN network 103 communicates with the terminal within the IPVPN network 102.

First, the general operation will be described.

FIG. 58 is an illustrative view of a flow of the packet when the terminal 2 within the L2VPN network 103 communicates toward the terminal 1 within the IPVPN network 102.

When the terminal 2 transmits a packet PB71, the PB71 arrives at the PE1 through the CE2 and the PE2. The PE1 searches the forwarding table 324 by using the IP address of the terminal 1 which is a destination IP address of the packet PB71 to find that a subsequent forwarding destination is the CE1. Then, the PE1 searches the terminal information table 325 for the CE1, and if there is no entry necessary for the packet forwarding, the PE1 temporarily saves the packet, and conducts the neighborhood search according to the ARP.

The PE1 transmits an ARP request packet PB72 to the CE1 toward the IPVPN network 102, and the ARP request packet PB72 arrives at the CE1.

When the CE1 returns the ARP reply packet in response to the ARP request packet, a packet PB73 arrives at the PE1.

The PE1 updates the terminal information table 325 by the aid of the ARP reply packet PB73, conducts the forwarding processing of the packet PB71 temporarily saved by using information thereof, and transmits a packet PB74. The packet PB74 passes through the CE1, and arrives at the terminal 1.

Thereafter, a packet PB75 transmitted toward the terminal 1 by the terminal 2 can obtain a necessary entry by searching the forwarding table 324 and the terminal information table 325 by the PE1, and the packet processing is conducted without conducting the neighborhood search according to the ARP. A packet PB76 can be transmitted, and arrive at the terminal 1.

Hereinafter, the operation of the PE1 in a flow of the packet illustrated in FIG. 58 will be described in detail with reference to the packet format and the tables.

It is assumed that the interface information table 321, the L2VPN information table 322, and the route control information table 323 are in the states of FIGS. 25, 5, and 6 before the PE1 receives the packet PB11 in FIG. 50, respectively. Those tables are registered on the basis of the information set by the network manager in advance, and the information obtained according to the routing protocol.

An initial state of the forwarding table 324 before the PE1 receives the packet PB11 of FIG. 50 is identical with that illustrated in FIG. 51.

It is assumed that in an initial state of the terminal information table 325, no entry is registered.

An initial state of the MPLS information table 2426 is illustrated in FIG. 27. This is information stored by the route controller 311 according to the MPLS protocol.

When the terminal 2 transmits the packet PB71, the packet PB71 passes through the PE2, and arrives at the interface 302 (IF2) of the PE1. The packet PB71b that arrives at the PE1 has a format of the packet format 2300 illustrated in FIG. 23.

A procedure since the PE1 receives the packet PB71 until the PE1 transmits the ARP request packet PB72 will be described with reference to FIGS. 59 and 60.

The PE1 searches an entry corresponding to the interface IF2 that has received the packet from the interface information table 321 illustrated in FIG. 25 as an initial procedure for obtaining a forwarding destination of the packet PB71 (B81), and finds the second entry. The interface type 404 of the second entry is the MPLS, and in this case, the PE1 acquires both of the VPN number and the destination IP address on the basis of the information on the received packet. The VPN number searches the MPLS information table 2426 from the label number (label 2) stored in the MPLS information 2321 of the received packet (B82), and the information on the interface (IF2) that has received the packet (B43), finds the first entry, and obtains the VPN number (100) of the VPN number 2701 (B84). The destination IP address is a destination IP address (11.0.0.11) included in the IP packet 212. The destination IP address is the IP address of the terminal 1.

Then, the PE1 searches the forwarding table 324 illustrated in FIG. 51 by using the acquired VPN number (100) and destination IP address (11.0.0.11) so as to obtain the forwarding destination (A86, A87). The second entry is found, and in the forwarding destination of the packet, the output interface number 702 is the IF1, and the next hop information 704 is 10.0.0.10 of the CE1. Because the output interface number 703 is the IF1 in the second entry, the PE1 conducts processing for forwarding the packet toward the IF1. Because the interface type of the IF1 is IPVPN in the interface information table 321, the PE1 forwards the packet toward the IPVPN network, that is, creates and forwards the packet of the packet format 201.

Subsequently, in order to obtain the MAC address of the CE1 that is a forwarding destination of the packet, the PE1 searches the terminal information table 325 according to the VPN number (100) and the IP address (10.0.0.10) of the CE1 (S88, S89). However, because there is no entry, the PE1 determines that the neighborhood search of the packet forwarding destination needs to be conducted, temporarily saves the packet PB71, and conducts the processing of the ARP request packet PB72 transmission.

The PE1 needs to obtain the VLAN number in creation of the ARP request packet PB72 illustrated in FIG. 58, searches the interface information table 321 by the IF1 that is the forwarding destination of the packet (B8A), finds the first entry, and obtains the VLAN number (10) from the VLAN number 403.

Thereafter, the PE1 creates the ARP request packet PB72 by using the information obtained up to now. The format of the packet to be created is the packet format 201 illustrated in FIG. 23. The destination user MAC address 224 is set to a broadcast address, the source user MAC address 225 is set to the MAC address of the PE1, the user VLAN tag 226 is set to the VLAN number (10) (B8B) acquired from the first entry of the interface information table 321, and the IP packet 212 is set to the format of the general ARP packet for transmitting the ARP resolution request of the IP address (10.0.0.10) of the CE1 which is the forwarding destination (B8C).

The PE1 transmits the created ARP request packet PB72 toward the IF1 which is an interface of the forwarding destination.

The ARP request packet PB72 arrives at the CE1. The CE1 returns the ARP reply packet PB73 in the form of the packet format 201 in response to the ARP request packet, and the packet PB73 arrives at the PE1.

A procedure since the PE1 receives the packet PB73 until the PE1 transmits the PB74 will be described with reference to FIGS. 61, 62, and 63.

A procedure since receiving the packet PB73 until updating the tables in the PE1 will be described with reference to FIG. 61.

In order to determine the contents to be processed as a first procedure for processing related to the ARP reply packet PB73 reception, the PE1 searches an entry corresponding to the interface IF1 that has received the packet from the interface information table 321 illustrated in FIG. 25 (B91), finds the first entry, and determines that the processing when the packet is received from the interface in which the interface type is the IPVPN is conducted.

Then, the PE1 registers an entry corresponding to the received ARP reply packet on the terminal information table 325. The entry registered on the terminal information table 325 is necessary to create the destination user MAC address 224 of the packet format and the user VLAN tag 226 in forwarding the packet to the terminal 1.

The contents of the first entry in the example illustrated in FIG. 8 are registered on the terminal information table 325. The VPN number 801 is stored in the VPN number 402 of the first entry in the interface information table 321 obtained by search of B91, and the VPN number (100) to which the CE1 belongs (B92). The VLAN number 802 is stored in the user VLAN tag 226 of the received packet PB73, and the VLAN number (10) to which the CE1 belongs (B93). The IP address 803 is the IP address (10.0.0.10) of the CE1 of the ARP packet stored in the IP packet 212 (B94). The MAC address 804 is the MAC address (1010.1010.1010) of the CE1 of the ARP packet stored in the IP packet 212 (B95).

FIG. 62 is an illustrative view illustrating a state of the forwarding table 324 and the terminal information table 325 after the table has been updated as illustrated in FIG. 61. The forwarding table 324 is not changed from a time point of FIG. 51 illustrating an initial state, and in the terminal information table 325, the first entry is added from a state in which there is no entry.

A description will be given of a procedure until the PE1 conducts the forwarding processing of the PB71 temporarily saved to transmit the packet PB74, using the updated table, after the table update processing illustrated in FIG. 61 has been completed, with reference to FIG. 63. The procedure since receiving the packet PB11 until acquiring the VPN number (100) (B84) and the IP address (11.0.0.11) (B85) as illustrated in FIG. 59 is identical with that in FIG. 59, and therefore a description thereof will be omitted. FIG. 63 is continued from FIG. 59.

The PE1 searches the forwarding table 324 illustrated in FIG. 51 by using the VPN number (100) and the destination IP address (11.0.0.11) which are acquired in the procedure of FIG. 59 to obtain the forwarding destination (B111, B112). The PE1 finds the second entry, and in the forwarding destination of the packet, the output interface number 702 is IF1, and the next hop information 704 is 10.0.0.10 of the CE1. In the second entry, the output interface number 703 is the IF1. Therefore, the PE1 conducts a process for forwarding the packet toward the IF1. In the interface information table 321, the interface type of the IF1 is the IPVPN, and therefore the PE1 forwards the packet to the IPVPN network, that is, creates and forwards the packet of the packet format 201.

Because there is a need to obtain the VLAN number and the MAC address aside from the information on the forwarding table 324 in order to create the packet to be forwarded, the PE1 searches the terminal information table 325 illustrated in FIG. 62 by using the VPN number (100) and the IP address (10.0.0.10) of the CE1 which is an forwarding destination of the packet (B113, B114), and finds the first entry. The VLAN number and the MAC address of this entry are used for packet creation.

The PE1 creates the packet PB74 illustrated in FIG. 58 by using the information obtained up to now. The format of the packet to be created is the packet format 201 illustrated in FIG. 23. The destination user MAC address 224 is set to the MAC address (1010.1010.1010) of the CE1 stored in the MAC address 804 of the first entry in the terminal information table 325 (B115). The source user MAC address 225 is set to the MAC address of the PE1, the user VLAN tag 226 is set to the VLAN number (10) to which the CE1 belongs, which is stored in the VLAN number 802 of the first entry in the terminal information table 325 (B116), and the IP packet 212 is not changed from the packet PB71.

Finally, the PE1 transmits the created packet PB74 toward the IF1 which is an interface connected to the IPVPN network, which is stored in the output interface number 703 of the forwarding table 324.

The packet PB74 arrives at the terminal 1 in the form of the packet format 201 through the CE1. The CE1 is a device that operates by a general technique, and therefore a description thereof will be omitted.

Thereafter, the packet PB75 to be transmitted toward the terminal 1 by the terminal 2 can obtain the first entry from the beginning by allowing the PE1 to search the forwarding table 324. The processing described in FIG. 63 is conducted to create and forward the packet PB76 without conducting the neighborhood search according to the ARP. The packet PB76 arrives at the terminal 1 as with the packet PB74.

The above description is given of the specific procedure for communication in the second embodiment of the present invention, and the relationship between the respective tables provided in the device and the packets to be forwarded in order to conduct two-way communication between the terminal 1 belonging to the IPVPN network and the terminal 2 belonging to the L2VPN network.

B3. Operation of Network Device

Now, the operation of the network device 111 will be described.

(1) Packet Forwarding Processor 313

FIG. 28 is a flowchart illustrating a procedure since receiving the packet until acquiring information related to the destination search.

In the procedure according to the first embodiment as illustrated in FIG. 9, S907 is replaced with S2807, and S908 is replaced with S2808.

If the interface type is the MPLS in S906, the packet forwarding processor 313 receives the packet of the packet format 2300 illustrated in FIG. 23, acquires the label information from the MPLS information 2321 of the received packet, searches an entry in which the input label number 2704 and the interface number 2705 in the MPLS information table 2426 match each other by using the label number and the interface number that has received the packet. Then, the packet forwarding processor 313 acquires the VPN number from the appropriate entry, acquires the destination IP address from the IP packet 212 at the same time (S2807), and delete the MPLS header 2310 from the packet (S2808).

The other configurations are identical with those in FIG. 9 according to the first embodiment, and therefore a description thereof will be omitted.

FIG. 29 is a flowchart illustrating a procedure until forwarding the packet after acquiring the VPN number and the destination IP address.

In the procedure according to the first embodiment as illustrated in FIG. 10, S1004 is replaced with S2904, and S1006 is replaced with S2906.

S2904 is different from S1004 in that if there is "-" indicating that the output interface number 703 of the appropriate entry is not set, the processing is shifted to S2906.

In S1005, if the interface type is the MPLS, the packet forwarding processor 313 executes the packet forwarding processing to the MPLS network which will be described later with reference to FIG. 30 (S2906), and the packet forwarding processor 313 completes the processing (S1009).

The other configurations are identical with those in FIG. 10 according to the first embodiment, and therefore a description thereof will be omitted.

FIG. 30 is a flowchart illustrating a procedure of the packet forwarding processing to the MPLS network in S2906 of FIG. 29.

In the procedure according to the first embodiment as illustrated in FIG. 11, S1101 is replaced with S3001, and S1104 is replaced with S3004.

In the flowchart of FIG. 29, if the packet arrives at S2906, the packet forwarding processor 313 starts the packet forwarding processing to the MPLS network (S2901).

If there is an appropriate entry in S1103, the packet forwarding processor 313 creates the packet to be forwarded to the MPLS network (S3004). The packet to be created is the format of the packet format 2300 in FIG. 23. The label information registered in the additional information 705 searched in S1002 is stored in the MPLS information 2321 of the MPLS header 2310. The destination user MAC address 224 of the user layer 2 header 211 is set to the MAC address 804 stored in the entry searched in S1102, the source MAC address 225 of the user layer 2 header 211 is set to the MAC address of the network device 111, the user VLAN tag 226 of the user layer 2 header 211 is set to the VLAN number 802 stored in the entry searched in S1102, and the IP packet 212 is not changed from the received packet. The IP header stored in the IP packet 212 may conduct the processing such as the TTL subtraction which is conducted by a general layer 3 relay processing, or those processing may be omitted and not conducted at all. This is not particularly referred to in this example. Also, the MPLS header 2310 includes the layer 2 header, but because a method of controller the MAC address corresponding to the output label number 2703 is the operation of the general MPLS, a description thereof will be omitted.

The other configurations are identical with those of the first embodiment in FIG. 10, and therefore a description thereof will be omitted.

The packet forwarding processing to the IPVPN network in S1007 of FIG. 29 which is described in the first embodiment with reference to FIG. 12 is identical with that in the first embodiment, and therefore a description thereof will be omitted.

S2904 is different from S1004 in that if there is "-" indicating that the output interface number 703 of the appropriate entry is not set, the processing is shifted to S2906.

(2) Route Controller 311

FIG. 31 is a flowchart illustrating a procedure of the processing of the route controller 311 when the packet forwarding processor 313 transmits the ARP request to the route controller 311.

In the procedure according to the first embodiment as illustrated in FIG. 13, S1302 is replaced with S3102, and S1304 is replaced with S3104.

S3102 is different from S1302 in that if the interface number notified from the packet forwarding processor 313 is "-", the processing is shifted to S3104 without searching. This is a case in which the output interface number 703 of the entry in the forwarding table 324 searched in S1002 of FIG. 29 is "-", and a case in which there is an entry registered on the basis of the L2VPN information table 322 among the entries registered on the forwarding table 324. In this case, the processing is during the procedure for conducting the packet forwarding to the MPLS network, and shifted to S3104.

If the interface type is the MPLS in S1303, or if the interface number is "-" in S3102, the route controller 311 forwards the ARP request from the packet forwarding processor 313 to the VPN connection controller 312 (S3104), and the route controller 311 completes the processing (S1307).

The other configurations are identical with those of the first embodiment in FIG. 13, and therefore a description thereof will be omitted.

FIG. 32 is a flowchart illustrating a procedure of the processing of the route controller 311 when the network device 111 receives the ARP reply packet, and the packet forwarding processor 313 determines the received packet as the packet of the routing protocol, and forwards the packet to the route controller 311.

In the procedure according to the first embodiment as illustrated in FIG. 14, S1404 is replaced with S3204.

If the interface type is the MPLS in S1403, the route controller 311 forwards the ARP reply packet from the packet forwarding processor 313 to the VPN connection controller 312 (S3204), and the route controller 311 completes the processing (S1407).

The other configurations are identical with those of the first embodiment in FIG. 14, and therefore a description thereof will be omitted.

FIG. 33 is a flowchart illustrating a procedure of the processing of the route controller 311 when the network device 111 receives the ARP request packet, and the packet forwarding processor 313 determines the received packet as the packet of the routing protocol, and forwards the packet to the route controller 311.

In the procedure according to the first embodiment as illustrated in FIG. 15, S1504 is replaced with S3304.

If the interface type is the MPLS in S1503, the route controller 311 forwards the ARP request packet from the packet forwarding processor 313 to the VPN connection controller 312 (S3304), and the route controller 311 completes the processing (S1508).

The other configurations are identical with those of the first embodiment in FIG. 15, and therefore a description thereof will be omitted.

FIG. 34 is a flowchart illustrating a procedure of the processing of the route controller 311 when the network device 111 receives the packet of the routing protocol used for control of the route, and the packet forwarding processor 313 determines the received packet as the packet of the routing protocol, and forwards the packet to the route controller 311.

In the procedure according to the first embodiment as illustrated in FIG. 16, S1604 is replaced with S3404.

If the interface type is the MPLS in S1603, the route controller 311 conducts the route processing according to the protocol, and registers the resultant route on the route control information table 323 (S3404). In the contents to be registered, the VPN number 601 acquires the label information from the MPLS information 2321 of the received packet, and searches an entry in which the input label number 2704 and the interface number 2705 in the MPLS information table 2426 match each other by using the label number and the interface number that has received the packet. Then, the route controller 311 acquires the VPN number from the appropriate entry to register that value. The other fields are identical with the contents described in S1604 of FIG. 16. The route processing according to the protocol is the processing of the general routing protocol, and a description thereof will be omitted. The IP address of the device per se used for the protocol processing is the IP address of the IP address/prefix length 503 of the entry in which the VPN number 501 and the VPN number registered in the above VPN number 601 match each other, and the VLAN number 502 and the VLAN number of the user VLAN tag 226 of the user layer 2 header 221 match each other among the entries registered on the L2VPN information table 322.

The other configurations are identical with those of the first embodiment in FIG. 16, and therefore a description thereof will be omitted.

(3) VPN Connection Controller 312

FIG. 35 is a flowchart illustrating a procedure of the processing of the VPN connection controller 312 when the VPN connection controller 312 receives the ARP request from the route controller 311.

In the procedure according to the first embodiment as illustrated in FIG. 17, S1703 and S1704 are replaced with S3503, S3504, and S3505.

After the processing in S1702, the VPN connection controller 312 acquires the output label number 2703 and the interface number 2705 from all of the entries in the MPLS information table 2426 in which the value of the VPN number 501 of the entry searched in S1702, the value of the VLAN number 502, and the value of the VLAN number 2702 in the MPLS information table 2426 match each other, and the interface number notified from the route controller 311 and the interface number 2705 match each other (S3503). If the interface number notified from the route controller 311 is "-", the output label number 2703 acquires the output label number 2703 and the interface number 2705 from all of the entries in which the VPN number and the VLAN number match each other. The combinations of the label number and the interface numbers thus acquired may be plural. That the interface number notified from the route controller 311 is "-" is a case in which the output interface number 703 of the entry in the forwarding table 324 searched in S1002 of FIG. 29 is "-", and a case in which there is the entry registered on the basis of the L2VPN information table 322 among the entries registered on the forwarding table 324. In this case, which interface the network device 111 of the PE1 should transmit the packet to among the interfaces connected to the MPLS network is undetermined, and the network device 111 transmits the packet to all of the possible interfaces on the basis of the MPLS information table 2426. The network device 111 receives the ARP reply packet which is responsive to that packet from any one interface.

The VPN connection controller 312 creates the ARP request packet to be output to the MPLS network by using the label number acquired in S3503 (S3504). The number of packets to be created matches the number of combinations of the label and the interface number which are acquired in S3503. That is, the packets of the same number as that of the appropriate entries are created in S3503. The packets to be created have the format of the packet 2300 in FIG. 23. The label information in the MPLS header 2310 stores an output label acquired in S3503. The destination user MAC address 224 of the user layer 2 header 211 is set to the broadcast address, and the source user MAC address 225 of the user layer 2 header 211 is set to the MAC address of the network device 111. Also, the user VLAN tag 226 of the user layer 2 header 211 is set to the VLAN number 502 of the entry searched in S1702, and the IP packet 212 is set to the format of the general ARP packet. The ARP packet stores the IP address notified from the route controller 311 as the IP address of the device to be subjected to ARP resolution, and uses a value of the IP address of the IP address/prefix length 503 which is stored in the entry searched in S1702 as the IP address of the subject device.

Finally, the VPN connection controller 312 outputs the packet created in S3504 to the interface acquired in S3503 according to the combination acquired in S3503 (S3505), and the VPN connection controller 312 completes the processing (S1705).

S1701, S1702, and S1705 are identical with those in the first embodiment illustrated in FIG. 17, and therefore a description thereof will be omitted.

FIG. 36 is a flowchart illustrating a procedure of the processing of the VPN connection controller 312 when the VPN connection controller 312 receives the ARP reply packet from the route controller 311.

In the procedure according to the first embodiment as illustrated in FIG. 18, S1802 is replaced with S3602, and S1803 are replaced with S3603.

In S3602, the VPN connection controller 312 registers the information related to the notified ARP reply packet on the terminal information table 325. In the contents to be registered, VPN connection controller 312 registers the VPN number acquired on the basis of the label information of the MPLS information 2321 of the received packet on the VPN number 801. As to the VPN number, the VPN connection controller 312 acquires the label information from the MPLS information 2321 of the received packet, searches the entry in which the input label number 2704 and the interface number 2705 in the MPLS information table 2426 match each other by using the label number and the interface number that has received the packet, and acquires the VPN number from the appropriate entry. The VLAN number 802, the IP address 803, and the MAC address 804 are identical with the contents described in S1802 of FIG. 18.

After the processing of S3602, the VPN connection controller 312 registers the entry corresponding to the forwarding table 324 (S3603). In the contents to be registered, the VPN connection controller 312 obtains the label number to be registered on the additional information 705 from the MPLS information table 2426. In the contents to be registered, the VPN connection controller 312 obtains the label number to be registered on the additional information 705 from the MPLS information table 2426. The VPN connection controller 312 searches, from the MPLS information table 2426, the entry in which the VPN number used in S3602, the label number of the received ARP reply packet, and the interface number that has received the packet match the VPN number 2701, the input label number 2704, and the interface number 2705 in the MPLS information table 2426, respectively. The VPN connection controller 312 then registers the output label number 2703 of the appropriate entry on the additional information 705. The VPN connection controller 312 registers the VPN number used in S3602 on the VPN number 701. The other fields are identical with those described in FIG. 18.

The other configurations are identical with those of the first embodiment in FIG. 16, and therefore a description thereof will be omitted.

FIGS. 37 and 38 are flowcharts illustrating a procedure of the processing of the VPN connection controller 312 when the VPN connection controller 312 receives the ARP request packet from the route controller 311.

In the procedure according to the first embodiment as illustrated in FIGS. 19 and 20, S1903 is replaced with S3703, and S1904 is replaced with S3704.

After the processing of S1902, the VPN connection controller 312 registers the entry corresponding to the forwarding table 324 (S3703). In the contents to be registered, the VPN connection controller 312 obtains the label number registered on the additional information 705 from the MPLS information table 2426. The VPN connection controller 312 searches, from the MPLS information table 2426, the entry in which the VPN number notified from the route controller 311, the label number of the received ARP request packet, and the interface number that has received the packet match the VPN number 2701, the input label number 2704, and the interface number 2705 in the MPLS information table 2426, respectively. The VPN connection controller 312 then registers the output label number 2703 of the appropriate entry on the additional information 705. The other fields are identical with those described in FIG. 19.

Subsequent to S3703, the VPN connection controller 312 creates the ARP request packet to be output to the MPLS network (S3704). The packet to be created is the format of the packet 2300 in FIG. 2. The label information in the MPLS header 2310 stores the output label registered on the additional information 705 in S3703. The other fields are identical with those described in FIG. 20.

The other configurations are identical with those of the first embodiment in FIGS. 19 and 20, and therefore a description thereof will be omitted.

The processing of the VPN connection controller 312 when receiving the route notification from the route controller 311, which is described in the first embodiment with reference to FIG. 21, is identical with those in the first embodiment, and therefore a description thereof will be omitted.

(4) Communication Between IPVPN and L2VPN

With the operation of the network device 111 described above, a communication can be conducted between the IPVPN network 102 layer-3-connected to the MPLS network 2204 and the L2VPN network 103 layer-2-connected to the MPLS network 2204.

More specifically, when the terminal within the IPVPN network 102 needs to communicate with the terminal with the L2VPN network 103, with the operation of the VPN connection controller 312 described mainly with reference to FIGS. 35 and 36, the ARP resolution is conducted through the MPLS network, and the entry including the additional information 705 is registered on the forwarding table 324. Also, with the operation of the packet forwarding processor 313 described mainly with reference to FIG. 30, the packet including the MPLS header 2310 is created by using the additional information 705 of the forwarding table 324, and forwarded while conducting the layer 3 forwarding. As a result, the PE2 (network device 112) of the MPLS network 2204 can be layer-2-forwarded, and the packet can arrive at the L2VPN network 103 from the IPVPN network 102.

Likewise, when the terminal within the L2VPN network 103 needs to communicate with the terminal with the IPVPN network 102, with the operation of the VPN connection controller 312 described mainly with reference to FIGS. 37 and 38, and with the operation of the packet forwarding processor 313 described mainly with reference to FIG. 12, the terminal within the L2VPN network 103 can designate the PE1 (network device 111) as a default gateway or a next hop of the communication target. As a result, the packet can arrive at the IPVPN network 102 from the L2VPN network 103.

Further, the route information can be exchanged between the PE1 (network device 111) and the router within the L2VPN network 103, and reflect the packet forwarding, through the processing of the route using the routing protocol described mainly with reference to FIGS. 34 and 21. As a result, even if the router is disposed within the L2VPN network 103, the two-way communication can be achieved likewise.

B4. Advantages of Second Embodiment

Advantages of this embodiment will be described below.

According to this embodiment, a communication can be conducted between the hub network layer-3-connected to the core network of the MPLS and the hub network layer-2- connected to the core network. As a result, the layer-3-connection method and the layer-2-connection method can be freely selected. Even if there is a need to switch between the layer-3-connection and the layer-2-connection, the connection can be conducted by only a partial change so that the overall stop can be avoided.

C. Modified Example

In the first and second embodiments, as described in S1104 of FIG. 11, S1204 of FIG. 12, and S2901 of FIG. 29, when the packet is forwarded, the IP header can be forwarded without any change such as the TTL subtraction. In this case, the processing can be conducted from the source and the destination of the packet without distinction to the layer 2 relay. When the PE1 conducts this operation, the PE2 can forward all of the packets that conduct the layer 2 relay to the PE1, and the PE1 can forward those packets to an appropriate destination.

Advantages of this modified example reside in that the PE2 can merely forward all of the packets to the PE1 to structure the network, and because the PE2 does not need to hold the entry of the MAC address learning, the amount of information to be held by the edge device can be reduced to reduce the device costs of the edge device.

The above description has been given of a case in which the communication can be conducted among the MAC-in-MAC network 101, the IPVPN network 102, and the L2VPN network 103. However, the present invention is not limited to those configurations, but can be applied to a case in which the communication can be conducted between appropriate core networks layer-3-connected to an appropriate core network and layer-2-connected to an appropriate network.

What is claimed is:

1. A virtual network connection method in a network system configured to configure VPNs and including:
a first network that is connected to the VPNs and configured to conduct packet forwarding between hubs of the VPNs;
a second network that has a first terminal and is layer-3-connected to the first network; and
a third network that has a second terminal and is layer-2-connected to the first network,
wherein the network system includes a first network device (PE1) that is connected to the second network and belongs to the first network,
wherein the PE1 includes:
a forwarding table configured to store an IP address of a destination, an output interface (IF), a next hop and a MAC address of a destination network device (PE) in association with a VPN number; and
a terminal information table configured to store the IP address and a MAC address of the destination in association with the VPN number,
the method comprising:
in the PE1,
receiving a first packet from the first terminal toward the second terminal;
searching the forwarding table by using the VPN number and the IP address of the destination second terminal based on the first packet, temporarily saving the first packet when there is no output IF and/or no MAC address of a destination second network device (PE2) necessary for packet forwarding, and transmitting an ARP request packet to the second terminal through the first network;
receiving an ARP reply packet from the second terminal through the first network in response to the ARP request packet;
storing the output IF and the MAC address of the destination PE2 in association with the VPN number and the destination IP address based on the ARP reply packet, on the forwarding table, and storing and updating VLAN number, and the IP address and the MAC address of the destination second terminal in association with the VPN number on the terminal information table;
creating a second packet in which a header having the MAC address of the destination PE2, the MAC address of the source PE1, the VPN number, the MAC address of the destination second terminal, and the VLAN number for the first packet temporarily saved is added to the IP packet included in the first packet, by using the updated forwarding table and terminal information table;
transmitting the second packet to the second terminal through the first network,
receiving a third packet from the second terminal toward the first terminal;
searching the forwarding table by using the VPN number and the IP address of the destination first terminal based on the third packet, obtaining that a subsequent forwarding destination is a network device (CE1) of the third network, searching the terminal information table for the CE1, temporarily saving the packet when there is no entry necessary for packet forwarding, and transmitting an ARP request packet to the CE1 toward the second network;
receiving an ARP reply packet from the CE1 in response to the ARP request packet;
storing and updating the VLAN number, the IP address and the MAC address of the destination CE1 in association with the VPN number on the terminal information table on the basis of the ARP reply packet;
creating a fourth packet in which a header having the MAC address of the destination CE1, the MAC address of the source PE1, and the VLAN number for the third packet temporarily saved is added to the IP packet included in the third packet, by using the updated terminal information table; and
transmitting the fourth packet to the first terminal through the CE1.

2. A virtual network connection method in a network system configured to configure VPNs and including:
a first network that is connected to the VPNs and conducts packet forwarding between hubs of the VPNs;
a second network that has a first terminal and is layer-3-connected to the first network; and
a third network that has a second terminal and is layer-2-connected to the first network,
wherein the network system includes a first network device (PE1) that is connected to the second network and belongs to the first network,
the PE1 including:
a forwarding table configured to store an IP address of a destination, an output interface (IF), a next hop, and an output label in association with a VPN number;
a terminal information table configured to store the IP address and a MAC address of the destination in association with the VPN number;
an MPLS information table configured to store a VLAN number, the output label, an input label, and the interface (IF) in association with the VPN number, the method comprising:
in the PE1,
receiving a first packet of an MPLS from the first terminal toward the second terminal;
searching the forwarding table by using the VPN number and the IP address of the destination second terminal based on the first packet, temporarily saving the first packet when there is no output IF and/or no MAC address of a destination second network device (PE2) necessary for packet forwarding, and transmitting an ARP request packet to the second terminal through the first network;
receiving an ARP reply packet from the second terminal through the first network in response to the ARP request packet;
searching the MPLS information table from the input label of the MPLS information included in the first packet to obtain the output label;
storing and updating the VLAN number, the IP address and the MAC address of the destination second terminal in association with the VPN number on the terminal information table on the basis of the ARP reply packet; and
creating a second packet in which a header having the MPLS information, the MAC address of the destination second terminal, the MAC address of the source PE1, and the VLAN number for the first packet temporarily saved is added to the IP packet included in the first packet, by using the updated terminal information table and terminal information table;
transmitting the second packet to the second terminal through the first network,
receiving a third packet of an MPLS from the second terminal toward the first terminal;
searching the MPLS information table based on the third packet to obtain the VPN number according to the interface and an input label included the MPLS information, searching the forwarding table by using the VPN number and the IP address of the destination first terminal included in the first packet, obtaining that a subsequent forwarding destination is the network device (CE1) of the third network, searching the terminal information table for the CE1, temporarily saving the packet if there is no entry necessary for packet forwarding, and transmitting the ARP request packet to the CE1 toward the second network;
receiving an ARP reply packet from the CE1 in response to the ARP request packet;
storing and updating the VLAN number, the IP address and the MAC address of the destination CE1 in association with the VPN number on the terminal information table on the basis of the ARP reply packet;
creating a fourth packet in which a header having the MAC address of the destination CE1, the MAC address of the source PE1, and the VLAN number for the first packet temporarily saved is added to the IP packet included in the first packet, by using the updated terminal information table; and
transmitting the fourth packet to the first terminal through the CE1.

3. A network system configured to configure VPNs and including:
a first network that is connected to the VPNs and configured to conduct packet forwarding between hubs of the VPNs;
a second network that has a first terminal and is layer-3-connected to the first network;
a third network that has a second terminal and is layer-2-connected to the first network; and,
a first network device (PE1) that is connected to the second network and belongs to the first network;
the PE1 includes:
a forwarding table configured to store an IP address of a destination, an output interface (IF), a next hop and a forwarding information related to specifying an exit of the first network in association with a VPN number; and
a terminal information table configured to store the IP address and a MAC address of the destination in association with the VPN number, and
the PE1 is configured
to search the forwarding table by using the VPN number and the IP address of the destination second terminal based on a first packet from the first terminal toward the second terminal, temporarily saving the first packet when there is no output IF and/or no forwarding information related to specifying an exit destination PE2 of the first network necessary for packet forwarding, and to transmit an ARP request packet to the second terminal through the first network;
to receive an ARP reply packet from the second terminal through the first network in response to the ARP request packet;
to store the output IF and the forwarding information related to specifying an exit of the first network in association with the VPN number and the destination IP address based on the ARP reply packet, on the forwarding table, and to store and to update VLAN number, and the IP address and the MAC address of the destination second terminal in association with the VPN number on the terminal information table;
to create a second packet in which a header having the MAC address of the destination PE2, the MAC address of the source PE1, the VPN number, the MAC address of the destination second terminal, and the VLAN number for the first packet temporarily saved is added to the IP packet included in the first packet, by using the updated forwarding table and terminal information table;
to transmit the second packet to the second terminal through the first network,
to search the forwarding table by using the VPN number and the IP address of the destination first terminal based on a third packet from the second terminal toward the first terminal, to obtain that a subsequent forwarding destination is a network device (CE1) of the third network, to search the terminal information table for the CE1, temporarily to save the packet if there is no entry necessary for packet forwarding, and to transmit an ARP request packet to the CE1 toward the second network;
to receive an ARP reply packet from the CE1 in response to the ARP request packet;
to store and updating the VLAN number, the IP address and the MAC address of the destination CE1 in association with the VPN number on the terminal information table on the basis of the ARP reply packet;
to create a fourth packet in which a header having the MAC address of the destination CE1, the MAC address of the source PE1, and the VLAN number for the third packet temporarily saved is added to the IP packet included in the third packet, by using the updated terminal information table; and
to transmit the fourth packet to the first terminal through the CE1.

4. The network system according to claim 3,
further configured to execute a packet forwarding of the first network in accordance with Media Access control (Mac-in Mac) and wherein the forwarding information related to specifying an exit of the first network is a MAC address of a destination network device (PE) belongs to the first network.

5. The network system according to claim 3,
further configured to execute a packet forwarding of the first network in accordance with Multi Protocol Label Switching (MPLS), and wherein the forwarding information related to specifying an exit of the first network is an output label,
the PE1 further includes
an MPLS information table configured to store the VLAN number, the output label, the input label, and the interface (IF) in association with the VPN number, and
the PE1 is further configured
to search the MPLS information table from the input label of the MPLS information included in the first packet to obtain the output label, and to search the MPLS information table on the basis of the third packet to obtain the VPN number according to the interface and an input label included the MPLS information,
the second packet to be created further including a header having the MPLS information.

6. In a first network between a second network that has a first terminal and is layer-3-connected to the first network; and a third network that has a second terminal and is layer-2-connected to the first network,
a network device for conducting packet forwarding between the second network and the third network each of which configure a VPN, comprising:
a memory configured to store a forwarding table that stores an IP address of a destination, an output interface (IF), a next hop and a forwarding information related to specifying an exit of the first network in association with a VPN number;
a terminal information table configured to store the IP address and a MAC address of the destination in association with the VPN number;
a processor coupled to the memory configured to forward the packet by using the forwarding table and the terminal information table;
wherein:
the processor is configured to
search the forwarding table by using the VPN number and the IP address of the destination second terminal on the basis of a first packet from the first terminal toward the second terminal, temporarily save the first packet when there is no output IF and/or no MAC address of forwarding information related to specifying an exit of the first network necessary for packet forwarding, and transmit an ARP request packet to the second terminal through the first network;
receive an ARP reply packet from the second terminal through the first network in response to the ARP request packet;
store the output IF and the MAC address of the destination PE2 in association with the VPN number and the destination IP address on the basis of the ARP reply packet, on the forwarding table, and store and update a VLAN number, and the IP address and the MAC address of the destination second terminal in association with the VPN number on the terminal information table;
create a second packet in which a header having the MAC address of the destination PE2, the MAC address of the source PE1, the VPN number, the MAC address of the destination second terminal, the MAC address of the source PE1, and the VLAN number for the first packet temporarily saved is added to the IP packet included in the first packet, by using the updated forwarding table and terminal information table; and
the PE1 is configured to transmit the second packet to the second terminal through the first network.

7. The network device according to claim 6,
further configured to execute a packet forwarding of the first network in accordance with Media Access control (Mac-in Mac) and wherein the forwarding information related to specifying an exit of the first network is a MAC address of a destination network device (PE) belongs to the first network.

8. The network device according to claim 7,
the processor is further configured to
search the forwarding table by using the VPN number and the IP address of the destination first terminal on the basis of the a third packet from the second terminal toward the first terminal, obtain that a subsequent forwarding destination is a network device (CE1) of the third network, search the terminal information table for the CE1, temporarily save the packet if there is no entry necessary for packet forwarding, and transmit an ARP request packet to the CE1 toward the second network;
store and update the VLAN number, the IP address and the MAC address of the destination CE1 in association with the VPN number on the terminal information table on the basis of an ARP reply packet from the CE1 in response to the ARP request packet;
create a forth packet in which a header having the MAC address of the destination CE1, the MAC address of the source PE1, and the VLAN number for the third packet temporarily saved is added to the IP packet included in the third packet, by using the updated terminal information table; and
transmit the forth packet to the first terminal through the CE1.

9. The network device according to claim 6,
further configured to execute a packet forwarding of the first network in accordance with Multi Protocol Label Switching (MPLS), and wherein the forwarding information related to specifying an exit of the first network is an output label,
the PE1 further includes
an MPLS information table configured to store the VLAN number, the output label, the input label, and the interface (IF) in association with the VPN number,
the processor is configured to search the MPLS information table from the input label of the MPLS information included in the first packet to obtain the output label,
the second packet to be created further includes a header having the MPLS information.

10. The network device according to claim 9,
wherein the processor is further configured to search the MPLS information table on the basis of the third packet to obtain the VPN number according to the interface and an input label included the MPLS information.

11. The network system according to claim 4,
wherein in creating the ARP request packet,
the PE1 is further configured to
obtain the VLAN number corresponding to the VPN number and the destination IP address,
create a header having the VLAN number with the MAC address of the destination PE as a broadcast address, the MAC address of the source PE as the MAC address of the PE1, the VPN information as the acquired VPN number, the MAC address of the destination user as the broadcast address, and the MAC address of the source user as the MAC address of the PE1, and add, the header with the IP packet as a format of the ARP packet for requesting the ARP resolution of the destination IP address to create the ARP request packet.

12. The network system according to claim 4, wherein, after the forwarding table and the terminal information table have been updated, for a packet that is transmitted by the first terminal toward the second terminal, the PE1 is further configured to obtain a necessary entry by searching the updated forwarding table and/or terminal information table to conduct packet processing without conducting the neighborhood search according to the ARP, and create a packet to be transmitted to the second terminal.

13. The network system according to claim 4, wherein, when the PE1 receives the first packet from the first terminal, the PE1 is further configured to acquire the VPN number corresponding to the interface IF1 that has received the packet and the destination IP address of the destination second terminal included in the IP packet of the first packet, search the forwarding table by using the obtained VPN number and the destination IP address, and when the output interface number of an appropriate entry and/or the MAC address of the destination PE is undetermined, in order to conduct the neighborhood search, temporarily save the first packet, create the ARP request packet, and transmit the ARP request packet toward the first network, when the PE1 receives the ARP reply packet from the second terminal through the interface IF2, the PE1 is configured to store, in the terminal information table, the VPN number to which the second terminal belongs and the VLAN number to which the second terminal belongs, the IP address of the second terminal, and the MAC address of the second terminal, which are included in the ARP reply packet, in association with each other, and store, in the forwarding table, the VPN number to which the second terminal belongs, the IP address of the second terminal, the MAC address of the PE2, and the interface IF2 that has received the ARP reply packet, which are included in the ARP reply packet, in association with each other, create the second packet on the basis of the VPN number acquired from the first packet and the IP address of the destination second terminal, with the MAC address of the destination PE as the MAC address of the PE2 stored in the forwarding table, the MAC address of the source PE as the MAC address of the PE1, the VPN number information as the acquired VPN number, the destination user MAC address as the MAC address of the second terminal stored in the terminal information table, the source user MAC address as the MAC address of the PE1, the user VLAN tag as the VLAN number to which the second terminal belongs to and which is stored in the terminal information table, without changing the IP packet from the first packet, and transmit the created second packet toward the IF2 which is an interface connected to the first network.

14. The network system according to claim 13, wherein, when the PE1 receives the third packet from the second terminal, the PE1 is further configured to acquire the VPN number corresponding to the interface IF2 that has received the packet, and the destination IP address of the destination first terminal, search the forwarding table by using the acquired VPN number and destination IP address, and obtain the forwarding destination of the packet in which the output interface number is the IF1 and the next hop information is the IP address of the CE1, wherein in order to obtain the MAC address of the CE1 which is the forwarding destination of the packet, the PE1 is configured to search the terminal information table according to the VPN number and the IP address of the CE1, and when there is no entry, temporarily save the third packet, create the ARP request packet, and transmit the created ARP request packet toward the interface IF1, the PE1 receives ARP reply packet from IF1, the PE1 is further configured to store, in the terminal information table, the VLAN number to which the CE1 belongs to, the IP address of the CE1, and the MAC address of the CE1, which are included in the ARP reply packet in association with the VPN number to which the CE1 belongs, search the forwarding table on the basis of the VPN number and the destination IP address acquired from the received packet, obtains the forwarding destination interface IF1 of the packet and the IP address of the CE1 of the next hop, search the terminal information table by using the VPN number and the IP address of the CE1, and obtain the VLAN number and the MAC address of the CE1, create the fourth packet with the destination user MAC address as the MAC address of the CE1 stored in the terminal information table, the source user MAC address as the MAC address of the PE1, and the user VLAN tag as the VLAN number to which the CE1 belongs and which is stored in the terminal information table, without changing the IP packet from the third packet, and transmit the created fourth packet toward the IF1 which is an interface connected to the second network.

* * * * *